US010711505B2

(12) United States Patent
Hall et al.

(10) Patent No.: US 10,711,505 B2
(45) Date of Patent: Jul. 14, 2020

(54) AUTOMATED WINDOW MECHANISM WITH CALIBRATION FUNCTION

(71) Applicants: David R. Hall, Provo, UT (US); Jerome Miles, Spanish Fork, UT (US); Emily Brimhall, Alpine, UT (US); Austin Carlson, Provo, UT (US); Seth J. Myer, Eagle Mt., UT (US)

(72) Inventors: David R. Hall, Provo, UT (US); Jerome Miles, Spanish Fork, UT (US); Emily Brimhall, Alpine, UT (US); Austin Carlson, Provo, UT (US); Seth J. Myer, Eagle Mt., UT (US)

(73) Assignee: Hall Labs LLC, Provo, UT (US)

( * ) Notice: Subject to any disclaimer, the term of this patent is extended or adjusted under 35 U.S.C. 154(b) by 110 days.

(21) Appl. No.: 15/945,954

(22) Filed: Apr. 5, 2018

(65) Prior Publication Data
US 2019/0309559 A1 Oct. 10, 2019

(51) Int. Cl.
*E05F 15/70* (2015.01)
*F24F 7/00* (2006.01)
*E05F 15/77* (2015.01)
*E05F 15/40* (2015.01)
*E05F 15/71* (2015.01)
*E05F 15/72* (2015.01)
*F24F 11/74* (2018.01)
*E05F 15/635* (2015.01)
(Continued)

(52) U.S. Cl.
CPC .............. *E05F 15/70* (2015.01); *E05F 15/40* (2015.01); *E05F 15/635* (2015.01); *E05F 15/71* (2015.01); *E05F 15/72* (2015.01); *E05F 15/77* (2015.01); *E05F 15/79* (2015.01); *F24F 7/00* (2013.01); *F24F 11/74* (2018.01); *E05Y 2400/32* (2013.01); *E05Y 2400/66* (2013.01); *E05Y 2900/148* (2013.01); *F24F 2110/10* (2018.01)

(58) Field of Classification Search
CPC ........ E05F 15/70; E05F 15/635; E05F 15/77; E05F 15/643; E05F 15/71; E05F 15/72; E05F 15/40; E05Y 2201/722; E05Y 2201/434; E05Y 2900/148; E05Y 2400/66; E05Y 2400/32; F24F 7/00; F24F 11/74; F24F 2110/10
See application file for complete search history.

(56) References Cited

U.S. PATENT DOCUMENTS 2,531,116 A * 11/1950 Donoghue ............ E05F 15/71 49/23
6,481,160 B1 * 11/2002 Kowalczyk ............ E05F 3/224 49/333

(Continued)

*Primary Examiner* — Justin B Rephann

(57) ABSTRACT

An automated window mechanism with sensor informed calibration is disclosed. An electrically powered actuator moves a window between a closed position and an open position. A current sensor senses the current between a power source and the actuator when the actuator is moving the window. Informed by the current sensor, a processor determines a first endpoint when the window is in the closed position and a second endpoint when the window is in the open position for the window. A controller uses the endpoints to control the actuator to stop in either the first or the second endpoint as desired by a user. Sensors inform the controller, and user input via a mobile device enables both direct user control and programming of the controller.

29 Claims, 30 Drawing Sheets

(51) Int. Cl.
  *E05F 15/79* (2015.01)
  *F24F 110/10* (2018.01)

(56) References Cited

U.S. PATENT DOCUMENTS

| | | | |
|---|---|---|---|
| 6,581,332 B1* | 6/2003 | Kim | E05F 15/77 49/358 |
| 2004/0244295 A1* | 12/2004 | Derham | E05F 15/41 49/362 |
| 2007/0271848 A1* | 11/2007 | Wolf | E05F 15/70 49/340 |
| 2008/0163553 A1* | 7/2008 | Liao | E05F 11/423 49/362 |
| 2012/0023827 A1* | 2/2012 | Hancock | E05F 15/635 49/360 |
| 2014/0047768 A1* | 2/2014 | Vaknin | E05D 15/06 49/25 |
| 2017/0101816 A1* | 4/2017 | Kozonasky | E05F 15/77 |
| 2018/0334841 A1* | 11/2018 | Langenberg | E05F 3/22 |
| 2018/0355660 A1* | 12/2018 | Noy | E05D 15/0665 |
| 2018/0363356 A1* | 12/2018 | Hohwart | E05F 15/635 |

\* cited by examiner

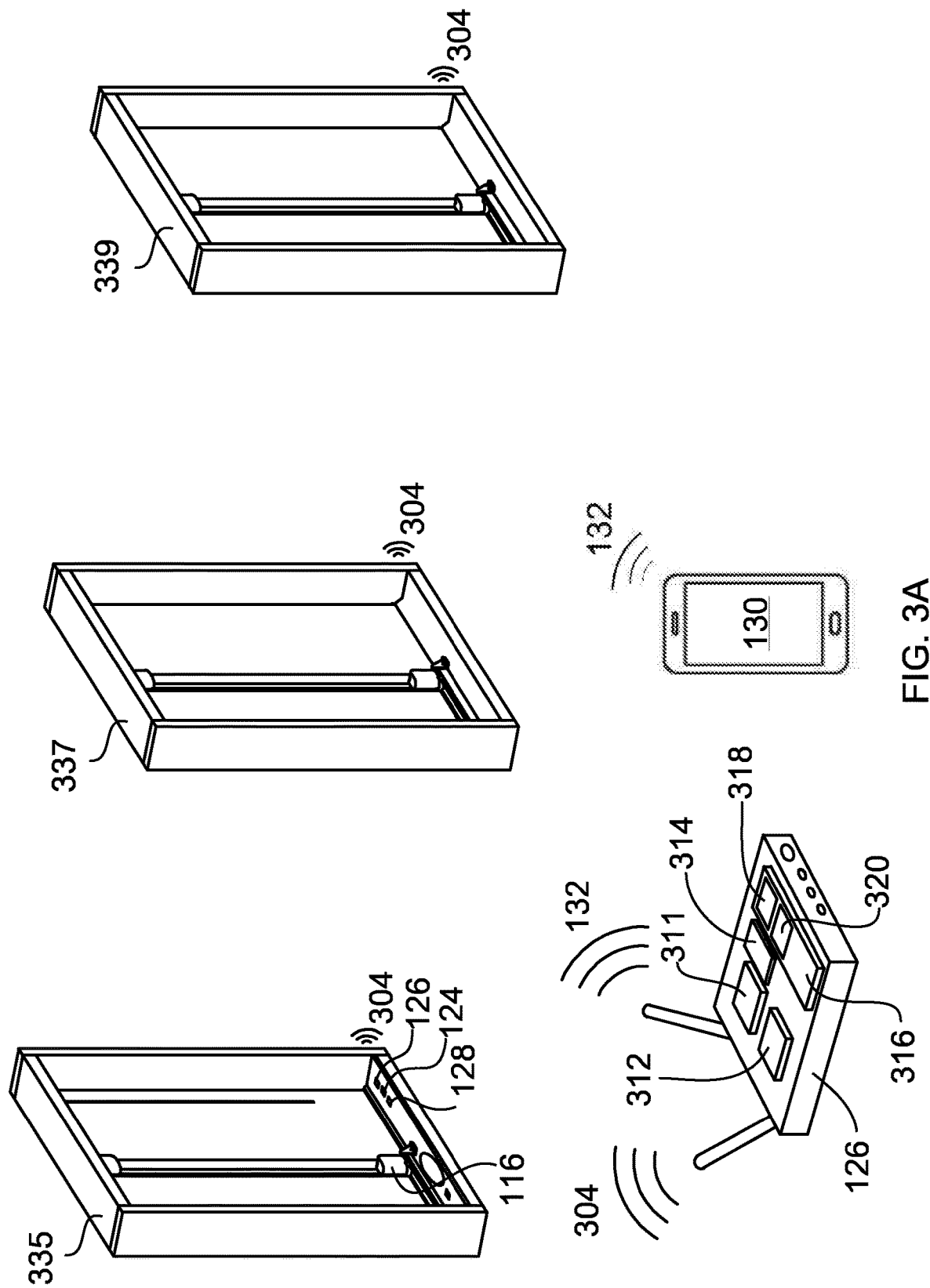

AUTOMATED WINDOW MECHANISM WITH CALIBRATION FUNCTION

FIELD OF THE INVENTION

The devices, systems, and methods described herein relate generally to the Internet of Things. More particularly, the devices, systems, and methods described herein relate to smart home devices.

BACKGROUND

Home automation, also known as home monitoring, home control, smart home, connected home, or the like, is becoming more and more prevalent. This increase is due in large part to modern-day advances in software and electronics, coalescence around a number of home automation protocols, and larger numbers of manufacturers willing to build smart devices using these protocols. Home automation may be as simple as automating a few devices in a relatively small home or space, or as complicated as automating an entire residence or building including hundreds or even thousands of smart devices. The number and type of smart devices that are available has dramatically increased as more and more manufacturers, including various major technology players, are getting involved in this space. Some of the most popular home automation devices currently utilized include lights, window coverings, thermostats, audio and video systems, door locks, security systems, and the like.

Many improvements and developments have been made in the field of Smart Home devices. However, many devices, especially existing devices in a residence or business (such as windows, window coverings and doors, for example), simply were not designed or configured to be smart.

Traditionally, windows and doors are opened and closed manually for ventilation, energy or security or safety needs. For example, a window or door may be closed and locked while the owners are away from home to protect the home from entry by an intruder. A window or door may be opened in order to vent noxious gases from the interior of the home to the outside. When the inside of the house is hot, a door or window may be opened to allow cooler outside air to enter the house.

Outfitting a home with smart devices can be a difficult decision for a home or business owner. Many times, the home or business owner already owns a large number of conventional non-smart devices. Replacing these devices can be expensive and/or wasteful. For example, a home or business owner may have already made a substantial investment in manually-operated windows. Replacing the windows with automated versions of the same can be prohibitively expensive in addition to requiring significant amounts of labor. Retrofitting the windows can also be problematic in that multiple different designs and sizes of windows may exist and retrofit solutions may be limited in terms of the designs and sizes they can work with. Retrofitting the windows may also require significant modifications to the windows to make the retrofit solution function properly. In certain cases, retrofitting windows may require removing the windows and cutting or otherwise modifying various components thereof.

In order to automate motorized windows, it may be difficult to extend control wiring to each of the locations, especially in existing buildings or retrofit applications. User control, both at the motorized windows and from remote locations is needed.

Another challenge with automating motorized windows is the power required to motorize the system. Motorized windows do not normally have power outlets near the mounting location. Batteries may be included in the motorized window system, however over a period of time these batteries will run out of power and will need to be replaced. An option to overcome this challenge is to provide solar panels to charge the batteries. Depending on the power requirements of the system, the size and location of the solar panel may need to be large in order to keep the batteries charged. It may not be desirable in many applications to have large or obtrusive solar panels.

For systems with multiple motorized windows, a simple wireless network may be implemented to control either a single motorized window or a group of motorized windows. However, there are many cases where a simple wireless network may not have the needed range to reach every motorized window in the system. More powerful wireless technologies may be implemented that increase the range, however these technologies require more power.

In view of the foregoing, what is needed is a system to automate motorized windows. Ability to wirelessly control the motorized windows, both locally (in the building) and from remote locations via the cloud is also needed. Ideally, such a system will enable different types and sizes of existing motorized windows to be automated. Such apparatus and methods will also ideally enable retrofitting motorized windows while minimizing modifications thereto. Yet further needed are methods that take advantage of the special placement of motorized windows within a home or building.

Other features needed for automated windows include sensors at or near the windows to allow control of the windows according to local or remote conditions to be realized by passing sensor data to a controller. Temperature both inside and outside the building, along with weather data and other conditions may influence how and when the windows are opened and closed.

Along with using sensor data to determine window control, calibration of the motors and actuators in the system may be carried out by monitoring the current, voltage and other electrical signals in the system.

User control at the motorized windows and at remote locations is also needed. Specifically, apparatus and methods are needed to enable motorized windows to provide features and functions not normally associated with motorized windows but capitalize on their placement between the interior and exterior of the building, near entryways, or other openings. Another main need is to provide a system that has low power consumption, thus reducing the electrical load on the battery. Lower power consumption extends the life of the batteries and reduces the size of charging systems such as solar panels. A way to provide communication and control of a group of motorized windows consuming a minimal amount of power is needed.

SUMMARY

In one aspect, the invention is an automated window mechanism that includes an electrically powered actuator configured to move a window between a closed position and an open position. A power source provides power to the actuator. A current sensor senses the current between the power source and the actuator when the actuator is moving the window. A processor is configured to determine, from information provided by the current sensor, a first endpoint when the window is in the closed position and a second endpoint when the window is in the open position for the window. A controller is configured to store the first and second endpoints, and thereafter use the endpoints to control the actuator to stop in either the first or the second endpoint when desired by a user.

The controller may include one or more communication systems, including Bluetooth communication chips, Internet Wi-Fi transceivers, network transceivers, a wireless mesh network device such as Z-Wave network transceiver, or a combination thereof. The one or more communication systems may communicate with at least one of an external remote controller and a cloud-based network. The one or more communication systems may receive instructions from the external remote controller, generate signals instructing the first motor to rotate in a direction, receive signals from the first motor regarding a status of the first motor, and generate a signal informing the external remote controller of the status of the first motor.

The device may include a power line or batteries, preferably rechargeable batteries, that power the motor. The device may also have a solar panel adapted to charge the batteries. The sensors may consist of at least one of carbon monoxide; carbon dioxide; smoke; fire; humidity; moisture; dust; pollen; environmental; motion; electromagnetic; electrochemical; electric current; electric potential; magnetic; radio; air flow; accelerometers; pressure; electro-acoustic; camera; electro-optical; photoelectric; electrostatic; thermoelectric; radio-acoustic; air quality; motion; attempted movement of the slidable segment; intrusion; sunlight and noise; and combinations thereof. The controller may receive signals from the two or more sensors and operate the first motor to move the slidable frame to an open or closed position as appropriate without input from a user.

The slidable segment may be slidably mounted by being between tracks on the first horizontal member of the frame and a second horizontal member of the frame, the tracks allowing the slidable frame to freely move side to side.

The frame may also have a latching device that mates to a latching receiver attached to the slidable segment, wherein mating prevents movement of the slidable segment. The latching receiver may also include a communication device that generates a signal when the latching device is mated and transmits that signal to the controller, which generates a control signal that deactivates the motor. The latching device may also have a release mechanism configured to automatically release the first gear from the first gear track, thereby allowing the slidable frame to be moved to an open position by the user, in response to an emergency condition as detected by at least one of the one or more sensors.

The controller may also receive and process information from online sources or to communicate with a user as appropriate. This communication may be via a user's smart device running an app. The controller and smart device running an app may be configured to provide user control of the slidable frame, give notice to the user when the slidable frame has been automatically moved in response to a signal from at least one of the one or sensors and warn the user in response to a signal from at least one of the one or more sensors.

The slidable segment may be slidably mounted by being between tracks on a first horizontal member of the frame and a second horizontal member of the frame, the tracks allowing the slidable frame to freely move side to side. The frame may also have a latching device that mates to a latching receiver attached to the slidable segment, wherein mating prevents movement of the slidable segment. The latching receiver may also include a communication device that generates a signal when the latching device is mated and transmits that signal to the controller which generates a control signal that is sent to the motor, wherein the control signal deactivates the motor. The first and second linear directions may be either horizontal or vertical.

The first motor may be mounted on the slidable segment; and the first gear track mounted to the first stationary member of the frame.

The communication systems may communicate with an external remote controller, and the communication systems receive instructions from the external remote controller, generate signals instructing the first motor to rotate in a direction, receive signals from the first motor regarding a status of the first motor, and generate a signal informing the external remote controller of the status of the first motor.

The motor assembly may include a transmission that drives the one or more gears, wherein the transmission locks the slidable segment to at least one gear track when the transmission is not driven by the motor.

The invention may also include a kit for retrofitting an existing window in order to motorize and automate it. Existing hardware on the window may be either removed or adapted to accept the motor, gears and track to enable the automation. The gear track may be affixed to the slidable window by a peel-and-stick adhesive.

The invention may include a frame and a slidable segment that is slidably mounted within the frame with a first motor coupled to a first vertical member of the frame and a first pulley wheel affixed to and driven by the first motor. There may also be a second pulley wheel attached to a second vertical member of the frame along with a first linear flexible material, wherein the first linear flexible material forms a continuous belt that wraps around the first pulley wheel and the second pulley wheel, and wherein the first linear flexible material is attached in at least one location to a top horizontal member of the slidable segment. When the motor drives the first pulley wheel in a first direction, it may cause the first pulley wheel to pull on the linear flexible material such that the slidable segment slides towards the first vertical member. Driving the first pulley wheel in a second direction may cause the first pulley wheel to pull on the linear flexible material such that the slidable segment slides towards the second vertical member. The first and second directions may be vertical or horizontal. The invention may also include a power source, providing power to the motors.

A second motor may be coupled to the slidable segment, a second pulley wheel affixed to and driven by the second motor, and a second linear flexible material. A first end of the second linear flexible material may be affixed to the first vertical member of the frame and a second end of the second linear flexible material may be affixed to the second vertical member of the frame. The second linear flexible material may wrap around the second pulley wheel at least once.

The first motor may be coupled to a bottom portion of the slidable segment and the second motor may be attached to a top portion of the slidable segment. The frame may also include a fixed segment offset from the slidable segment such that the slidable segment can slide past the fixed segment.

The first motor may also include a transmission that drives the first pulley wheel. The transmission may prevent the first pulley wheel from rotating when the transmission is not driven by the motor such that the transmission may lock the slidable segment in place when the transmission is not driven by the motor. The transmission may include a worm gear, the worm gear preventing the first pulley wheel from rotating when the transmission is not driven by the motor.

The slidable segment may be slidably mounted by being between tracks on a top horizontal member of the frame and a bottom horizontal member of the frame, the tracks allowing the slidable frame to freely move side to side.

The invention may also include a third motor coupled to the slidable segment, a third pulley wheel affixed to and driven by the third motor, and a third linear flexible material. A first end of the third linear flexible material may be affixed to the first vertical member of the frame and a second end of the third linear flexible material may be affixed to the second vertical member of the frame. The second linear flexible material may wrap around the third pulley wheel at least once.

The preferred battery type is rechargeable, and there may also be a solar panel for charging the batteries.

The latching receiver may include a communication device that generates a signal when the latching device is mated and transmit that signal to the motor. The controller may then deactivate the motor. The first pulley wheel and second pulley wheel may further also have gear teeth along the outer diameter of the wheel. The first and second linear flexible material may include one or more of a wire; a belt; a chain; a belt with teeth; or combinations thereof.

The invention may also include a release mechanism configured to automatically release the first pulley wheel from the first slidable segment, thereby allowing the slidable segment to be moved to an open position by the user, in response to an emergency condition as detected by at least one of the two or more sensors.

The first motor may be coupled to a first vertical member of the slidable segment, wherein there is no second pulley wheel, and one end of the flexible material may be attached to the first vertical member of the frame, wrap around the first pulley wheel, and be attached to the second vertical member of the frame.

The invention may further include an automated window mechanism with an electrically powered actuator configured to move a window between a closed position and an open position. The mechanism may include a power source, providing power to the actuator; a current sensor, configured to sense the current between the power source and the actuator when the actuator is moving the window; a processor configured to determine, from information provided by the current sensor, a first endpoint when the window is in the closed position and a second endpoint when the window is in the open position for the window; and a controller configured to store the first and second endpoints, and thereafter use the endpoints to control the actuator to stop in either the first or the second endpoint when desired by a user.

The actuator may consist of an electric motor in combination with a gear. The controller may use the number of turns of the motor between the endpoints to determine when to stop the actuator at either endpoint. The current sensor, processor and controller may also be configured to detect blockage of window movement and automatically stop the actuator in order to prevent harm to the mechanism or the user. The user may program the controller to stop at intermediate points between the first and second endpoints. The mechanism may initially be set in an installation mode, with the endpoints automatically determined.

The user may select a calibration mode for the mechanism, wherein the endpoints are re-determined. The mechanism may further be configured to automatically enter a calibration mode in response to the mechanism being disengaged and reengaged.

The invention may further include a non-volatile memory for storing data, the data including stored settings and calendar data, wherein the stored settings include factory preset data; a performance sensor that provides performance data, wherein the performance sensor senses at least one of electrical performance and mechanical performance of the actuator.

The processor may determine a first set of operating parameters associated with the actuator based on the performance data and at least one of the factory data and first remote data from a remote sensor; determine a control command for operating the actuator based on the first set of operating parameters; determine a second set of operating parameters associated with the actuator based on the performance data and at least one of the factory data and second remote data from the remote sensor; determine that a difference between the second set of operating parameters and the first set of operating parameters exceeds a threshold; modify the control command based on the determined difference; and transmit the modified control command to the controller.

The processor may store the first set of operating parameters in the non-volatile memory as baseline data; store the control command in the non-volatile memory; store the second set of operating parameters in the non-volatile memory; and store the modified control command in the non-volatile memory. The processor may also receive performance data from the performance sensor; receive remote data from the remote sensor, wherein the remote sensor is included in a remote device that is located in a separate location than the actuation device.

The performance sensor may provide performance data, and the performance sensor may monitor a set of baseline performance parameters associated with the actuator during a first time period, and the performance sensor may monitor a set of real time performance parameters associated with the actuator during a second time period.

The processor may also store the baseline performance parameters in the non-volatile memory as performance base data; store the real time performance parameters in the non-volatile memory as real time data; and determine that a performance difference between the baseline performance parameters and the real time data exceeds a threshold, wherein the determined difference includes the performance difference. The processor may further identify an anomaly in the expected mechanical or electrical behavior of the actuator based on the determined performance difference; transmit a trouble signal to another device; wherein the trouble signal includes data describing one or more defining characteristics of the anomaly. A modified control command may compensate for the anomaly. The modified control command may cause the controller to send at least one modified signal to the actuator that causes the actuator to at least one of speed up, slow down, or stop in order to compensate for the anomaly.

The performance sensor may include at least one of an electrical sensor; mechanical sensor; transducer; electromagnetic; electrochemical; electric current; electric potential; magnetic; radio; accelerometer; pressure; electro-acoustic; electro-optical; photoelectric; electrostatic; thermoelectric; radio-acoustic; electrical resistance; mechanical resistance; position resolver, optical encoder, capacitive encoder, Hall-effect device, incremental encoder, absolute encoder, absolute transducer of position, capacitive encoder, PIR, pyroelectric, magnetic field, vibration, motor speed, frequency, rotation, torque, ultrasonic, temperature, velocity; position; angle; displacement; or combinations thereof.

The invention may include a network device that communicates to a plurality of actuation devices within an actuation system. The network device may also include a wireless transmitter and wireless transceiver and have a connection to each network device of the one or more actuated devices. The connection may include a wired or wireless interface such as Bluetooth, WIFI, mesh network or similar wireless protocol.

The processor may receive user data from one or more user input devices. The input devices may include a user interface for receiving the user input from a user, and may include a mobile device capable of wirelessly transmitting and receiving a signal. The mobile device may have a connection to the actuation device; and may be a cell phone, satellite phone, smartphone, personal digital assistant, tablet computer, laptop computer, remote control device, mobile transmitter, a mobile internet device or a combination of one or more of the same.

The performance sensor may be at or adjacent to the actuator; and may convert sensor data to an electrical signal. The performance sensors may include at least one of: electromagnetic; electrochemical; electric current; electric potential; magnetic; radio; air flow; accelerometers; pressure; electro-acoustic; electro-optical; photoelectric; electrostatic; thermoelectric; radio-acoustic; environmental; moisture; humidity; fluid velocity; position; angle; displacement; or combinations thereof.

The remote data may be transmitted from a remote system located in a separate part of a room, building, or outside of a building. The remote system may include at least one of a weather station, security system, wireless remote sensor device, fire alarm system, HVAC system, building control system, manufacturing control system, monitoring system; control system, or combinations thereof, wherein the remote sensors convert sensor data to an electrical signal. The remote sensors may include at least one of: electromagnetic, electrochemical, electric current, electric potential, magnetic; radio, air flow, accelerometers, pressure, electro-acoustic, electro-optical, photoelectric; electrostatic, thermoelectric, radio-acoustic, environmental, moisture, humidity, fluid velocity, position, angle, displacement, or combinations thereof.

The processor may communicate with a cloud-based network and mirror the stored settings and calendar data with the cloud based network by sending and receiving system data to and from the cloud-based network. The system data may include all data in the non-volatile memory.

The remote data may include weather data, and the remote data from the remote sensors and remote systems. This data may be relayed to the actuation device via the cloud-based network.

The processor may determine a remote command based on at least one of the remote data, the stored settings, calendar data, and as directed by predefined user settings, or combinations thereof. The processor may transmit the remote command to the controller. The processor may further monitor usage data of the actuator and provide the usage data to a disparate device.

The actuator may include one or more of electric motors, gearboxes and one or more mechanical means of incrementally opening, closing, tilting, turning, twisting, sliding, pushing, pulling, and rotating one or more components of the actuated device.

The automated window mechanism may also include an electrically powered actuator configured to move a slidable window between a closed position and an open position; a power source, providing power to the actuator; two or more sensors, each configured to generate signals related to a different environmental condition; and a controller adapted to receive the signals from the one or more sensors and operate the actuator to move the slidable window to an open or closed position as appropriate.

The smart device may wirelessly communicate to the controller, and the smart device running an app may also receive and process information from online sources.

The one or more communication systems may receive instructions from the external remote controller, generate signals instructing the first motor to rotate in a direction, receive signals from the first motor regarding a status of the first motor, and generate a signal informing the external remote controller of the status of the first motor.

The automated window mechanism may include a network device connecting the automated window mechanism to one or more additional automated window mechanisms forming a system of networked mechanisms.

The user's smart device may be connected to each network device of the one or more automated window mechanisms; the connection may include a wired or wireless interface; and the wireless interface may include Bluetooth, WIFI, mesh network or similar wireless protocol. The wireless interface may be a wireless Bluetooth mesh connecting the one or more motorized windows and may enable the automated window mechanisms to be fully functional and able to operate all system functions based on stored settings and sensor data from the two or more sensors without input from the user or the cloud-based network.

The stored settings may include factory presets, calendars, charts, user input data, sensor data and scheduled data. The two or more sensors may include at least one of a remote sensor and a local sensor. The local sensor may be in close proximity to the automated window mechanism, within two feet of it. The remote sensor may be located outside the building or at location more than two feet from the automated window mechanism.

Real-time data including weather data, and sensor data from the remote sensors and remote systems may be relayed via a cloud-based network to the system. The real-time data may modify and update the calendars, the charts and the scheduled data. The real-time data may also be used to control the system as directed by predefined user settings and the stored settings.

Each automated window mechanism within the system may be fully autonomous and operational without any connection to other automated window mechanisms in the system.

Sensor data from all automated window mechanisms within the system of networked mechanisms may be reported to the controller of each automated window mechanism in the system.

The invention may also include an automated window system. The automated window system may include one or more motorized windows. Each motorized window may include one or more actuators. The automated window system may also include a controller controlling the one or more actuators; non-volatile memory for data storage; data including stored settings and system data; one or more user input devices receiving user input data; a network device communicating to all the motorized windows in the automated window system; one or more sensors including local sensors at each motorized window and a remote sensor; and a processor The processor may receive sensor data from the one or more sensors; receive remote data from a cloud based network; determine a control command based on the sensor data, the stored settings, and the remote data. The processor may transmit the control command to the controller.

The processor may receive a user input from the one or more user input devices which may include a mobile device with a user interface for receiving the user input from a user. The processor may determine the control command based on the sensor data, the stored settings, the remote data, and the user input; and store system data and user input data in the non-volatile memory. The processor may mirror the stored settings with the cloud-based network by sending and receiving data to and from the cloud-based network. The processor may also receive command signals from the cloud-based network; transmit the sensor data to the cloud-based network; and transmit system data to the cloud-based network.

The one or more actuators may include one or more of electric motors, gearboxes and one or more mechanical means of incrementally opening, closing, tilting, turning, twisting, sliding pushing, pulling, and rotating one or more components of the one or more motorized windows.

The mobile device may have a wired or wireless connection to each network device of the one or more motorized windows; and the wireless connection may include Bluetooth, WIFI, mesh network or similar wireless protocol. The one or more motorized windows may be connected via the wireless Bluetooth mesh; and the automated window system may be fully functional and able to operate all system functions based on the stored settings and sensor data without input from the user or the cloud-based network.

Each network device and each mobile device within the mesh network may broadcast global data to all network devices within the network. The global data may include data applicable to all network or mobile devices within the mesh network, and may be organized in one or more data groups, each data group including data specific to each individual network or mobile device. Monitoring and control of each individual network or mobile device may only respond to only the specific data associated with that individual network or mobile device.

The user settings changed by a user on one mobile device of the one or more mobile devices during a time period when the one mobile device is out of range of the wireless interface may be stored in internal non-volatile memory of the one mobile device for upload to the system once the user is within range of either the cloud-based network or the network device.

Primary control of the individual network device may be based on local control by the controller of the individual network device. Secondary control may be from the cloud-based network. Direct user control supersedes both the primary control and the secondary control.

The system may be controlled by or via the cloud-based network. The processor may create a passkey based on the one or more user inputs. The passkey may restrict levels of permission for a specific user to allow only control actions and only settings changes specified by a master user. The stored settings may further include factory presets, calendars, charts and scheduled data informing the processor.

Real-time data including weather data, and sensor data from the remote sensors and remote systems may be relayed via the cloud-based network to the system. The real-time data may modify and update the calendars, the charts and the scheduled data. The real-time data may also be used to control the system as directed by predefined user settings and the stored settings.

In order to reduce the energy required to provide power to a wireless automated motorized window system, a wireless hub-based system may be implemented which reduces the power requirements. There are two power levels required for this system, the hubs have the higher bandwidth and extended wireless range that service the lower powered low-bandwidth devices at the motorized windows. The hubs may be separate from the motorized windows or may be incorporated at the motorized window. Most of the motorized windows in this system do not require high powered hubs since they are using a low power, low bandwidth wireless system. In some embodiments, the motor includes one or more communication systems. These may include Bluetooth communication chips, Internet Wi-Fi transceivers, network transceivers, a Z-Wave network transceiver, or a combination thereof. In some embodiments, the one or more communication systems communicate with an external remote controller. In some embodiments, the one or more communication systems receive instructions from the external remote controller, generate signals instructing the motor to rotate in a direction, receive signals from the motor regarding a status of the first motor, and generate a signal informing the external remote controller of the status of the motor. In some embodiments the external remote controller communicates with or is connected to a home automation service, such as those devices and systems offered by Nest Labs (it will be obvious that there are many options for home automation, any of which will perform similar functions to those from Nest Labs) is used only as an example). In some embodiments the one or more communications systems communicate with the home automation device. The home automation device is capable of measuring many conditions that are present in a home. These include internal and external temperatures, carbon monoxide levels, carbon dioxide levels, the presence of smoke, and many other conditions. In some embodiments the sliding window motor and the home automation device are configured to open the window when carbon monoxide is detected. In some embodiments the sliding window motor and the home automation device are configured such that the home automation device can determine whether opening or closing the window will cool the home.

In some embodiments, the motor includes one or more communication systems. These may include Bluetooth communication chips, Internet Wi-Fi transceivers, network transceivers, a Z-Wave network transceiver, or a combination thereof. In some embodiments, the one or more communication systems communicate with a smart device such as a smartphone or tablet. In some embodiments, the one or more communication systems receive instructions from the smart device, generate signals instructing the motor to rotate in a direction, receive signals from the motor regarding a status of the first motor, and generate a signal informing the smart device of the status of the motor.

In a first embodiment of the invention, a system for controlling a motorized window in accordance with the invention may include a mobile device which has an application installed on the mobile device. The application receives a user command and sends the user command to a first hub. The first hub may include a local area network (LAN) interface; a personal area network (PAN) interface; a gateway, wherein the gateway converts LAN protocol to PAN protocol; a server including a processor and non-volatile memory. The processor may be configured to: receive the user command from the mobile device via the LAN interface; determine that the user command is a real time control; and send the user command to the motorized window via the PAN interface. The system may also include a motorized window which includes: a PAN interface; an actuator; and a server which includes a processor and non-volatile memory. The motorized window processor may be configured to: receive the user command from the first hub via the PAN interface; and actuate the motorized window based on the user command. The PAN and LAN interfaces may utilize wired ethernet.

In a second embodiment of the invention, a system in accordance with the invention may include at least one subordinate hub. The subordinate hub may include a local area network (LAN) interface; a personal area network (PAN) interface; a gateway, wherein the gateway converts LAN protocol to PAN protocol; and a server including a processor and non-volatile memory. The processor may receive the user command from the mobile device via the LAN interface; determine that the user command is a real time control; and send the user command to the motorized window via the PAN interface. The first hub processor may assign control of a specific motorized window to a specific subordinate hub.

In a third embodiment of the invention, the assignment of which motorized windows are assigned to which hubs may be determined by the received signal strength indicator (RSSI) of each motorized window's PAN interface. The hub which receives the strongest RSSI from a specific motorized window when compared to the other hubs, may be assigned to that specific motorized window.

In a fourth embodiment of the invention, a first connected subordinate hub in accordance with the invention may become a new first hub upon failure of an original first hub. After the failure of the original first hub, the assigned control may be managed by the new first hub.

In a fifth embodiment of the invention, the motorized window non-volatile memory may store data in the form of factory settings and user settings specific to the motorized window.

In a sixth embodiment of the invention, a system in accordance with the invention, the motorized window may also include one or more sensors that produce sensor data.

In a seventh embodiment of the invention, the system in accordance with the invention may include a cloud-based network. The factory settings, the user settings and the sensor data may be stored in the non-volatile memory of the cloud-based network. The cloud-based network processor may also: determine a cloud control command based on the user command, the sensor data, the factory settings, and the user settings; and transmit the cloud control command to the first hub.

In an eighth embodiment of the invention, the sensors in accordance with the invention may convert sensor data to an electrical signal. The sensors may include at least one of: electromagnetic; electrochemical; electric current; electric potential; magnetic; radio; air flow; accelerometers; pressure; electro-acoustic; electro-optical; photoelectric; electrostatic; thermoelectric; radio-acoustic; environmental; moisture; humidity; fluid velocity; position; angle; displacement; or combinations thereof.

In a ninth embodiment of the invention, an actuator in accordance with the invention may include one or more of electric motors, gearboxes and one or more mechanical means of incrementally opening, closing, tilting, turning, twisting, sliding pushing, pulling, and rotating one or more components of the motorized window.

In a tenth embodiment of the invention, the PAN interface in accordance with the invention may include Bluetooth, Bluetooth mesh or similar wireless protocol. The LAN interface in accordance with the invention may include WIFI or similar high speed, high bandwidth wireless protocol. The LAN or PAN interface may be wired.

In an eleventh embodiment of the invention, user settings in accordance with the invention may include calendars, charts and scheduled data. Real time data including weather data, and sensor data from remote sensors and remote systems may be relayed via the cloud-based network to the system; and the real-time data may modify and update the calendars, the charts and the scheduled data. In accordance with the invention, the remote systems may include at least one of weather stations, security systems, fire alarm systems, remote monitoring systems, control systems, or combinations thereof. The real time data may be used to control the system as directed by the user settings and the factory settings.

In a twelfth embodiment of the invention, the mobile device in accordance with the invention may include a cell phone, satellite phone, smartphone, personal digital assistant, tablet computer, laptop computer, remote control device, mobile transmitter, a mobile internet device or combinations thereof.

In a thirteenth embodiment of the invention, the motorized window in accordance with the invention may include one or more of: sliding windows; hinged windows; windows or shutters with partially or fully opaque material, windows with clear glass or combinations thereof. In another embodiment, the system may further include one or more batteries and one or more solar photovoltaic panels.

In a fourteenth embodiment of the invention, an apparatus in accordance with the invention may include an actuator configured to electromechanically operate a motorized window. A controller, incorporated into the motorized window, may be provided to control the actuator. A temperature sensor may communicate with the controller and monitor temperature proximate a window associated with the motorized window. The temperature sensor may monitor the temperature of the window, temperature external to the window, temperature internal to the window, temperature within a headrail of the motorized window, or the like. The controller may further be configured to relay at least one of commands and information to an HVAC controller to regulate room temperature in accordance with the monitored temperature.

In a fifteenth embodiment of the invention, a system in accordance with the invention may include motorized windows. Each motorized window may include: user input devices; actuators; a controller; a processor; non-volatile memory for data storage; stored settings in the non-volatile memory; a network device; wireless transmitters and receivers; and sensors. An embodiment may further include a mobile device with a user interface for receiving user inputs from a user. The system may also include a cloud-based network which stores user inputs, obtaining user inputs from the user input devices. An embodiment may further include sensors that transmit sensor data to the processor, non-volatile memory and the cloud-based network. The processor may inform the controller based on the user inputs, the sensor data and the stored settings; and the controller may then control the operation of the motorized windows by actuating at least one actuator.

In a sixteenth embodiment of the invention, the cloud-based network in accordance with the invention may include mirrored settings which mirror the stored settings in the non-volatile memory. The cloud-based network may further include processor functions, the processor informing the controllers of the motorized windows.

In a seventeenth embodiment of the invention, a system in accordance with the invention may include mobile devices that have a connection to each network device of the motorized windows. The connection may include a wired or wireless interface; and the wireless interface may include at least one of Bluetooth, WIFI, mesh network or similar wireless protocol or combinations thereof. The motorized windows may be connected via the wireless mesh and the window covering system may also be fully functional and able to operate all system functions based on the stored settings and sensor data without input from the user or the cloud-based network.

In a eighteenth embodiment of the invention may include a broadcasting system in accordance with the invention, wherein each network device within the mesh network broadcasts global data to all network devices within the network. The global data may include data applicable to all network devices within the mesh network. The global data may be organized in one or more data groups, each data group including data specific to each individual network device. Monitoring and control of each individual network device responds to only the specific data associated with that individual network device.

In a nineteenth embodiment of the invention, a system in accordance with the invention may include provisions for retaining changes to user settings for a mobile device that is out of range of the wireless interface to the system. The user settings changed by a user of a mobile device during a time period when the mobile device is out of range of the wireless interface may be stored in internal non-volatile memory of the mobile device for upload to the system once the user is within range of either the cloud-based network or the network device.

In a twentieth embodiment of the invention, a hierarchical system in accordance with the invention may include primary control of the individual network device based on local control by the controller of the individual network device. Secondary control may be from the cloud-based network and direct user control may supersede both the primary control and the secondary control. The system may be controlled by or via the cloud-based network as directed by the user. This setting may be selected by the user and stored in non-volatile memory under user settings for operation of the system in absence of any other system control direction.

In an twenty-first embodiment of the invention, an access control system in accordance with the invention may include passkeys for multiple users. The processor may create a passkey based on the first or master user inputs. The passkey may restrict levels of permission for a specific user to allow only control actions and only settings changes specified by the master user. The master user may define access restrictions for other system users based on permission levels defined by the master user.

In a twenty-second embodiment of the invention, a system in accordance with the invention may include stored settings that include factory presets, calendars, charts and scheduled data informing the processor. The real-time data may include weather data, and sensor data from remote sensors and remote systems that are relayed via the cloud-based network to the system. The real-time data may modify and update the calendars, charts and scheduled data. The real-time data may be used to control the system as directed by predefined user settings and stored settings.

In a twenty-third embodiment of the invention, the motorized windows in accordance with the invention may include at least one of: windows, louvers, doors or combinations thereof.

In a twenty-fourth embodiment of the invention, a system in accordance with the invention may include full autonomy of individual motorized windows within the system. Each motorized window within the system may be fully autonomous and operational without any connection to other motorized windows in the system.

In a twenty-fifth embodiment of the invention, a system in accordance with the invention may include a video display adapter, such as a USB or HDMI dongle, configured to generate a signal when a video display (e.g., a television, projector, etc.) is turned on or off. A controller may receive the signal and automatically actuate a motorized window in response to the signal. In certain embodiments, the motorized window may receive the signal directly from the video display adapter without requiring any intervening electronic devices.

In a twenty-sixth embodiment of the invention, an apparatus in accordance with the invention may include a gearbox assembly configured to electromechanically operate a motorized window. A controller, incorporated into the motorized window, may be provided to control the gearbox assembly. A security device, such as a camera, motion sensor, audio sensor, proximity sensor, impact sensor, or the like, may communicate with the controller and is configured to monitor security at a window associated with the motorized window. Such a security sensor may, for example, monitor opening and/or closing of the window, breaking of the window, or the like. In certain embodiments, operation of the motorized window is triggered in response to conditions sensed by the security device.

In a twenty-seventh embodiment of the invention, the cloud-based network in accordance with the invention may include mirrored settings which minor the stored settings in the non-volatile memory. The cloud-based network may further include processor functions, the processor informing the controllers of the motorized windows.

In a twenty-eighth embodiment of the invention, an apparatus in accordance with the invention may include a motor and a gearbox coupled to the motor and configured to actuate a motorized window. The gearbox may include an internal wall enclosing gears of the gearbox, and an external wall enclosing the internal wall and creating a cavity between the internal wall and the external wall. The external wall may be configured to support an output shaft extending from the internal wall.

In a twenty-ninth embodiment of the invention, an apparatus in accordance with the invention may include a motor and a gearbox coupled to the motor and including an output shaft configured to actuate a motorized window. A position encoder, directly driven by the output shaft, may be configured to measure at least one of an angular position and a number of rotations of the output shaft. The angular position and number of rotations may be used to calculate an angular position of worm drives, gears and/or an amount a motorized window is opened or closed.

In a thirtieth embodiment of the invention, the wired network interface may utilize ethernet protocol.

BRIEF DESCRIPTION OF THE DRAWINGS

In order that the advantages of the described devices, systems, and methods will be readily understood, a more particular description of the described devices, systems, and methods briefly described above will be rendered by reference to specific embodiments illustrated in the appended drawings. Understanding that these drawings depict only typical embodiments of the described devices, systems, and methods and are not therefore to be considered limiting of its scope, the devices, systems, and methods will be described and explained with additional specificity and detail through use of the accompanying drawings, in which:

FIG. 3A is an illustration showing an embodiment of three motorized windows, a first hub, and a mobile device wirelessly connected in accordance with the invention;

DETAILED DESCRIPTION

It will be readily understood that the components of the described devices, systems, and methods, as generally described and illustrated in the Figures herein, could be arranged and designed in a wide variety of different configurations. Thus, the following more detailed description of the embodiments of the described devices, systems, and methods, as represented in the Figures, is not intended to limit the scope of the described devices, systems, and methods, as claimed, but is merely representative of certain examples of presently contemplated embodiments in accordance with the described devices, systems, and methods. The presently described embodiments will be best understood by reference to the drawings, wherein like parts are designated by like numerals throughout. Throughout this specification references to "automated window" and "motorized window" are similar terms describing a window that has been motorized and automated. Every window referenced in this specification has both of these features (being automated and motorized). A window may be controlled by an actuator via a remote control device per the stated claims in this description when a motor or actuator is coupled with some form of automation via a controller.

Automatic opening and closing of sliding windows and sliding doors generally requires planning ahead and use of frames that are designed specifically for automatic sliding doors and automatic sliding windows. However, when automation of an existing installation is desired, a complete replacement of the existing frame is costly and requires more construction skill than the typical homeowner possesses. The devices, systems, and methods disclosed herein disclosed provide solutions to this issue. A motor installed on the sliding segment of the door or window is coupled by a gear to a gear track (as in a rack and pinion). The gear track is attached to one of the horizontal members of the frame. Rotation of the gear walks the gear along the gear track, causing the sliding segment to move from closed to open and back again. This solution is cost effective and requires minimal construction skill.

Figure 1A:
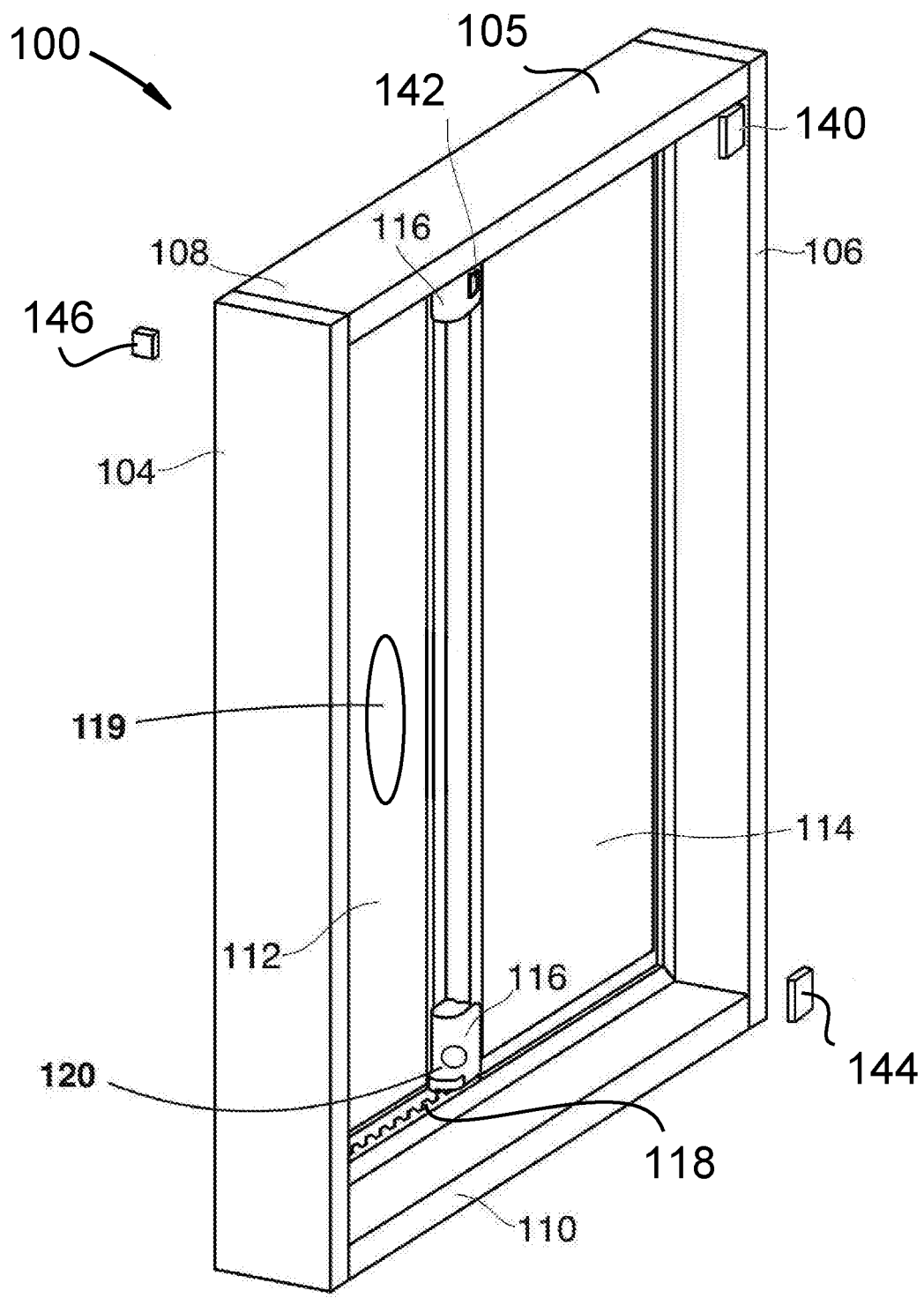
FIG. 1A shows an isometric top-left view of a motorized sliding segment in a frame.

Referring now to the Figures, FIG. 1A shows an isometric top-left view 100 of a motorized sliding segment 114 mounted slidably in a frame 105 that may be used in the described devices, systems, and methods. Sensor 140 is located on the frame near the sliding segment. Sensor 142 is inside or adjacent to the motor and controller. Sensor 144 may be inside the room on a wall or may be located elsewhere in the building. Sensor 146 is located on the outside the building.

The frame 105 may be a window frame, louver frame, or a door frame. The frame includes a fixed segment 112, top horizontal member 108, bottom horizontal member 110, left vertical member 104, and right vertical member 106. The track for the sliding segment 114 is offset from the fixed segment 112 so that the sliding segment can open and close. It is appreciated that before the addition of any motor assemblies 116, the sliding segment 114 is manually operated (the sliding segment 114 and frame 105 may be "dumb" or non-smart devices).

Motor assemblies 116 are affixed to the top and/or bottom of the left side of the sliding segment 114. Although two motor assemblies 116 are shown in FIG. 1, any number of motor assemblies 116 may be used, including just one motor on either the top or bottom of the sliding segment 114, the fixed segment 112, or the frame 105. While the left side is identified, it is appreciated that a motor assembly 116 may be affixed to any location on the sliding segment 114 without departing from the scope of the present systems, devices, and methods. Motor assemblies 116 may contain a motor, and one or more: gears; gearbox; transmission; worm drive; or combinations thereof, as described in various embodiments described in these drawings and specifications. Gear tracks 118 are affixed to the top and bottom horizontal members 108 and 110. The gears mesh with the teeth of the gear tracks 118. The motors turn the gears in a first direction, causing the gears to walk along the gear tracks 118, causing the slidable segment 114 to slide towards this vertical member. Rotation in the opposite direction walks the gears the other direction, pulling the slidable segment the other direction. In the present instance, the motor assemblies 116 are mirror images of one another, and so the motors turn opposite each other to walk the same direction. In other words, the motors are antiparallel to each other. In the present embodiment gear tracks 118 are designed to retrofit already installed windows, in this embodiment the tracks are designed to be applied directly to the horizontal members of the frame. There are a variety of methods for applying the gear tracks that include but are not limited to; adhesive applied to the side of the track without gear teeth, (a peel and stick option), fastening devices such as nails or screws, or slide on track that rests on the horizontal member with the teeth on one side and the other side being smooth. In another embodiment the gear track is molded into the horizontal member. In the current embodiment gear track 118 is depicted as being within the channel the slideable segment runs in, it should be noted that in another embodiment gear track 118 may be on the side of the horizontal member, thus facing into the room. In one embodiment the motors are powered by batteries, in certain embodiments they are rechargeable batteries, and are powered by solar cells 119. The solar cells 119 are oriented so that the photovoltaic portion is facing outside. In one embodiment the motor assembly includes a temperature sensor 144, for monitoring the temperature of the room.

Figure 1B:
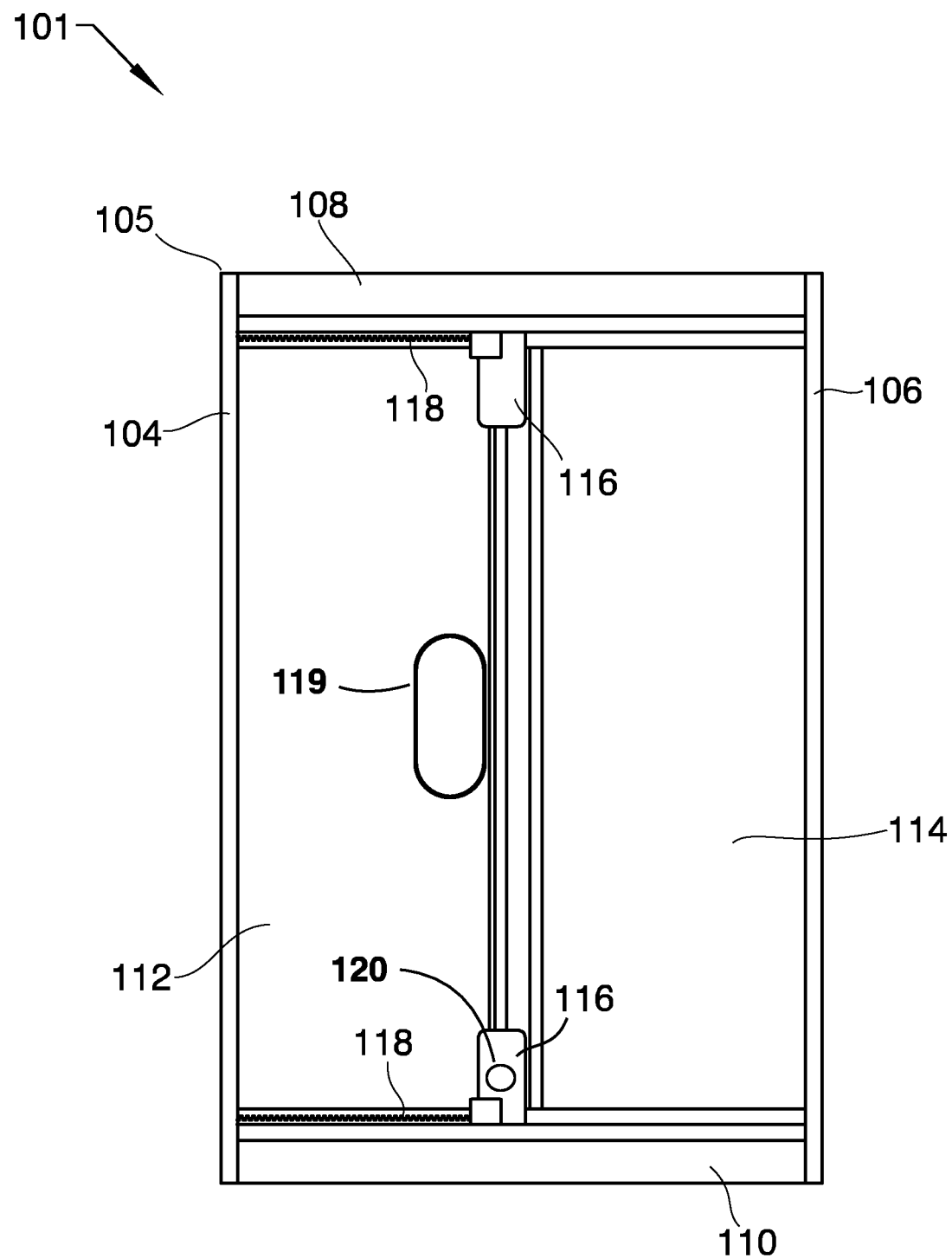
FIG. 1B shows a front isometric view of the frame of FIG. 1A.

FIG. 1B shows a front isometric view of the frame of FIG. 1A. In some embodiments, the motor assembly 116 includes a transmission (not shown). The transmission may include one or more gears that convert rotational speed to rotational torque for driving the gear that meshes with the teeth of the gear track. In some cases, the transmission is configured such that the transmission can only be driven by the motor of the motor assembly 116 (cannot be driven by the gear, for example). For instance, the transmission may include a worm gear that may be driven by the motor to drive the gear, but that locks the gear in place when the motor is not spinning (the gear cannot be used to turn the worm gear, for example). Thus, the transmission locks the slidable segment 114 in place in whatever position the slidable segment 114 is in. In contrast to typical locking mechanisms that only lock a slidable segment when the slidable segment is in a closed position, the transmission locks the gear in place in the teeth of the gear track in whatever place in the gear track that the gear is at. The slidable segment 114 may be locked in place when the slidable segment 114 is closed as with typical locking mechanisms but could also lock the slidable segment 114 in place when the slidable segment 114 is any degree of partly open or even fully opened. This feature may allow for the slidable segment 114 to be partly opened, while still providing security that the slidable segment 114 cannot be opened further or closed outside of an authorized user's control (when the motor is driven, for example). The transmission lock adds an element of home security to the window, a typical window frame will not lock in a partially open position, the transmission lock allows the window to be partially open, without the possibility of opening further. The ability to open a window, thus allowing air to flow in or out, while eliminating the possibility of opening the window further is feature many people are looking for. It can allow fresh air in without endangering the occupants or opening their possessions to theft. The transmission lock is at least as strong as the latch lock that is a part of sliding windows, in this way the transmission lock adds better safety with more options.

While some embodiments do not have coordinated motors 116 there are advantages to coordinated motors 116. In those embodiments with two motors 116, the top and the bottom of the window or door open together. In this way there is no tilting or canting of the slidable segment. With one motor 116 the top and bottom may not slide at the same rate, this can lead to tilting or canting of the slidable segment, if the slidable segment tilts or cants, the segment may bind, or get stuck, this can lead to damage to the motor assembly or the gear track, or even damage to the window. This effect becomes more pronounced the larger the window or door. While larger windows or doors have a greater tendency to tilt and bind, the effect is not exclusive to a large window or door, therefore coordinated motors on the top and bottom are preferred.

It will be noted that while the drawings depict a window that opens and closes in a horizontal orientation, the motor is capable of functioning with a window that slides in a vertical orientation. In the vertical orientation the motor or motors will be affixed to the side vertical members instead of the upper and lower horizontal members. The gear track will also be attached to the side vertical members. In the vertical orientation coordinating the motors becomes especially important so the sliding segment will raise and lower. When the motor or motors are not coordinated there is a greater chance of the sliding segment tilting or canting and binding up so the sliding segment will stick and no longer move. The motor connected to a vertically oriented sliding window will retain all the characteristics of the motor connected to a horizontally sliding window.

FIG. 1B shows a view 101 of a motorized sliding segment 114 mounted slidably in a frame 108 that may be used in the described devices, systems, and methods. FIG. 1B shows a front isometric view of the frame of FIG. 1A. The frame 105 may be a window frame or a door frame. The frame 105 includes a fixed segment 112, top horizontal member 108, bottom horizontal member 110, left vertical member 104, and right vertical member 106. The track for the sliding segment 114 is offset from the fixed segment 112 so that the sliding segment can open and close.

Motor assembly 116 is affixed to the bottom of the left side of the sliding segment 114. Motor assembly 116 contains a motor and a gear, as described in FIG. 2. A gear track 118 is affixed to the bottom horizontal member 110. The gear meshes with the teeth of the gear track 118. The motor turns the gear in a first direction, causing the gear to walk along the gear track 118, causing the slidable segment 114 to slide towards this vertical member. Rotation in the opposite direction walks the gear the other direction, pulling the slidable segment the other direction.

In some embodiments, the motor assembly 116 includes a transmission (not shown). The transmission may include one or more gears that convert rotational speed to rotational torque for driving the gear that meshes with the teeth of the gear track. In some cases, the transmission is configured such that the transmission can only be driven by the motor of the motor assembly 116 (cannot be driven by the gear, for example). For instance, the transmission may include a worm gear that may be driven by the motor to drive the gear, but that locks the gear in place when the motor is not spinning (the gear cannot be used to turn the worm gear, for example). Thus, the transmission locks the slidable segment 114 in place in whatever position the slidable segment 114 is in. So in contrast to typical locking mechanisms that only lock a slidable segment when the slidable segment is in a closed position, the transmission locks the gear in place in the teeth of the gear track in whatever place in the gear track that the gear is at. So the slidable segment 114 may be locked in place when the slidable segment 114 is closed as with typical locking mechanisms but could also lock the slidable segment 114 in place when the slidable segment 114 is any degree of partly open or even fully opened. This feature may allow for the slidable segment 114 to be partly opened, while still providing security that the slidable segment 114 cannot be opened further or closed outside of an authorized user's control (when the motor is driven, for example). The transmission lock adds an element of home security to the window, a typical window frame will not lock in a partially open position, the transmission lock allows the window to be partially open, without the possibility of opening further. The ability to open a window, thus allowing air to flow in or out, while eliminating the possibility of opening the window further is feature many people are looking for. It can allow fresh air in without endangering the occupants or opening their possessions to theft.

In some embodiments the sliding window motor includes a portable fan that fits between the slidable portion 114 of the window and the window screen. The fan may be turned on to increase the amount of cool air pulled into the room when the sliding window motor opens the window. In some embodiments the portable fan is configured to automatically turn on when the sliding window motor opens the window.

In some embodiments, the motor has and is powered by one or more batteries. In other embodiments, the motor has and is powered by power lines. In some embodiments the motor is powered by solar power. The motor may be connected to In some embodiments, the slidable segment is slidably mounted by being between tracks on a top horizontal member of the frame and a bottom horizontal member of the frame, the tracks allowing the slidable frame to freely move side to side.

In some embodiments, the frame has a latching device that mates to a latching receiver attached to the slidable segment, wherein mating prevents movement of the slidable segment. In some embodiments, the latching receiver comprises a communication device that generates a signal when the latching device is mated and transmits that signal to the motor, wherein the signal deactivates the motor.

In some embodiments, the first gear track is attached to the horizontal member of the frame by adhesive, screws, nails, or a combination thereof. In some embodiments, the first motor assembly is mounted to the slidable segment by adhesive, screws, nails, or a combination thereof.

In some embodiments, the first gear track is attached in the track that the slidable segment slides in. In other embodiments, the first gear track is attached adjacent to the track that the slidable segment slides on.

In certain embodiments, the device interfaces with one or more other systems including security systems, safety systems and energy systems. Sensors inform the controller regarding conditions that may influence the operation of the device. For example, an entry sensor that senses an intrusion notifies the controller that in turn alerts a security system. The entry sensor may include a window or door switch, or a glass breaking sensor. The controller may further notify the home owner via the cloud-based network that there has been an intrusion.

In another embodiment, the security system may inform the controller to close and lock all of the windows and doors when the home owner is away on vacation. Information and user settings selected by the home owner inform the controller regarding how the device is to operate while on vacation.

In an embodiment, the controller sends control signals to the device to operate in such a way to assure the safety of occupants in the building. For example, CO detectors or smoke detectors may open windows upon detection of noxious gases. Ventilation fans at or near the window opening may also be turned on to actively promote the ventilation of these gases. Louvers or vents may also be opened to further ventilate the space. Other safety embodiments include closing all windows when air quality alerts indicate that exterior air is not healthy (red zone). This info may be relayed to the controller via the cloud-based network or from sensors. In an embodiment, the controller may close all windows, doors, louvers and shutters when high winds are in the area. This info may be determined by exterior sensors or weather reports via the cloud-based network.

In an energy embodiment, the controller may tie in with the building HVAC system in order to allow the HVAC system to open windows or louvers to let in cool air when the interior space is too hot. This allows the HVAC system to operate in an economizer mode when outdoor air temperature is cool so that the air conditioner does not have to be operated. This saves energy. Temperature sensors inside the building and outside of the building inform the controller. The fan of the HVAC system may be activated to draw air in through the open window (creating a negative air pressure within the building).

In certain embodiments, the opening and closing of windows is coordinated with a motorized window system. In the case of a motorized window system that is also automated, the blinds or motorized window may be opened when the window is opened. Air flow through the window opening may be reduced if the motorized window remains is partially closed. User selected schedules of operation may be coordinated between the motorized window operation and window opening device to assure maximum energy savings, and to coordinate the operation of each of these systems. For example, a west facing window during the Summer may need to remain closed and the motorized windows are also closed in the late afternoon to keep heat from entering the interior of the building on the west side. However, the exterior temperature on the east side of the building may be cooler than the interior of the building. In this case, the east windows and associated window coverings may be opened to allow the cool air from the east to enter the building.

In an embodiment, exterior humidity or moisture sensors may inform the controller that rain or a water from sprinkler system is near a window opening. The controller may then close windows that are open that may be impacted by the water intrusion. Weather reports from an online service may also inform the controller to enable this operation.

In another embodiment, sensors may be located inside or outside of the building at locations near the window, door or louver opening or far away. These sensors may inform the controller regarding conditions that impact the operation of the device. For example, temperatures at or near the window may be different than the outdoor temperature or the temperature in other parts of the building. Decisions regarding the opening and closing of a window may depend on not only the temperature at the window, but also other locations inside and outside of the building as explained in the west facing window example above.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

It will be readily understood that the components of the present invention, as generally described and illustrated in the Figures herein, may be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout. Throughout this specification references to "automated window" and "motorized window" are similar terms describing a window that has been motorized and automated. Every window referenced in this specification has both of these features (being automated and motorized). A window may be controlled by an actuator via a remote control device per the stated claims in this description is one with both some form of motor or actuator coupled with some form of automation via a controller. Other references to "actuator", "motor" and "motor assembly" are also referring to various embodiments of the same device. In some cases, the actuator includes a gearbox, transmission and worm drive for example. This device may be referred to simply as a "motor" or "motor assembly". In other cases, the device may comprise only a motor with no transmission for example.

Figure 1C:
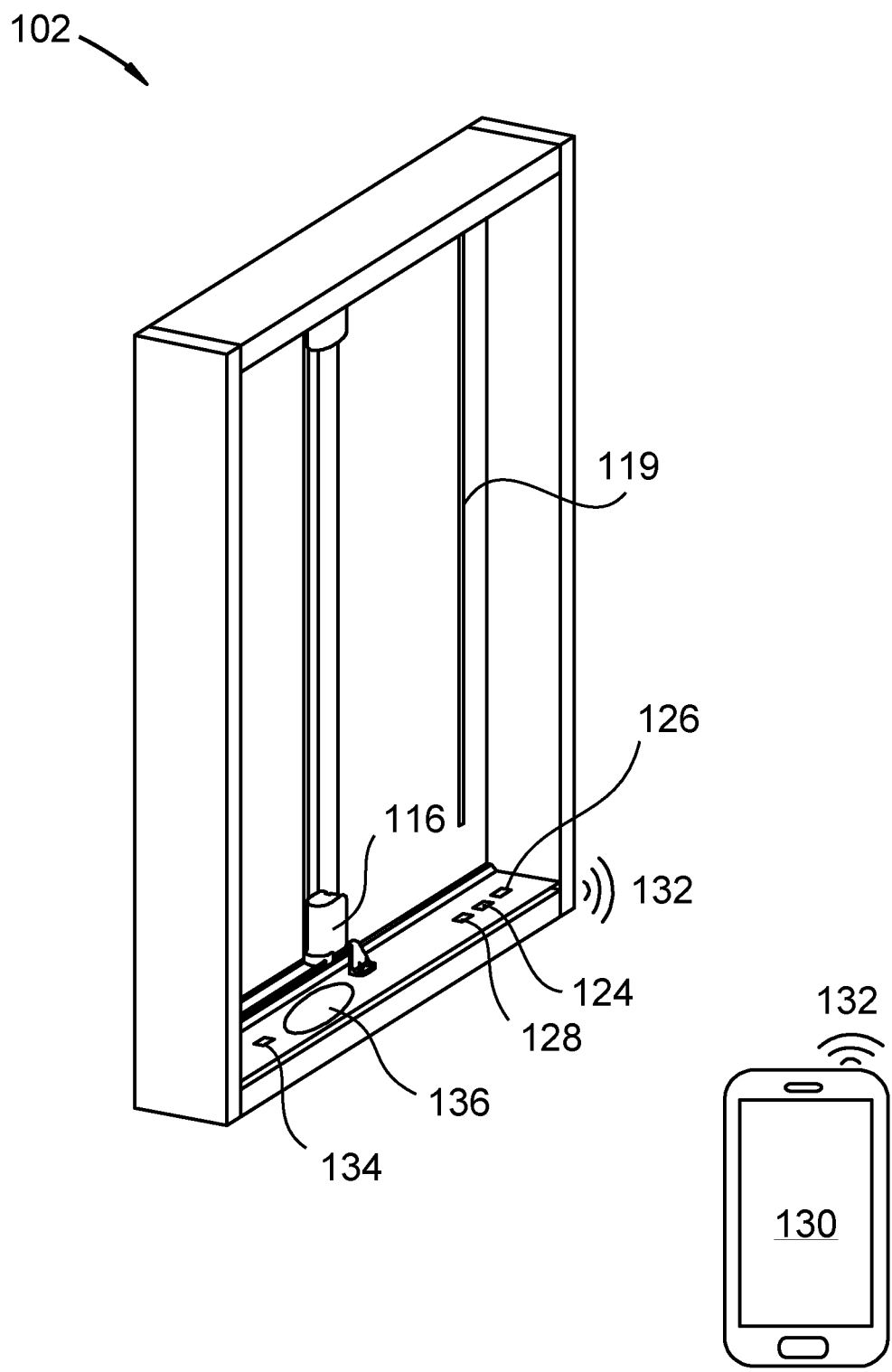
FIG. 1C shows an isometric top-left view of a motorized sliding segment in a frame with a mobile device for user interface.

Referring to FIG. 1C, a perspective view showing one embodiment of a motorized window and a mobile device in accordance with the invention is shown. The motorized window 102 is shown containing various components. In the illustrated embodiment, the motorized window 102 includes a controller configured to automatically open or close the motorized window 102. Examples of a user input device is shown as a mobile device 130.

FIG. 1C further illustrates system components as follows: A battery enclosure 136 for one or more batteries, actuator 116 which may include motors for opening and closing the window 102, processor 124, PAN interface 128, sensor 134, and solar photovoltaic panel 119. In this example embodiment, the motorized window further includes a first hub 126.

Mobile device 130, as shown in FIG. 1C, transmits and receives LAN wireless signal 132 from the first hub 126, allowing wireless control by a user of the system. The first hub 126 converts the LAN protocol to PAN protocol and communicates the signal to the PAN interface 128. The first hub may be either mounted inside the motorized window as shown or may be mounted in a separate location if required to serve multiple motorized windows.

The preferred embodiment for the PAN is Bluetooth communication which is present in most mobile devices such as cell phones, laptops or mobile computer tablets. The mobile device 130 may use either the PAN interface or the LAN interface to communicate to the motorized window 102. The preferred embodiment for the LAN is WIFI or similar high bandwidth, long range protocol. Depending on the distance between groups of motorized windows that are to be connected together on the network, hubs are provided to extend the connection to groups of motorized windows that are out of range of the PAN. Multiple hubs may be employed as required to extend the network to more than one group of PAN connected motorized windows.

The first time a user sets up the system, the processor will identify the user as a master user. The system will be pre-set from the factory with factory settings defining the general operation of the motorized window. Any changes to the factory settings may be saved by the master user, including permission settings for other users. The master user may allow other users to access all or only selected control of specific system settings or controls as defined by the master user. The master user may be prompted to fully open and fully close the window in order to establish end points or stop points to identify closed and open positions.

Processor 124 receives inputs from sensor 134, and from other sensors either at the motorized window 102, or sensors at other locations. The factory preset settings along with user settings direct the operation of the system. These settings are stored in the non-volatile memory for data storage, the non-volatile memory device or module being mounted to the same circuit board as the processor 124. As inputs are received from sensors, weather data, and other real-time data, the processor 124 consults the settings in non-volatile memory to determine what action, if any, to take. Calendars and schedules are also consulted prior to sending commands to a controller. Once the processor has determined that an action should be taken, appropriate command signals are sent to the appropriate actuator 116 as required.

PAN interface 128 connects each motorized window to other motorized windows in the system. The PAN interface 128 also connects the system to a building local network with connection to the internet for access to a cloud network.

For retrofit applications, the motorized window 102 may be retrofitted with an actuator 116 in accordance with the invention, various components of the motorized window 102 may be removed or replaced. The actuator 116 may be configured to engage and rotate a window opening mechanism of the motorized window 102 in order to tilt open the window.

Figure 1D:
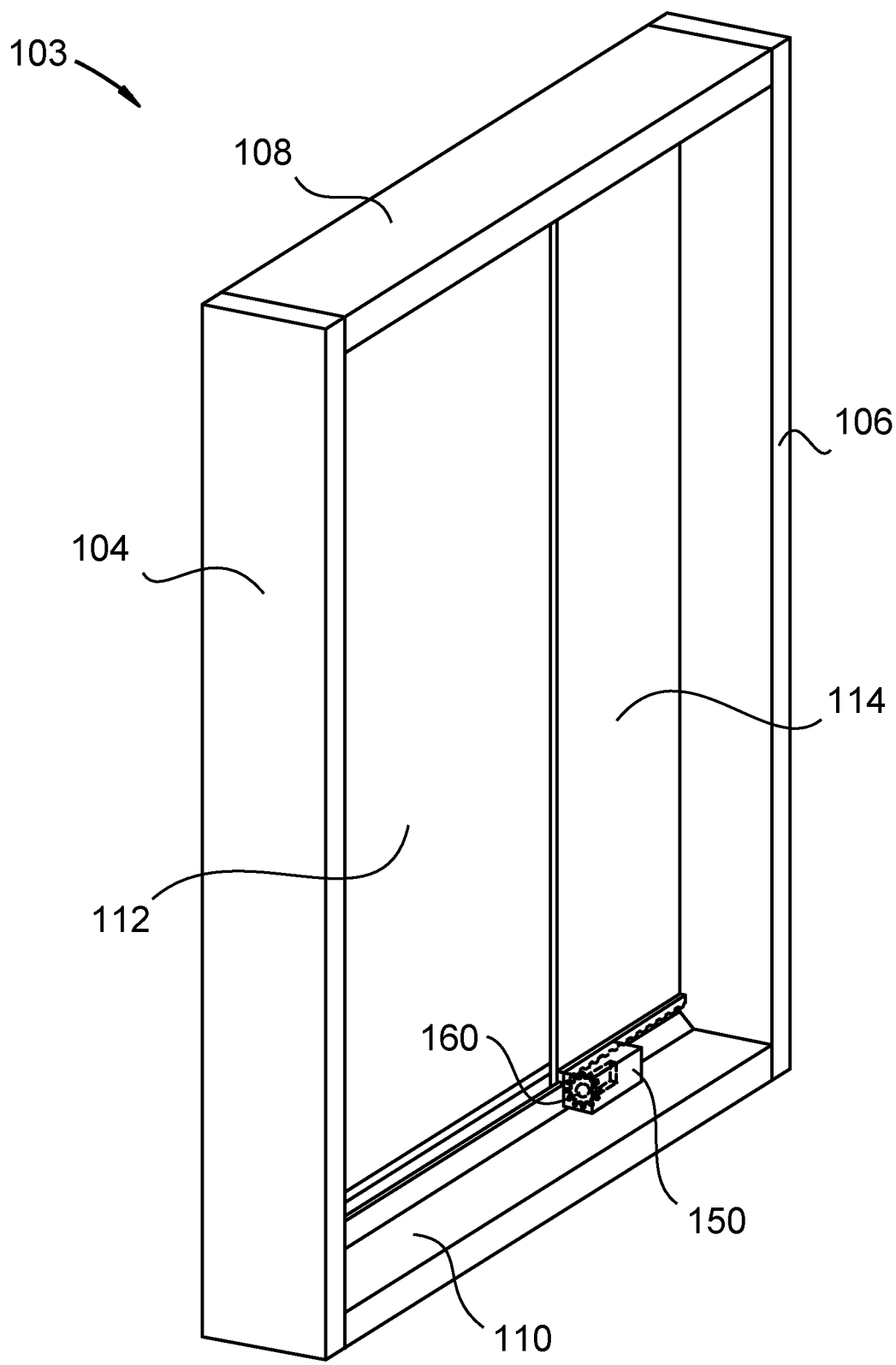
FIG. 1D shows an isometric top-left view of a motorized sliding segment in a frame with gear track mounted to slidable segment.

FIG. 1D shows an isometric top-left view of a motorized sliding segment in a frame with gear track mounted to slidable segment. In this embodiment, the fixed motor assembly 150 is mounted to the fixed window frame, and gear 160 engages with gear track 118. Although one fixed motor assembly 150 is shown in FIG. 1D, any number of fixed motor assemblies 150 may be used, including motors on the top horizontal member 108. In instances where the sliding segment 114 slides up and down, motor assemblies 150 may be mounted on either left vertical member 104 or right vertical member 106. While the bottom of the frame is identified, it is appreciated that a motor assembly 116 may be affixed to any location on the frame without departing from the scope of the present systems, devices, and methods. Motor assemblies 150 may contain a motor, and one or more: gears; gearbox; transmission; worm drive; or combinations thereof, as described in various embodiments described in these drawings and specifications. Gear tracks 118 may be affixed to the top and bottom horizontal members 108 and 110. The gears mesh with the teeth of the gear tracks 118. The motors turn the gears in a first direction, causing the gears to walk along the gear tracks 118, causing the slidable segment 114 to slide towards this vertical member. Rotation in the opposite direction walks the gears the other direction, pulling the slidable segment the other direction.

Figure 1E:
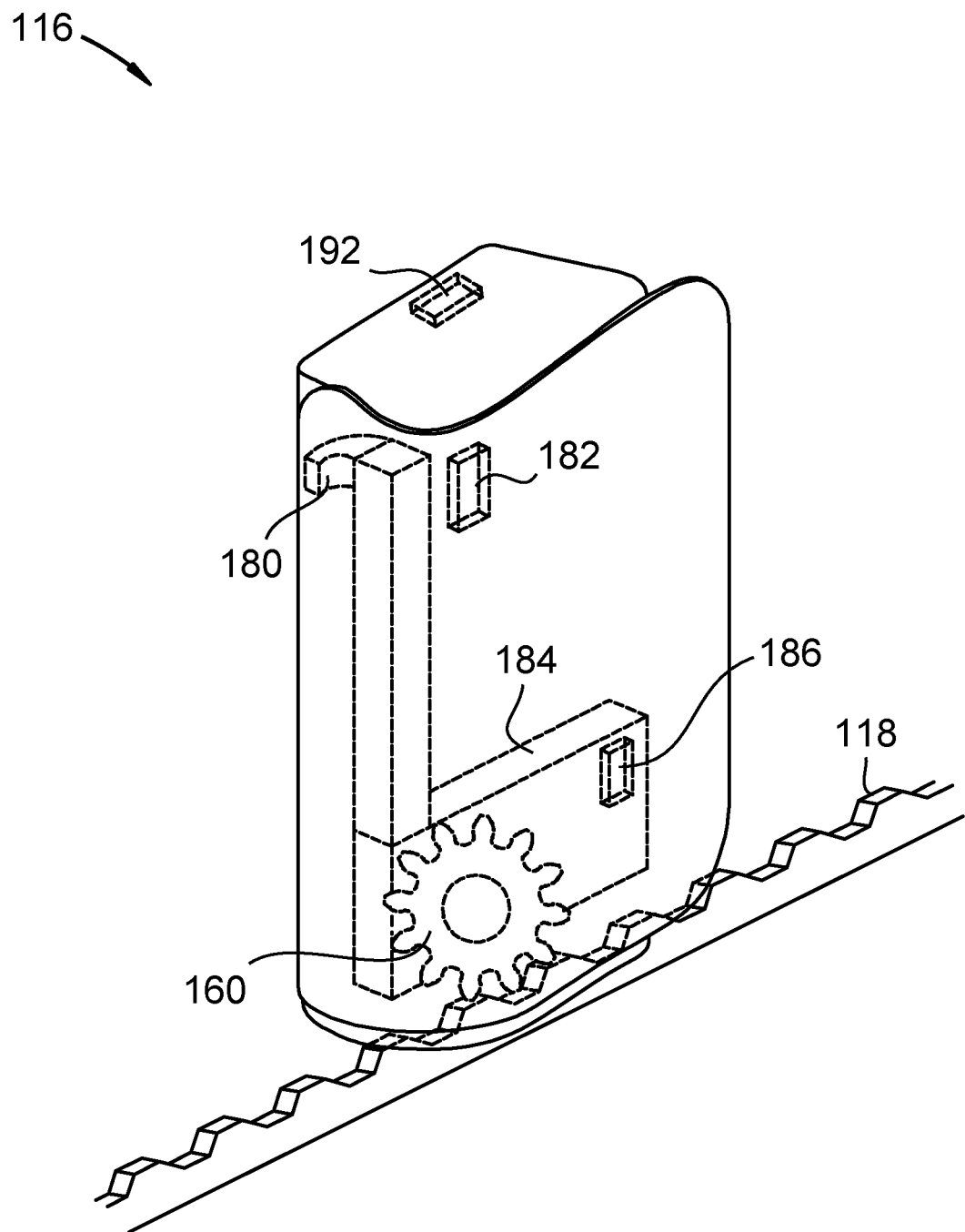
FIG. 1E shows an isometric view of one of the motor assemblies of FIG. 1A.

Referring to FIG. 1E, FIG. 1E shows a cutaway cross-sectional isometric view of one of the motor assemblies 116. The latching receiver 180 comprises a communication device 182 that generates a signal when the latching device 182 is mated and transmits that signal to the controller which generates a control signal that is sent to the motor gear box 184. In some embodiments, a control signal may deactivate the motor release mechanism which then automatically releases gear 160 from gear track 118, thereby allowing the slidable segment to be moved to an open position. This may be in response to an emergency condition as detected by at least one of the one or more sensors. The frame may also have a latching device that mates to a latching receiver 180 attached to the slidable segment, wherein mating prevents movement of the slidable segment. Release clasp 190 may allow a user to pull on the clasp to release, in response to an emergency condition which may then deactivate the motor release mechanism which then automatically releases gear 160 from gear track 118, thereby allowing the slidable segment to be moved to an open position. Sensor 192 and performance sensor 186 may send signals to the processor and controller.

Figure 1F:
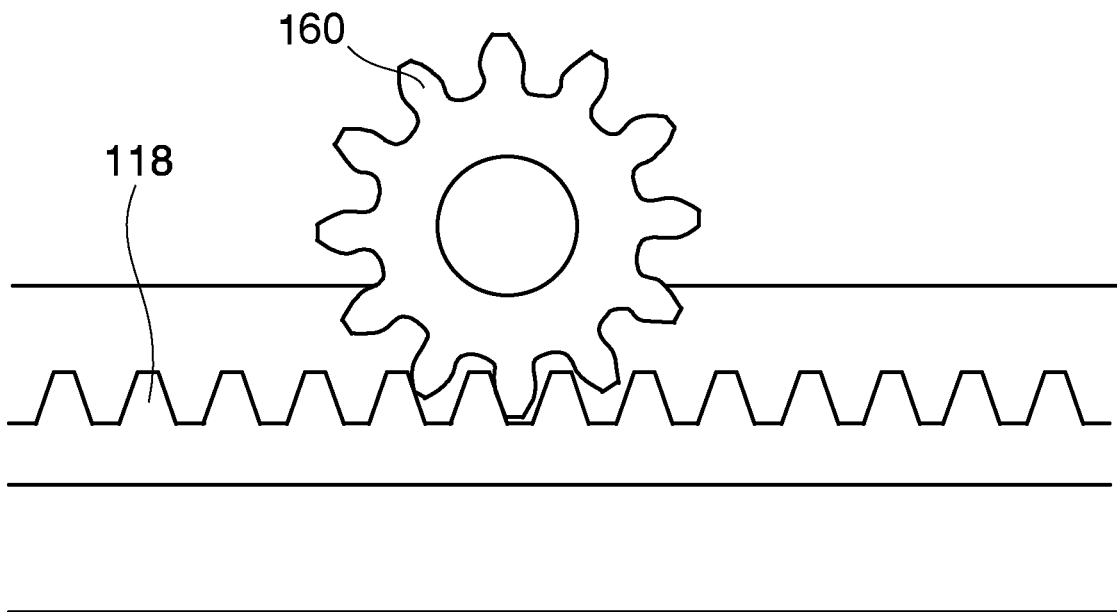
FIG. 1F is an illustration of a gear interfacing with a gear track.

Referring to FIG. 1F, FIG. 1F is an illustration of gear 160 interfacing with a gear track 118.

Figure 1G:
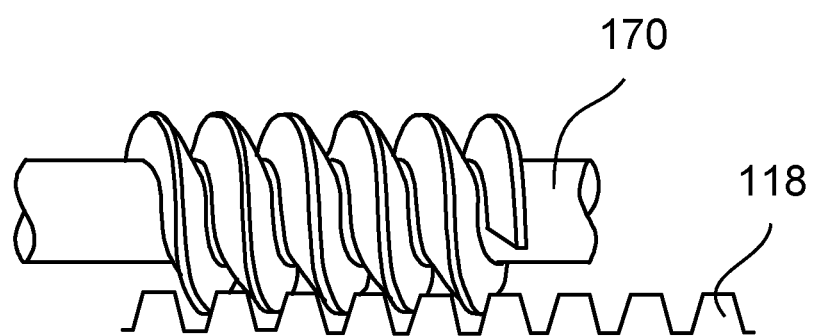
FIG. 1G is an illustration of a worm gear interfacing with a gear track.

Referring to FIG. 1G, FIG. 1G is an illustration of worm gear 170 interfacing with a gear track 118.

Figure 2A:
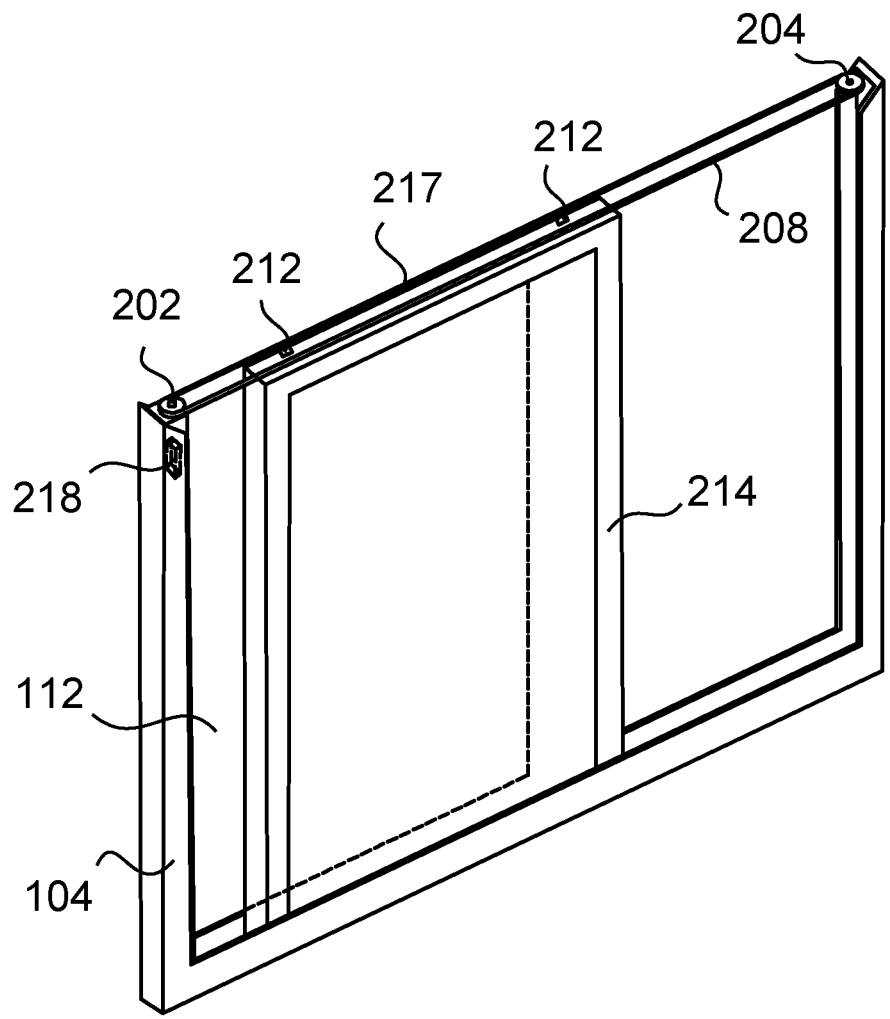
FIG. 2A shows an isometric view of one of the motor/pulley assemblies.

Referring to FIG. 2A, FIG. 2A shows an isometric view of one of the motor/pulley assemblies. In this embodiment, the motor assembly 218 is mounted inside left vertical member 104. The drive shaft from motor assembly is attached to first pulley wheel 202. Second pulley wheel 204 freely rotates to a shaft mounted to right vertical member 106. Belt 208 is a continuous belt that wraps around the first pulley wheel and the second pulley wheel. The belt 208 is attached in two places by "L" shaped brackets 212 to a top horizontal member of the slidable segment 214; Belt section 217 is attached to slidable segment 214 and moves with it. Motor assembly 116 drives the first pulley wheel 202 in a first direction causing the first pulley wheel to pull on the belt such that the slidable segment slides towards the first vertical member. Driving the first pulley wheel 202 in a second direction causes the first pulley wheel to pull on the belt such that the slidable segment slides towards the second vertical member.

Figure 2B:
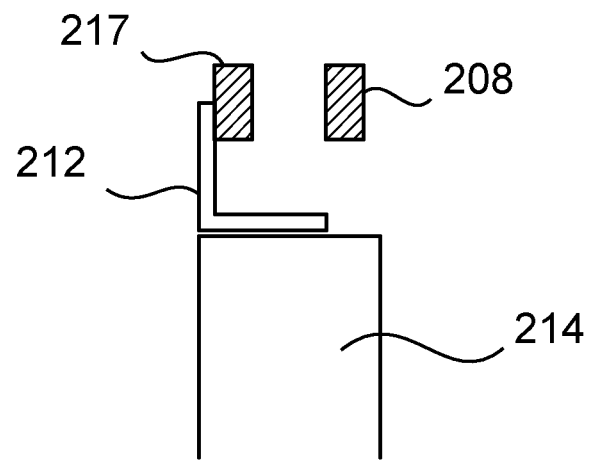
FIG. 2B shows a sectional view of the pulley belt.

Referring to FIG. 2B, FIG. 2B shows a sectional view of the pulley belt and top of slidable segment 214. Belt 208 moves freely above the slidable segment 214 as shown. Belt section 217 is attached to "L" bracket 212 to the top of slidable segment 214, enabling the belt to move slidable segment 214 in either direction when the motor is in operation.

Figure 2C:
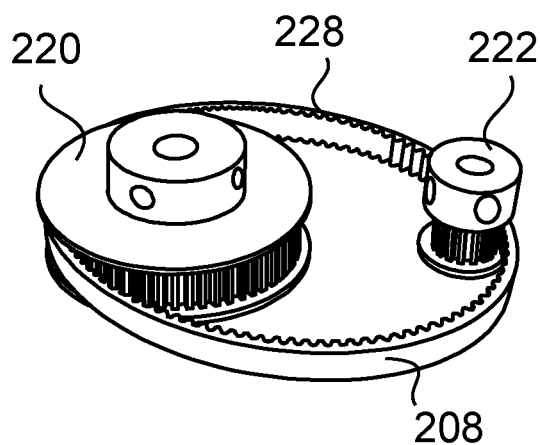
FIG. 2C shows a belt with teeth interfacing with pulley wheels with teeth.

Referring to FIG. 2C, FIG. 2C shows a belt 208 with teeth 228 interfacing with left pulley wheel 220 and right pulley wheel 222. In this example embodiment, both pulley wheels have teeth, and the belt 208 has teeth that interface with the pulley wheel teeth preventing the belt from slipping.

Figure 2D:
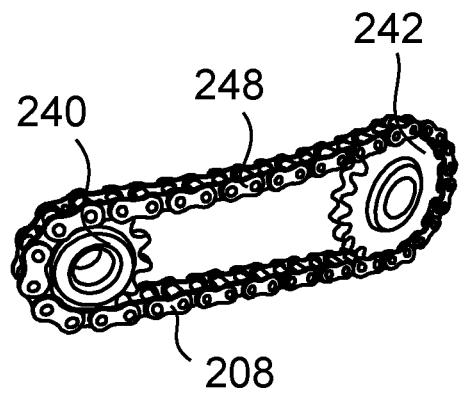
FIG. 2D shows a chain interfacing with pulley wheels with gear teeth.

Referring to FIG. 2D, FIG. 2D shows a chain 208 with chain links 248 interfacing with left pulley wheel 240 and right pulley wheel 242. In this example embodiment, both pulley wheels have gear teeth, and the chain 208 interfaces with the gears, preventing the belt from slipping.

Figure 2E:
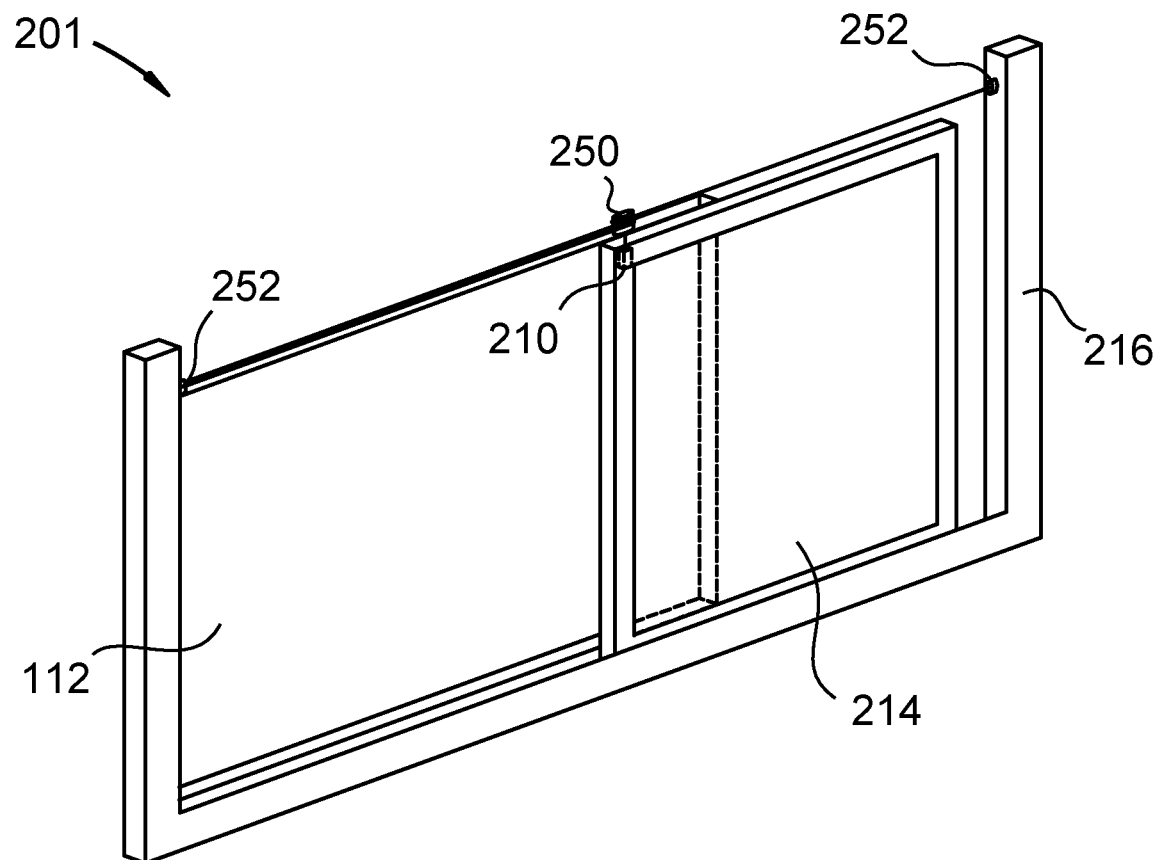
FIG. 2E shows an isometric view of one of the motor/pulley assemblies.

Referring to FIG. 2E, FIG. 2E shows an isometric view of the motor/pulley assemblies. In this embodiment, the motor assembly 116 is mounted inside the frame of slidable segment 214. The drive shaft from motor assembly is attached to third pulley wheel 250. One end of belt 254 is attached to left vertical member 104, wraps around third pulley wheel 250, and the other end of belt 254 is attached 252 to right vertical member 106. In this example embodiment, the motor moves together with the slidable segment 214. Motor assembly 116 drives the third pulley wheel 250 in a first direction causing the first pulley wheel to pull on the belt such that the slidable segment slides towards the first vertical member. Driving the third pulley wheel 250 in a second direction causes the third pulley wheel 250 to pull on the belt 254 such that the slidable segment 214 slides towards the second vertical member.

Figure 2F:
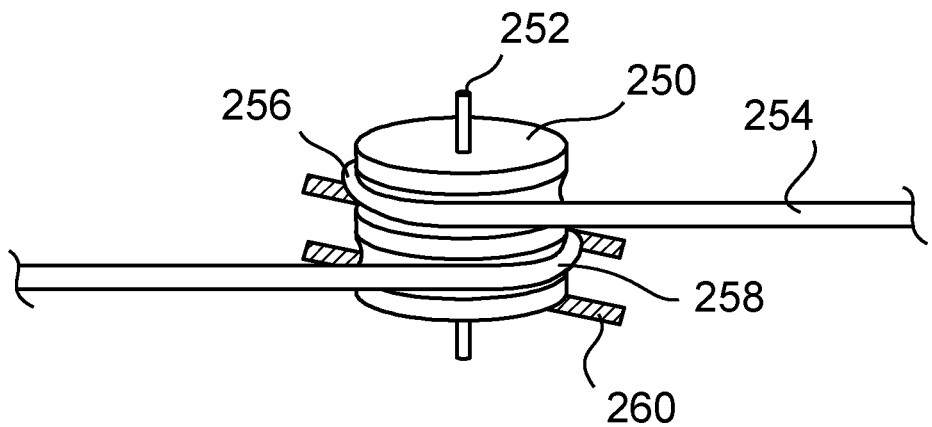
FIG. 2F is an illustration of a front view of a pulley wheel with guide tracks.

Referring to FIG. 2F, FIG. 2F is an illustration of a front view of a pulley wheel with guide tracks. Third pulley wheel 250 is driven by motor or drive system attached to shaft 252, driving belt 254 in one of two directions. Guide track 260 guides the belt 254 from a top position 256 as it enters the pulley wheel, belt 254 then wraps around third pulley wheel 250 and exits the pulley wheel at a lower position 258.

Figure 2G:
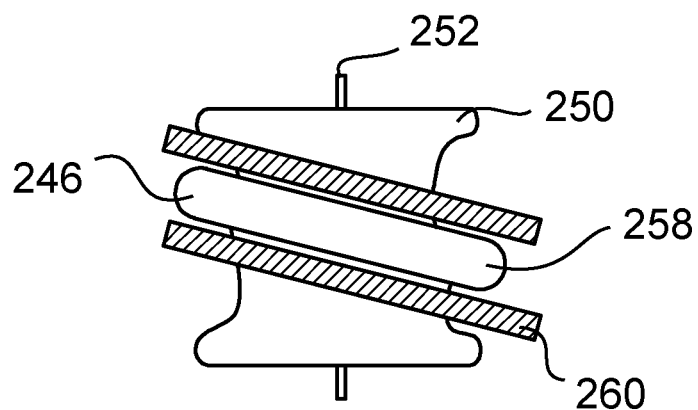
FIG. 2G shows a back view a back view of FIG. 2F.

Referring to FIG. 2G, FIG. 2G shows a back view a back view of FIG. 2F, illustrating how guide track 260 guides the belt from a top position 256 to a lower position 258 on the pulley wheel.

Figure 2H:
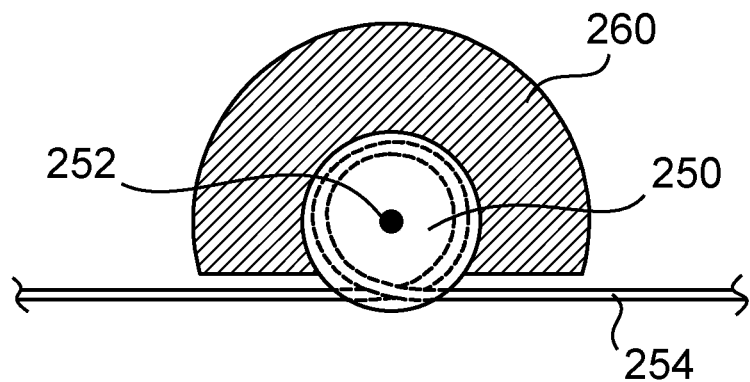
FIG. 2H shows an overhead view of FIG. 2F.

Referring to FIG. 2H, FIG. 2H shows an overhead view of FIG. 2F.

Figure 2I:
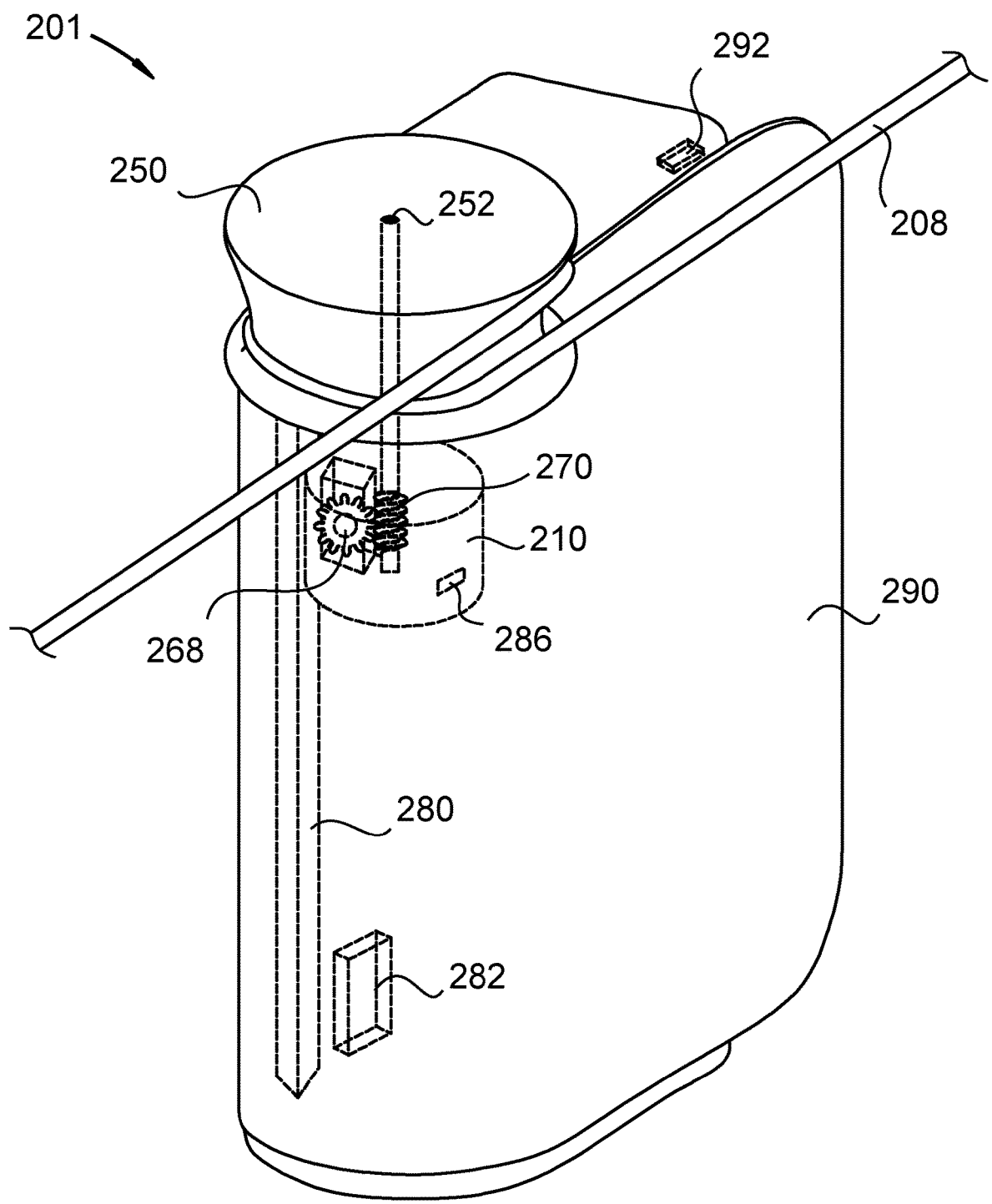
FIG. 2I shows an isometric view of one of the motor assemblies of FIG. 2A.

Referring to FIG. 2I, FIG. 2I shows a cutaway cross-sectional isometric view of one of the motor assemblies 116. The latching receiver 280 comprises a communication device 282 that generates a signal when the latching device 280 is mated and transmits that signal to the controller which generates a control signal that is sent to the motor gear box 210. In some embodiments, a control signal may deactivate the motor release mechanism which then automatically releases gear 268 from pulley shaft 270, thereby allowing the slidable segment to be moved to an open position. This may be in response to an emergency condition as detected by at least one of the one or more sensors. The frame may also have a latching device that mates to a latching receiver 180 attached to the slidable segment, wherein mating prevents movement of the slidable segment. Release clasp 290 may allow a user to pull on the clasp to release, in response to an emergency condition which may then deactivate the motor release mechanism which then automatically releases gear 268 from pulley shaft 270, thereby allowing the slidable segment to be moved to an open position. Sensor 292 and performance sensor 286 may send signals to the processor and controller.

Referring to FIG. 3A, Mobile device 130 communicates to the LAN interface 311 in first hub 126 via wireless signal 132. User commands are relayed to the LAN from an app on the mobile device. The gateway 314 converts the LAN protocol messages to PAN protocol messages and relays the user command via the hub PAN interface 312 to the motorized window PAN interface 128. First hub server 316 comprises a processor 318 and non-volatile memory 320.

FIG. 3A further shows the communication between three motorized windows via PAN wireless signals 304. Motorized window 335 receives PAN wireless signals 304 from first hub 126 and relays command to processor 124 which sends a control signal to actuator 116. User commands from the mobile device 130 for motorized window 337 and motorized window 339 are relayed via the PAN wireless signals 304 from the first hub 126 to the specified motorized window identified in the user command. For example, a user command to motorized window 339 is sent from mobile device 130 via LAN wireless signal 132 to first hub 126, where the signal is converted to a PAN wireless signal 304 that is transmitted to motorized window 339 for control of that specific motorized window. A signal may also be passed through from one motorized window to another over the PAN. For example, a user command specific to motorized window 339 may be transmitted first to motorized window 335. Upon determination that the user command does not apply to motorized window 335, the user command may be forwarded to motorized window 339 via the PAN Bluetooth mesh network as a pass-through command.

Figure 3B:
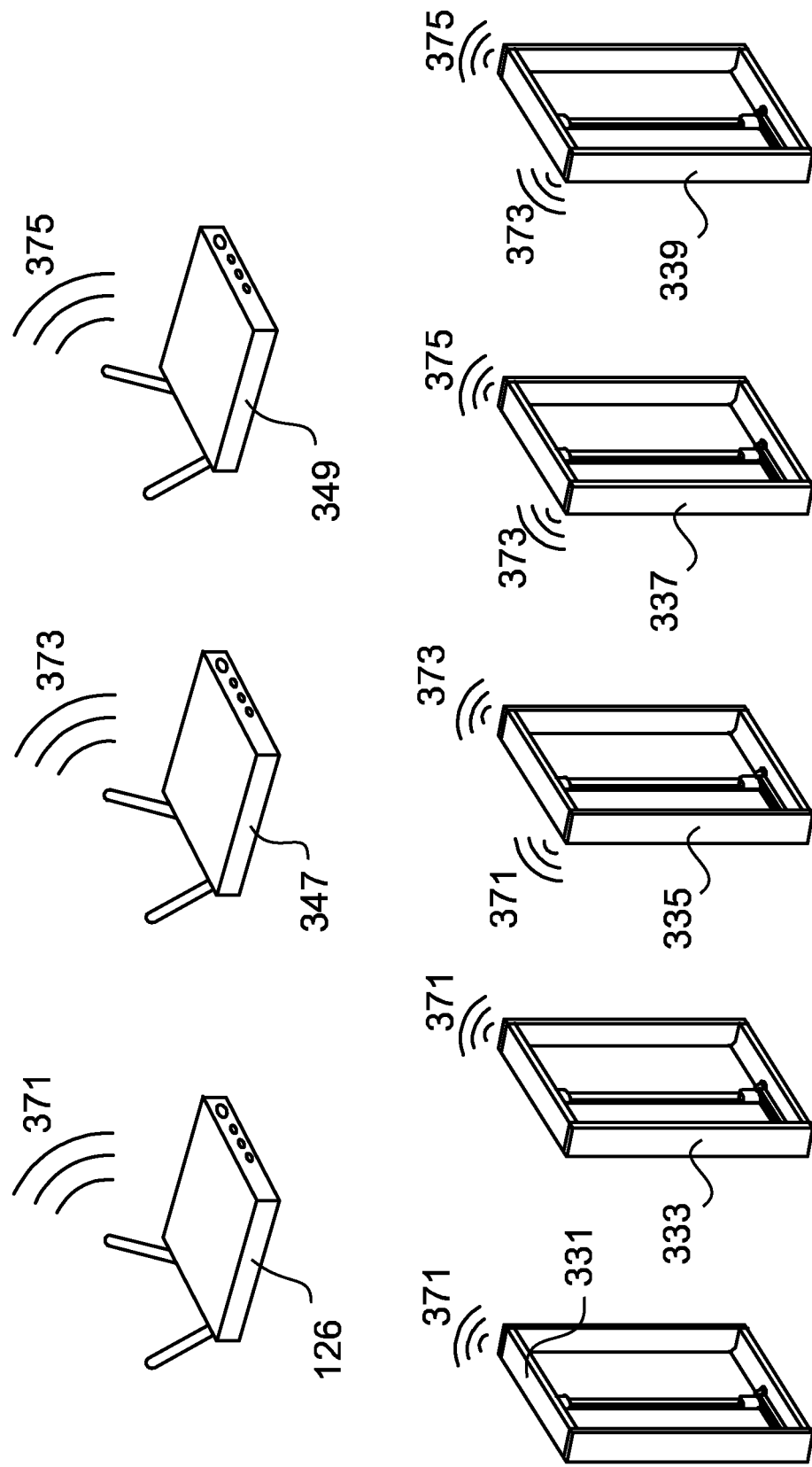
FIG. 3B is an illustration showing an embodiment of five motorized windows, and three hubs in accordance with the invention.

Referring to FIG. 3B, an example of five motorized windows, and three hubs is illustrated. In this example embodiment, first hub 126 transmits and receives wireless signal 371 to motorized windows 331 and 333. Control of these two motorized windows is directed by the user commands relayed from first hub 126. Motorized windows 331 and 333 are in closest proximity to first hub 126 and have the strongest received signal strength indication (RSSI) compared to other hubs in the vicinity.

Motorized window 335 receives both wireless signal 371 from first hub 126 and wireless signal 373 from first subordinate hub 307. In this example the RSSI for wireless signal 371 to motorized window 335 is stronger than wireless signal 373, so the assignment for control is made to first hub 126. So long as first hub 126 is active and functional, all user commands and control commands to motorized window 335 are sent from first hub 126 via wireless signal 371. In the case where the first hub 126 may become disabled or no longer functional, the first subordinate hub 347 will take over the control of motorized window 335 and relay commands via wireless signal 373. In this example, the first subordinate hub 347 becomes the first hub, taking the place of the disabled hub.

FIG. 3B further illustrates how the local area network (LAN) and personal area network (PAN) interface with each other. First hub 126, first subordinate hub 347 and second subordinate hub 349 are all on the same LAN. Wireless signals 371, 373 and 375 are on the same LAN. The preferred embodiment of the LAN comprises a WIFI, high bandwidth, long range signal. The preferred LAN network comprises a mesh network which allows new hubs to be added to the system. The mesh network also allows for subordinate hubs to continue operation of the network in the case where one of the hubs becomes disabled or nonfunctional.

The five motorized windows 331, 333, 335, 337 and 339 communicate via the PAN to each other and to a hub PAN interface via one of the hubs shown. Motorized windows 337 and 339 are within range of both first subordinate hub 347 and second subordinate hub 349. In this example, wireless signal 373 is stronger for motorized window 337, so it is controlled via first subordinate hub 307. Wireless signal 375 is stronger for motorized window 339, so it is controlled by second subordinate hub 349.

Figure 4:
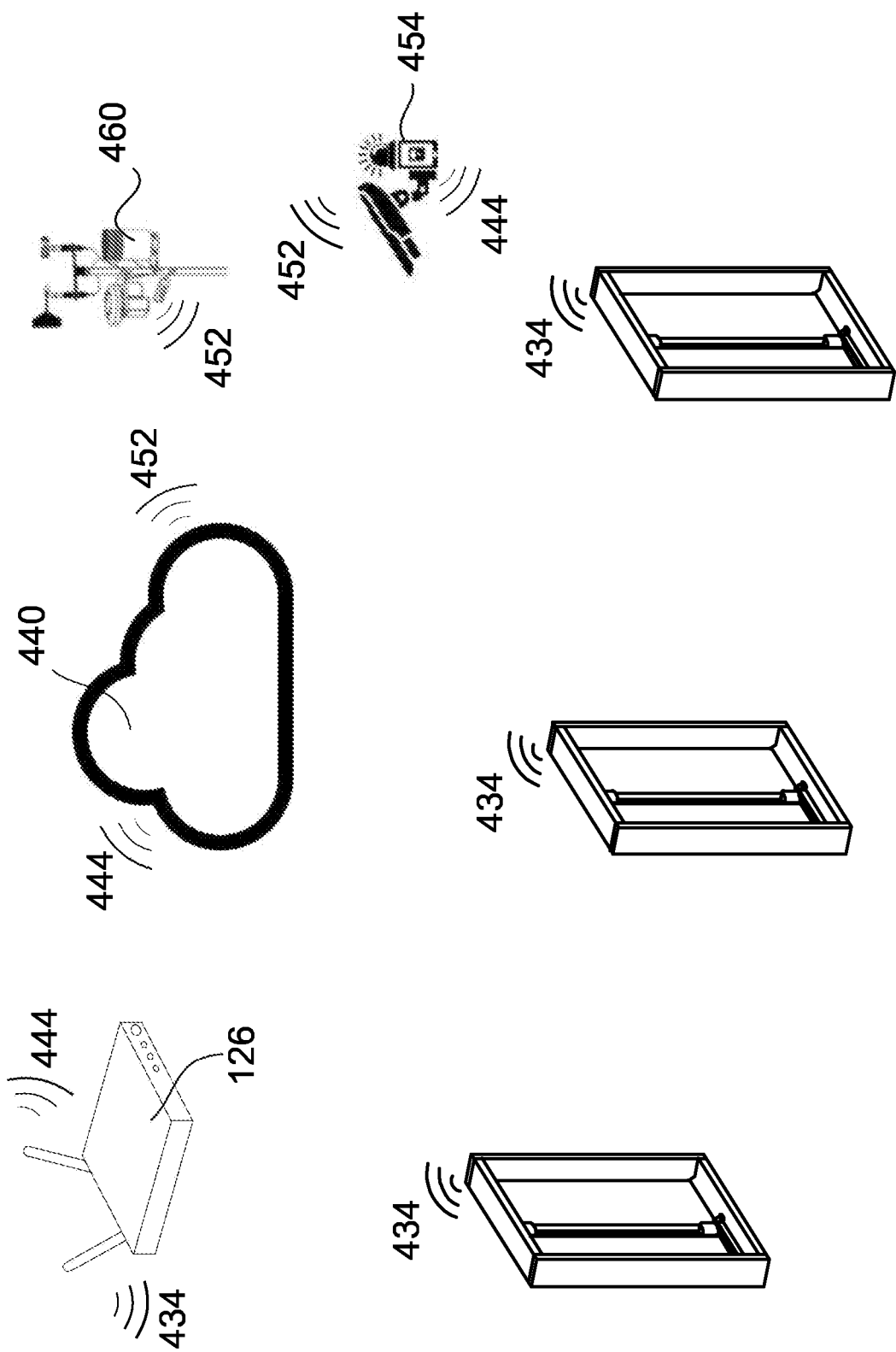
FIG. 4 is an illustration showing an embodiment of three motorized windows, a first hub, the cloud, a security system and a cell phone tower in accordance with the invention.

Referring to FIG. 4, an example of three motorized windows, the cloud network, a weather station, a security system and a first hub 126 is illustrated. In this example embodiment, the three windows illustrated are connected via Bluetooth mesh wireless signal 434. Wireless signal 452 connects the security system 454 to the cloud network 440 which communicates security system data to the system. The security system 454 may also communicate security system data directly to the system via wireless signal 444 to first hub 126. The security system data is used by the processor to determine what actions are to be taken in response to motion sensors, cameras or other security devices. The security system 454 may alert the system to close the windows or activate other security related actions based on user defined or factory settings. Weather station 460 may relay weather related data to the system via wireless signal 452 to the cloud network 440. This data may be passed on to the first hub 126 via wireless signal 444.

Referring generally to FIGS. 5 through 21, in certain embodiments in accordance with the invention, an application may be provided that allows a user to program the automated window to operate in a desired manner. For example, a user may want the automated window to open a motorized window 100 at a specified time of day and close the motorized window 100 at another time of day. The application may also assist the user in programming multiple motorized windows 100. For example, a user's home or business may contain multiple motorized windows 100 and it may be inefficient and time-consuming to individually program the automated windows, particularly in cases where the user wants the automated windows to behave in a similar manner. In certain embodiments, the application may assist the user in programming multiple automated windows as a group.

In certain embodiments, the application is configured to execute on a user's mobile device, such as a tablet or smart phone. FIGS. 5 through 14 show various exemplary graphical user interface (GUI) pages associated with an application configured to execute on a mobile device. Nevertheless, in other embodiments, the application may be configured to execute on a desktop computer, workstation, laptop, or other suitable computing device.

Figure 5:
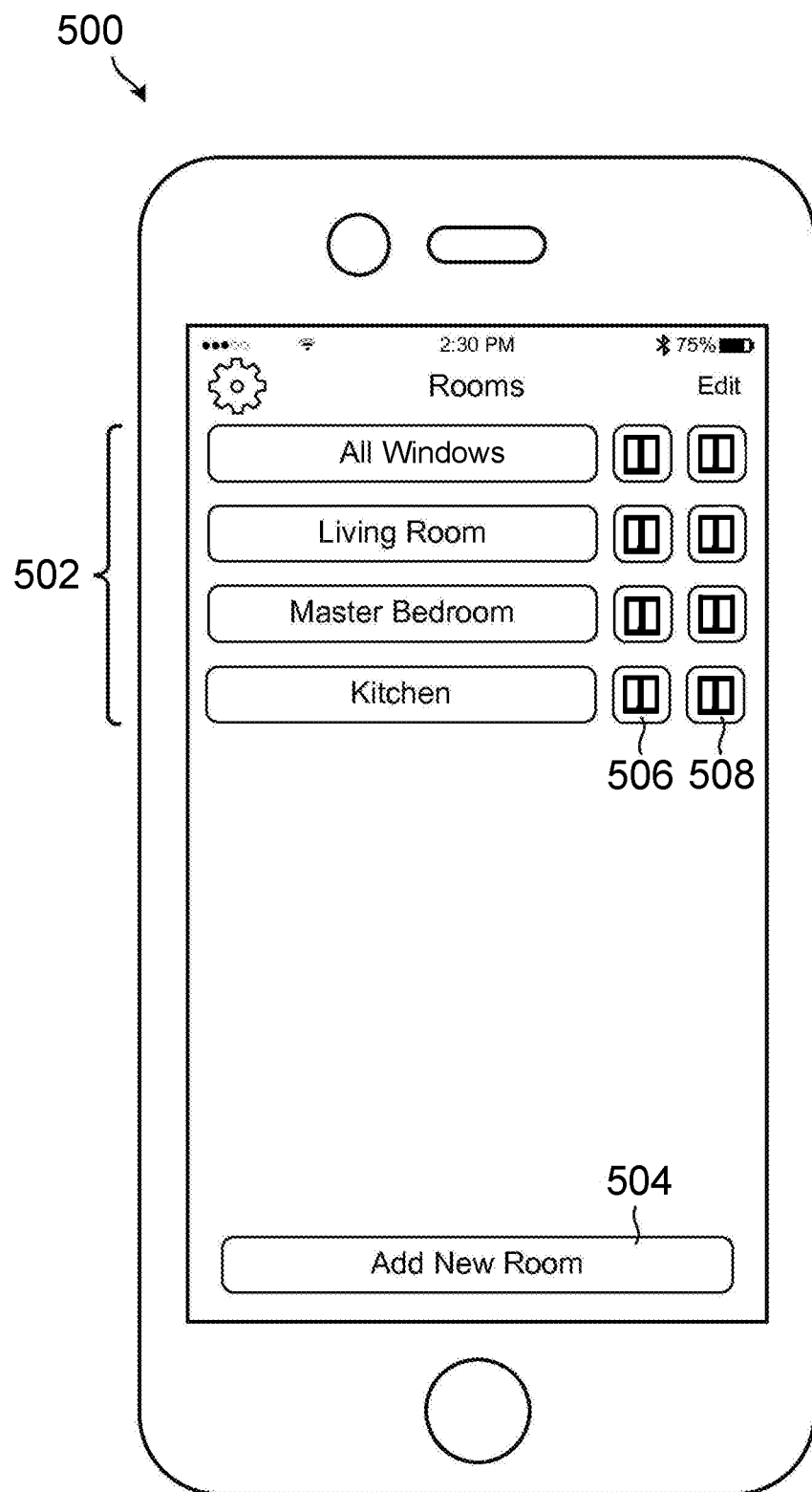
FIG. 5 shows a graphical user interface for setting up and automating motorized windows in different rooms or spaces.

Referring to FIG. 5, one embodiment of a GUI page 500 for setting up and automating motorized windows 100 in various rooms of a home or business is illustrated. When automating a home or business, multiple motorized windows 100 may be retrofitted with an automated window in accordance with the invention. In many cases, individual rooms in the home or business may contain multiple motorized windows 100. In certain cases, a user may want all motorized windows 100 in a home or business, or all motorized windows 100 in a particular room of a home or business, to be programmed in the same or a similar manner. Similarly, when using manual controls to operate the motorized windows 100, the user may wish to operate all motorized windows 100 in a home or business, or in a room of the home or business, as a group as opposed to individually.

FIG. 5 shows one embodiment of a Rooms page 500 that enables a user to establish rooms in a home or business, as well as operate all motorized windows 100 in the home or business, or in a room of the home or business, as a group. In the illustrated embodiment, buttons 502 are provided to represent the home or business, as well as each room that has been established in the home or business. Selecting a button 502 may enable a user to configure the home or business, or a room in the home or business, such as by adding motorized windows 100 to the home, business, or particular room. For example, selecting the "All Windows" button 502 may allow the user to configure all motorized windows 100 associated with the home or business. Similarly, selecting the "Living Room" button 502 may allow the user to configure motorized windows 100 in the user's living room. An "Add New Room" button 504 may enable a user to add a new room to the list 502.

As shown, various manual controls are provided on the "Rooms" page 500. For example, an open button 506 may cause all windows in a home or business, or a particular room in the home or business, to open. Similarly, a close button 508 may cause all windows in the home or business, or the particular room in the home or business, to close. The buttons 506, 508 may be configured to operate in different ways. For example, pressing and holding the button 506, 508 may cause slats of the motorized windows 100 to tilt until the buttons 506, 508 are released. In another example, pressing and holding the button 506, 508 may cause a material in the window to increase the darkness or opacity until the buttons 506, 508 are released. This would allow various intermediate positions or states to be achieved. By contrast, single or double clicking a button 506, 508 may cause the slats of the motorized windows 100 to open or close completely without having to hold down the corresponding buttons 506, 508. This is simply an example of possible operation and is not intended to be limiting.

Figure 6:
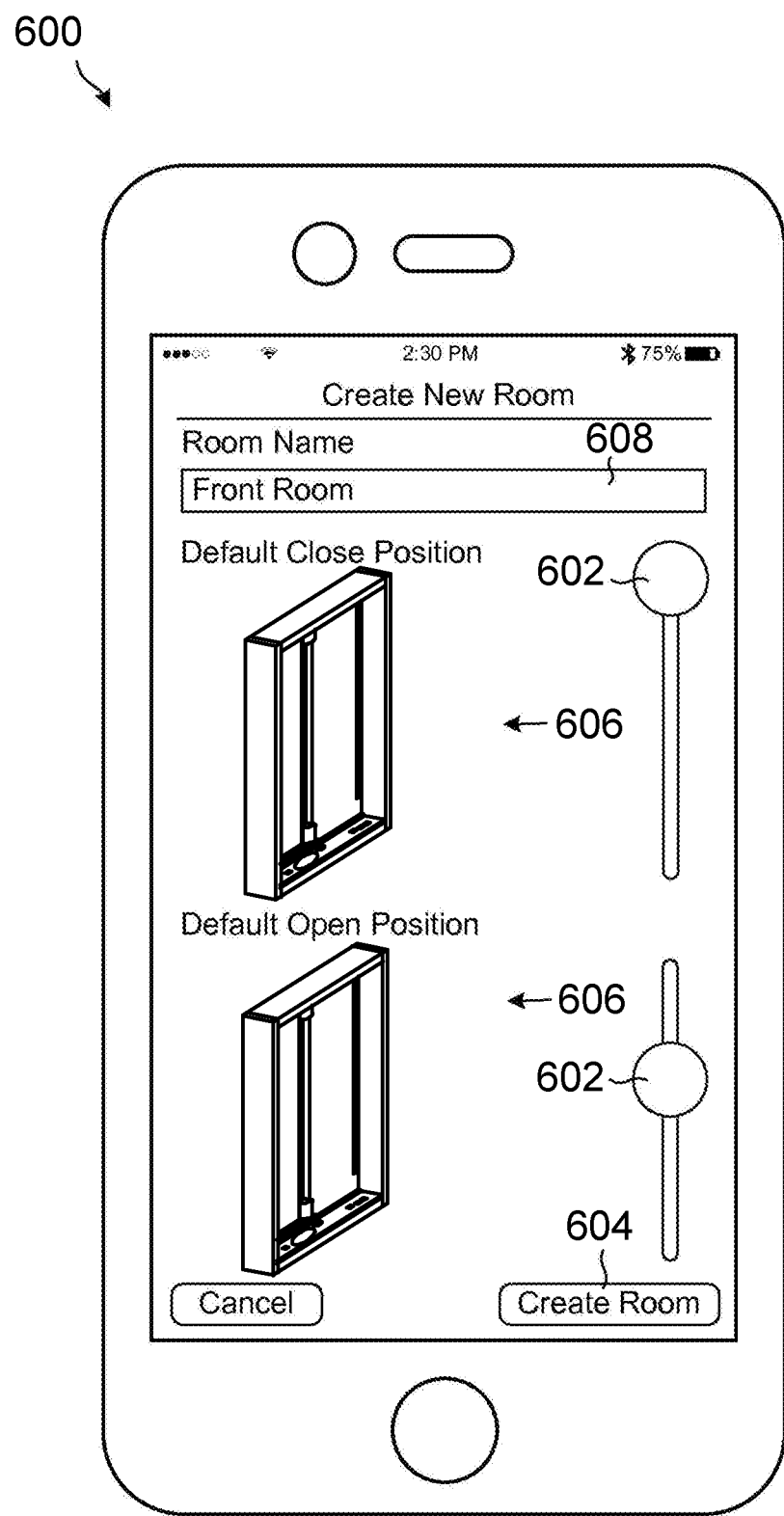
FIG. 6 shows a graphical user interface for creating a new room and establishing a default closed and open position for motorized windows associated with the new room.

Referring to FIG. 6, one embodiment of a Create New Room page 600 is illustrated. Such a page 600 may be displayed upon selecting the Add New Room button 604 discussed in association with FIG. 6. As shown, the "Create New Room" page 600 enables a user to designate a room name (e.g., "Front Room") in a field 608, as well as designate a default open and closed position for motorized windows 100 associated with the room. As shown in FIG. 6, slider buttons 602 are provided to enable the user to establish the open and closed positions for the motorized windows 100. In certain embodiments, motorized window depictions 606 adjacent to the buttons 602 are animated in response to movement of the slider buttons 602. That is, as the slider buttons 602 are moved up or down, the motorized window depictions 606 appear to open and/or close to reflect the actual position of the slats or state of opacity. Once a room is named and the default open and closed positions are established, a "Create Room" button 604 may be selected to create the room. This will, in turn, cause the room to be added to the list 602 illustrated in FIG. 5.

Figure 7:
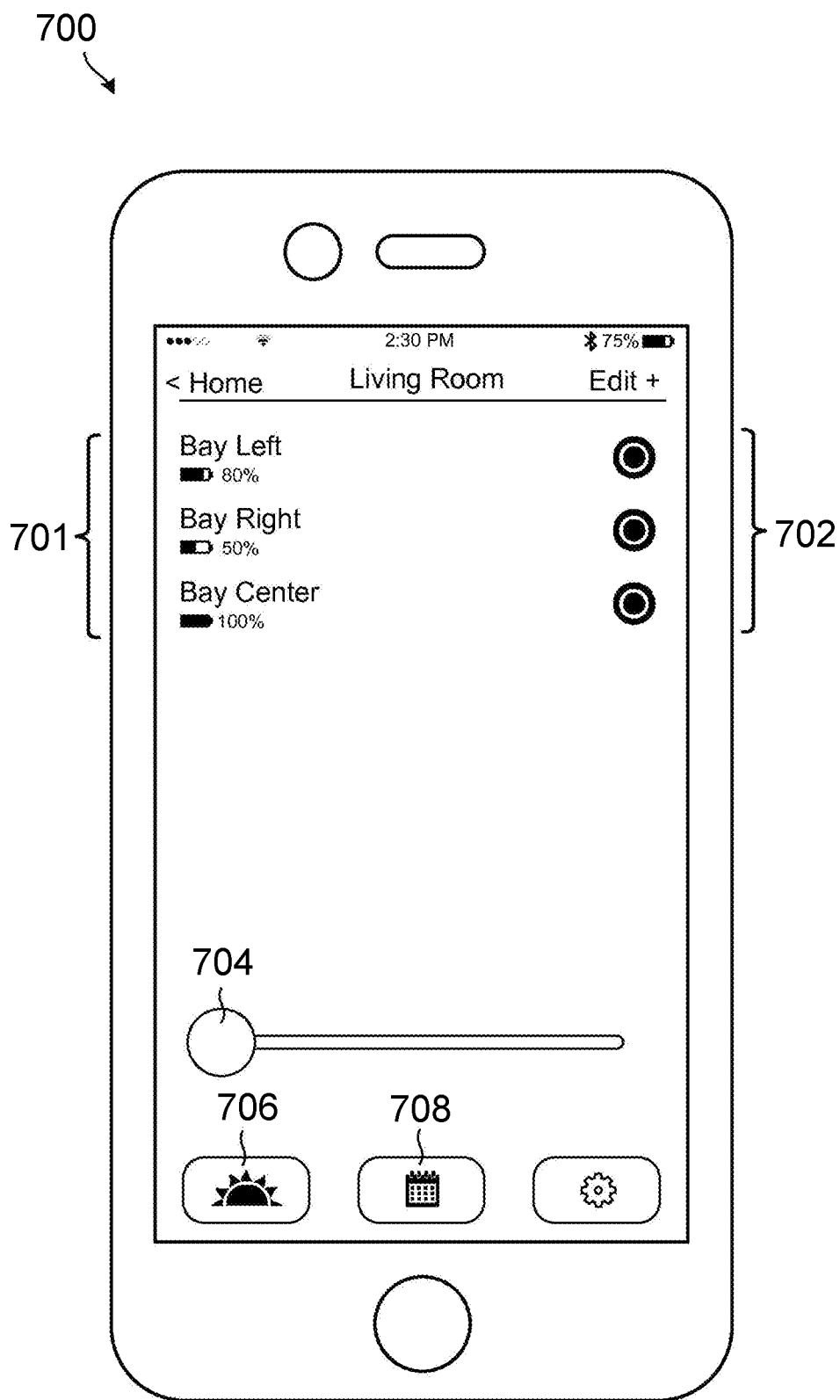
FIG. 7 shows a graphical user interface for monitoring a battery charge level for motorized windows in a room.

Referring to FIG. 7, one embodiment of a page 700 for configuring a room is illustrated. Such a page, for example, may be displayed in response to selecting one of the buttons 502 illustrated in FIG. 5. This page 700 may enable a user to add, delete, modify, or monitor motorized windows 100 associated with a particular room or space. In the illustrated example, the room Living Room includes three motorized windows 100, namely "Bay Left, Bay Right," and "Bay Center." Indicators are provided to show a battery charge level associated with each of the motorized windows 100. As further shown, each of the motorized windows 100 includes a button/indicator 702. In certain embodiments, the outer ring may indicate whether the motorized window 100 is online and connected whereas the inner circle may enable a user to select the motorized window 100 so that it can be controlled and/or configured. For example, upon selecting one or more motorized windows 100 in the list, a slider button 704 may enable the motorized windows 100 to be manually opened or closed by moving the slider button 704.

Figure 11:
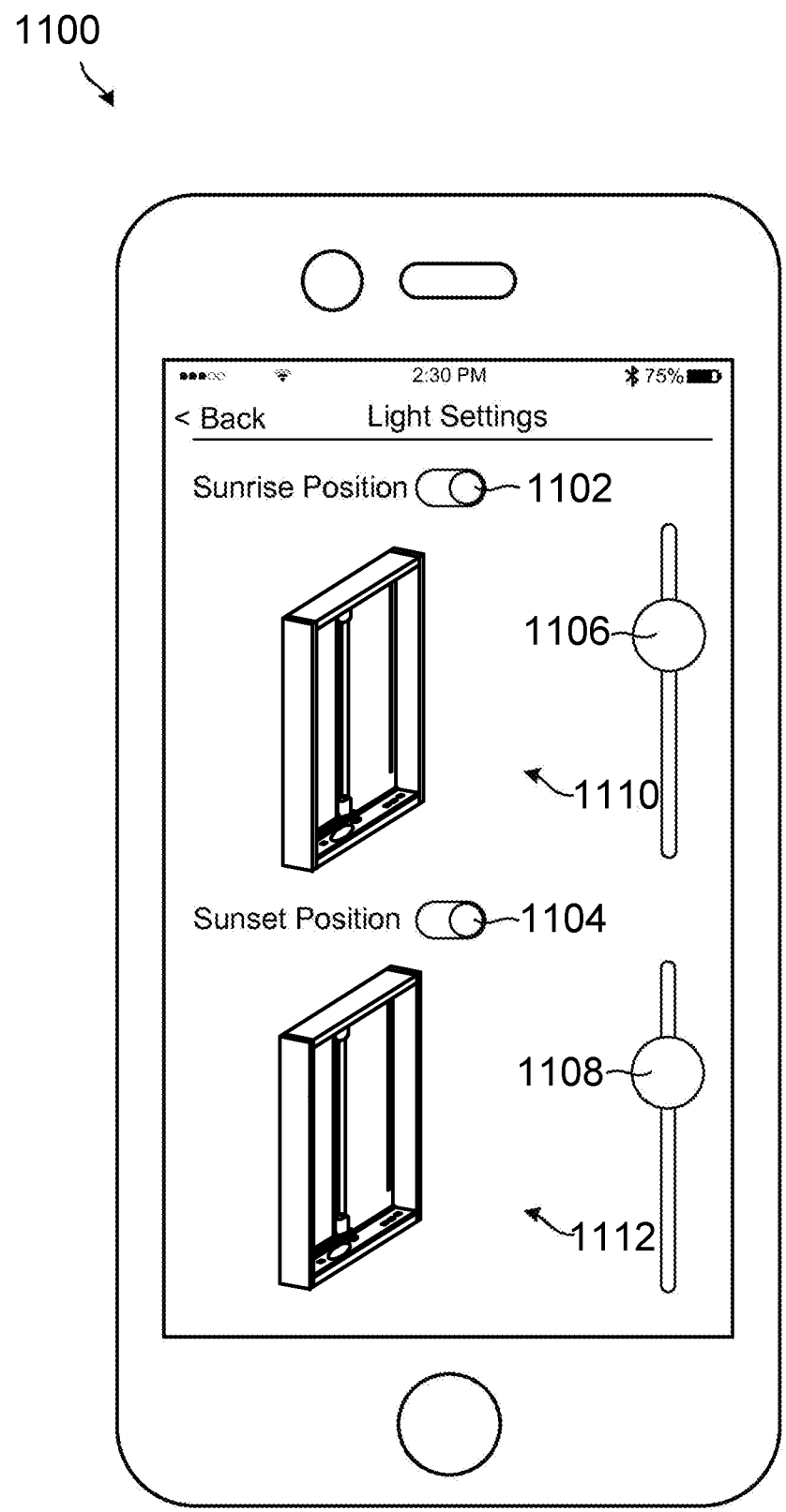
FIG. 11 shows a graphical user interface for adjusting light settings associated with a motorized window.

Various different buttons for configuring the motorized windows 100 are shown at the bottom of the page 700. For example, a button 706 may be selected to configure a motorized window 100 or a group of motorized windows 100 to operate in accordance with sensed lighting conditions. For example, a user may want a motorized window 100 or a group of motorized windows 100 to open at sunrise and/or close at sunset. Selecting the button 706 may open up a page that enables the user to configure the motorized windows 100 in such a manner. One embodiment of such a page is illustrated in FIG. 11.

Similarly, a button 708 may be selected to configure a motorized window 100 or a group of motorized windows 100 to operate in accordance with a defined schedule. For example, a user may want a motorized window 100 or a group of motorized windows 100 to open and/or close at designated times. In certain embodiments, different open/close times may be established for different days of the week. Selecting the button 708 may open up a page that enables the user to configure the motorized windows 100 to operate in accordance with the established schedule. One embodiment of such a page is illustrated in FIG. 8.

Figure 8:
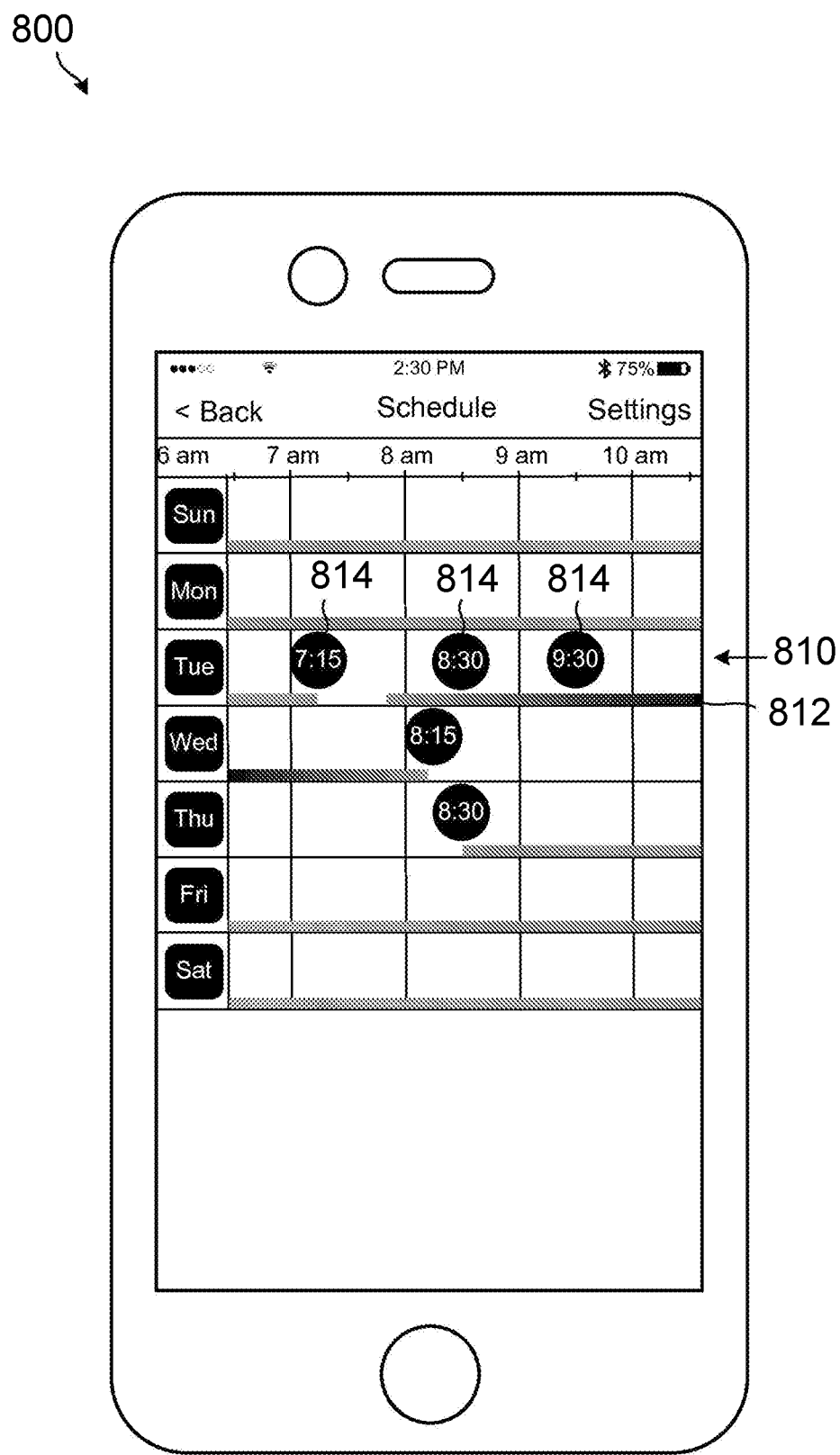
FIG. 8 shows a graphical user interface for displaying a schedule associated with a motorized window.

Referring to FIG. 8, one embodiment of a page 800 for establishing a schedule for a motorized window 100 or a group of motorized windows 100 is illustrated. In the illustrated embodiment, a time line 810 is provided for each day of the week. A user may establish different types of events 814 on the time line 810. For example, a user may wish to establish an open event 814 at a designated time and a close event 814 at a different designated time. For example, as shown in the illustrated embodiment, an open event 814 is established at 7:15 AM and a close event 814 is established at 9:30 AM. In certain embodiments, events 814 may also be established for states other than open/close states. For example, a user may want a motorized window 100 or a group of motorized windows 100 to be fifty percent (or some other percentage) open at a designed time. In the illustrated embodiment, a partial open event 814 is established at 8:30 AM.

In certain embodiments, each time line 810 may have a status bar 812 associated therewith. This status bar 812 may show a status of a motorized window 100 or a group of motorized windows 100 during different time periods. For example, the color white on the status bar 812 may indicate that a motorized window 100 or group of motorized windows 100 is open over the indicated time period. Similarly, the color black may indicate that the motorized window 100 or group of motorized windows 100 is closed during the indicated time period. Shades of grey may indicate a state of partial openness, the degree of which may be indicated by the shade.

In certain embodiments, a gradual change in color along the status bar 812 may indicate that a motorized window 100 or group of motorized windows 100 is gradually opening or closing over the indicated time period. For example, as can be observed in FIG. 8, a motorized window 100 or group of motorized windows 100 is partially open until 7:15 AM, at which time they completely open. The motorized window 100 or group of motorized windows 100 then gradually close until they reach a designated state of partial openness at 8:15 AM. The motorized window 100 or group of motorized windows 100 gradually continue to close until they are completely closed at or around 9:30 AM and thereafter. In certain embodiments, an event 814 may indicate when an operation (open, close, etc.) begins. In other embodiments, an event 814 may indicate when an operation ends. In yet other embodiments, an operation may be centered with respect to an event 814 such that the operation may begin before the designated event time and end after the designated event time.

In certain embodiments, creating an event 814 may be as easy as selecting an area on a time line 810 where an event 814 is desired to be placed. A page or menu may appear that allows the user to establish details or settings for the event 814. Similarly, selecting or manipulating an already existing event 814 may allow details or settings associated with the event 814 to be changed. In certain embodiments, a time or day associated with an event 814 may be changed by simply selecting and dragging the event 814 to a desired time or day on the page 800. Other techniques for creating, modifying, or deleting events 814 may be used and are within the scope of the invention.

Figure 9:
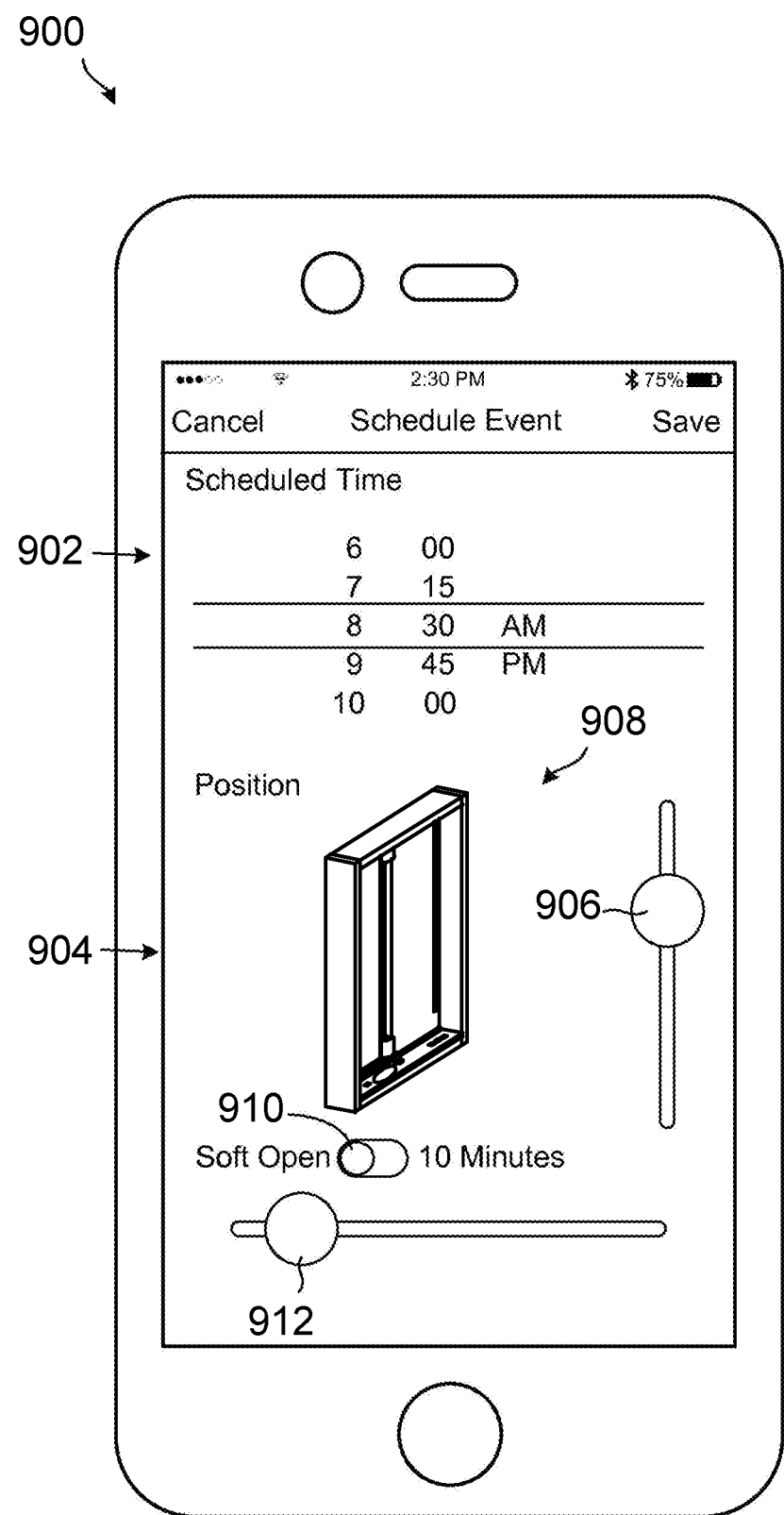
FIG. 9 shows a graphical user interface for scheduling an event associated with a motorized window.

Referring to FIG. 9, one embodiment of a page 900 for creating or modifying an event 814 is illustrated. In this embodiment, a time-selection feature 902 enables a user to specify a desired time for an event 814. Similarly, a position-selection feature 904 enables a user to specify a desired position for a motorized window 100 or group of motorized windows 100 for an event 814. This position-selection feature 904 may, in certain embodiments, enable a user to select an open state, closed state, or an intermediate state associated with the event 814. In certain embodiments, a slider button 906 is provided to enable the user to designate the position of the motorized window 100 or group of motorized windows 100. A motorized window graphic 908 adjacent to the button 906 may be animated in response to movement of the slider button 906 to show a position of the motorized window 100 or group of motorized windows 100.

In certain embodiments, the page 900 may also enable a user to designate how fast a motorized window 100 or group of motorized windows 100 opens or closes in association with a particular event 814. For example, a user may want a motorized window 100 or group of motorized windows 100 to open or close over a designated period of time (e.g., 10 minutes, 30 minutes, an hour, etc.) instead of opening or closing in an abrupt manner. This may provide a more aesthetically pleasing way to operate the motorized windows 100 and/or enable motorized windows 100 to operate gradually to mirror or reflect the gradual movement of the sun. This may also maximize the amount of sunlight that is allowed to enter a room while at the same time preventing direct sunlight and associated damage on furniture, rugs, or other objects, even as the angle of incidence of the sun changes throughout the day. In certain embodiments, a button 910 (e.g., a soft close button 910) may be provided to enable this feature. Similarly, in certain embodiments, a slider button 912 (or other feature such as an input field) may be provided to enable a user to establish how long it takes for a motorized window 100 or group of motorized windows 100 to transition between states.

Figure 10:
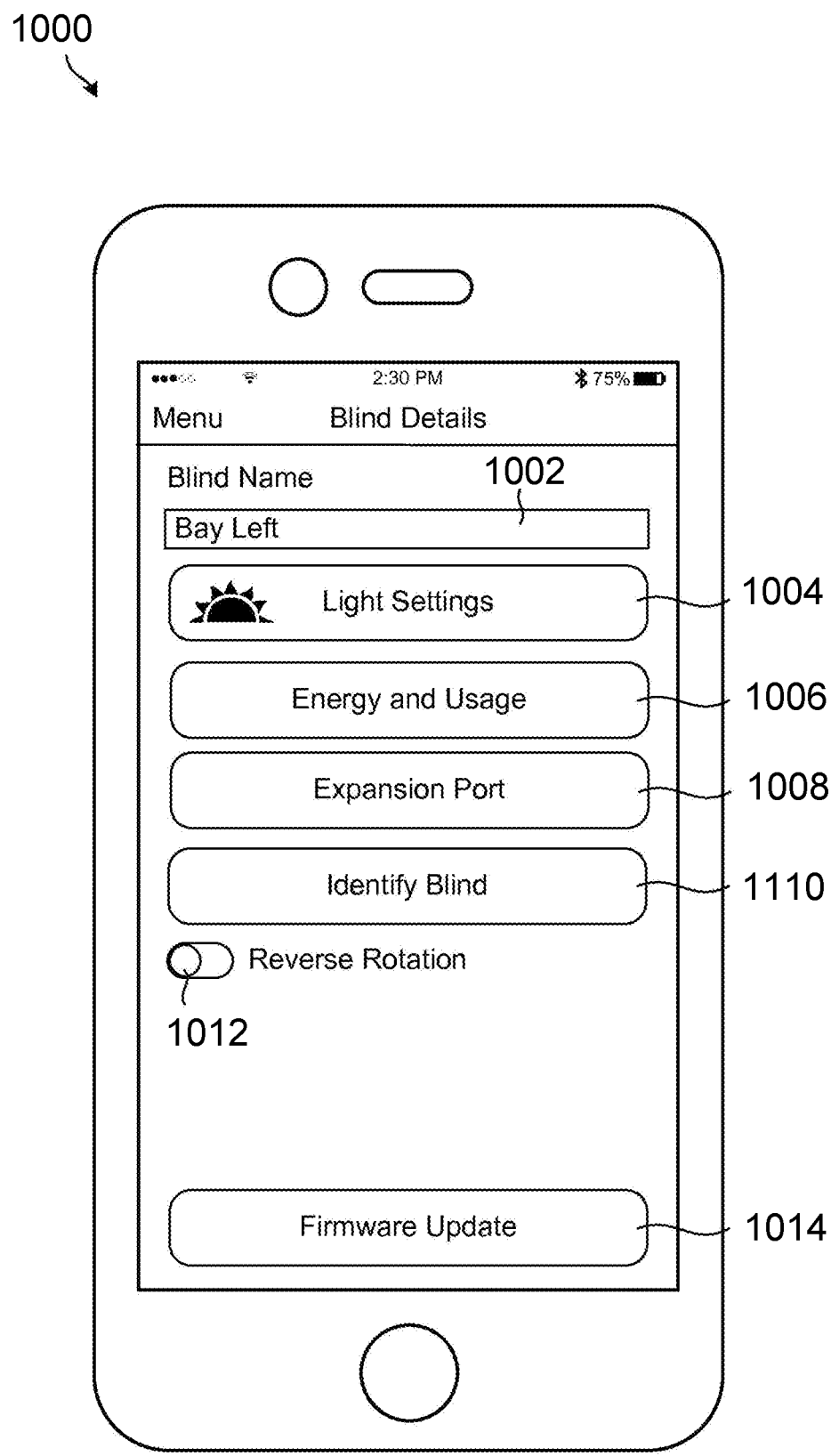
FIG. 10 shows a graphical user interface for setting up and changing settings associated with a motorized window.

Referring to FIG. 10, one embodiment of a page 1000 for establishing various details for a motorized window 100 is illustrated. As shown, the page 1000 includes a field 1002 for designating or changing a name of a motorized window 100. In certain embodiments, descriptive names may be chosen to assist a user in differentiating motorized windows 100 from one another. A button 1004 may be selected to configure a motorized window 100 to operate in accordance with sensed lighting conditions, such as by opening in response to sunrise and closing in response to sunset. One embodiment of a page for configuring a motorized window 100 in this manner will be discussed in association with FIG. 11.

A button 1006 may be configured to display information regarding energy and usage associated with a motorized window 100. For example, selecting the button 1006 may enable a user to view a battery charge level, an estimated time that a battery charge will be depleted, usage patterns or particular instances of operation of the motorized window 100, or the like.

A button 1008 may enable a user to configure expansion ports or devices connected to expansion ports of the motorized window 100. For example, in certain embodiments, sensors such as temperature sensors, security sensors, or the like, may be connected to various expansions ports of a motorized window 100 to allow the motorized window 100 to provide additional features and functions. The button 1008 may present a screen or page that allows these expansion ports or devices to be configured.

An identify blind button 1110 may assist a user in identifying the motorized window 100 identified in the field 1002. For example, selecting the button 1010 may cause the motorized window 100 to physically move or perform some other function to allow the user to determine which physical motorized window 100 corresponds to the motorized window 100 identified in the application. This may be helpful in situations where a room, home, or business contains multiple motorized windows 100 and the user is unsure which physical motorized windows 100 correspond to the blind names listed in the application.

A reverse rotation button 1012 may enable functions of an automated window to be reversed. For example, if the opacity in a window is normally drawn from the top to the bottom of the window, or if shades are drawn from the top to the bottom, the reverse rotation button 1012 may reverse the operation to start the opacity from the bottom of the window. In some cases, it may be desirable (for privacy) to have the bottom portion of the window opaque while the upper portion of the window is still clear, letting natural light from the exterior enter into the interior of the building space.

A firmware update button 1014 may enable a user to update firmware on the motorized gearbox assembly 102. One benefit of the motorized gearbox assembly 102 compared to conventional motorized window automation systems is the smart technology built into the motorized gearbox assembly 102. Instead of simply receiving and executing commands, the motorized gearbox assembly 102 may have processing capability that allows it to provide additional functionality. For example, in certain embodiments, the motorized gearbox assembly 102 may interface with security sensors for use in a security system, or temperature or humidity sensors for use in a climate-control or HVAC system. The firmware update button 1014 may enable updated firmware to be loaded (e.g., wirelessly loaded) onto the automated window to either improve existing functionality or expand the functionality of the automated window.

Referring to FIG. 11, one embodiment of a page 1100 for establishing light settings for a motorized window 100 or a group of motorized windows 100 is illustrated. Such a page 1100 may be displayed in response to selecting the button 706 discussed in association with FIG. 7 or selecting the button 1004 discussed in association with FIG. 10. The page 1100 may enable a motorized window 100 or a group of motorized windows 100 to be configured to operate in accordance with sensed lighting conditions. When working with a group of motorized windows 100, the group may, in certain embodiments, be configured to operate from a single light sensor (possibly a light sensor in single motorized window 100 or an external light sensor) in order to substantially synchronize the motorized windows 100. In other embodiments, each motorized window 100 in the group may operate in accordance with sensed lighting conditions from its own light sensor.

As shown in FIG. 11, in certain embodiments, the page 1100 may include a button 1102 to configure a motorized window 100 or group of motorized windows 100 to automatically open at sunrise. In certain embodiments, a slider button 1106 may be provided to set the motorized window position at sunrise. This may allow the motorized window 100 or group of motorized windows 100 to be completely or partially opened at sunrise. A motorized window graphic 1110 adjacent to the button 1106 may visually open or close in response to movement of the slider button 1106 to show a position of the motorized window 100 and/or group of motorized windows 100.

Similarly, a button 1104 may be provided to configure a motorized window 100 or group of motorized windows 100 to automatically close at sunset. A slider button 1108 may, in certain embodiments, be provided to set a desired motorized window position at sunset. This may allow the motorized window 100 or group of motorized windows 100 to be completely or partially closed at sunset. A motorized window graphic 1112 adjacent to the button 1108 may visually open or close in response to movement of the slider button 1108 to show a position of the motorized window 100 and/or group of motorized windows 100. In other embodiments, the slider may control slats or opacity features of the window. For example, sliding the slider up may either raise the opacity to a certain point, creating opaqueness on the lower section of the window, and leaving the top portion of the window clear. In another example, the slider may change the intensity of the opaqueness, causing it to get more or less opaque as the slider is drawn up or down.

Figure 12:
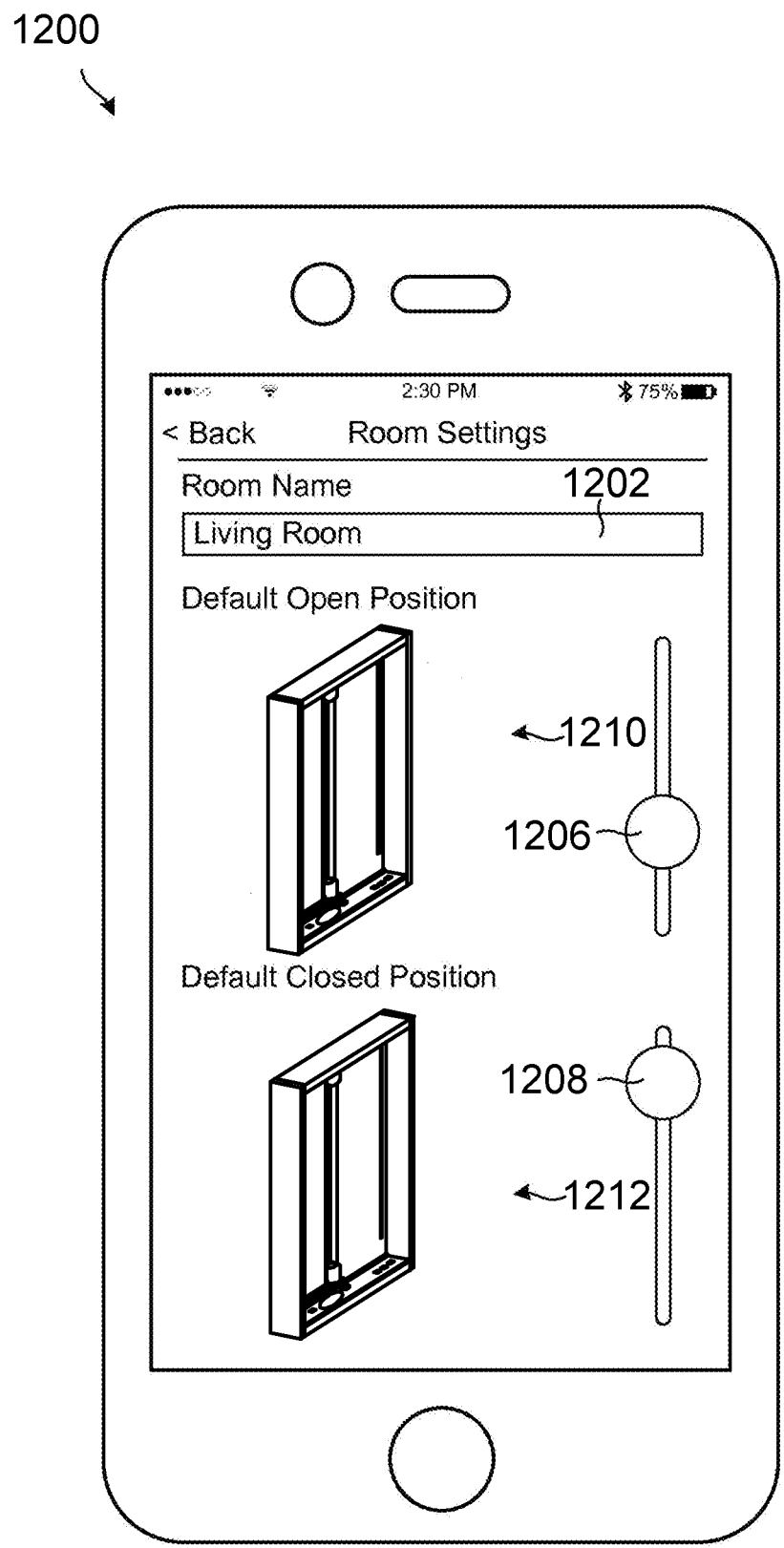
FIG. 12 shows a graphical user interface for adjusting room settings for motorized windows in a room.

Referring to FIG. 12, one embodiment of a page 1200 for establishing settings associated with a living room 1202 is illustrated. Such a page 1200 may be displayed, for example, in response to selecting the button 502 discussed in association with FIG. 5. The page 1200 may also, in certain embodiments, be displayed in response to selecting the add new room button 504 discussed in association with FIG. 5. As shown, the page 1200 includes a field 1202 to create or edit a room name associated with a particular room or space. The page 1200 also allows default open and closed positions to be established for motorized windows 100 associated with a room. In the illustrated example, slider buttons 1206, 1208 are provided to establish the default open and closed positions. Similarly, window graphics 1210, 1212 may be provided to visually represent the default open and closed positions. When an open or close button 506, 508 is selected for a room, as previously discussed in association with FIG. 5, the motorized windows 100 in the room may be opened or closed in accordance with the default positions.

Figure 13:
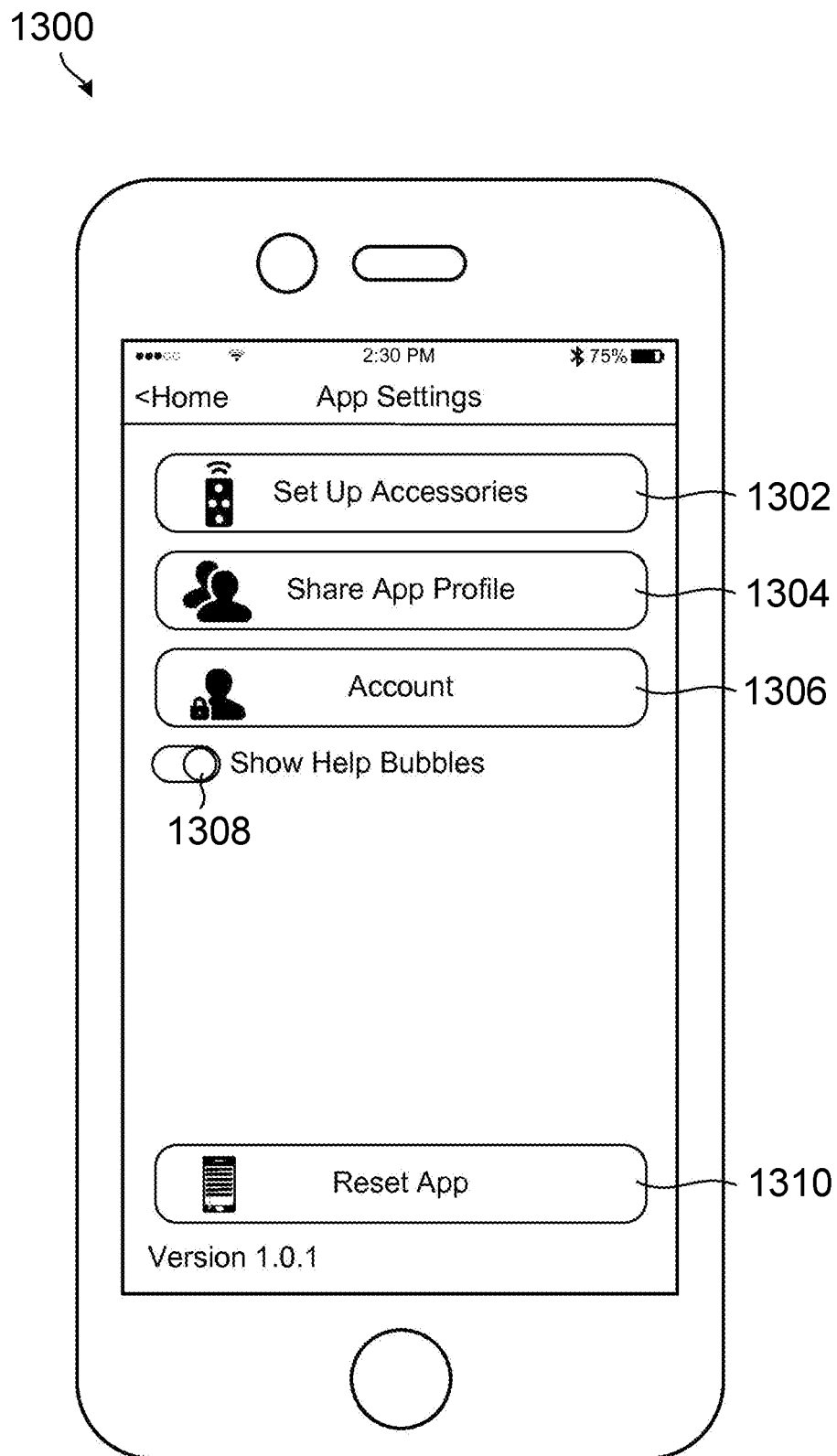
FIG. 13 shows a graphical user interface for establishing settings associated with an application.

Referring to FIG. 13, one embodiment of an app settings page 1300 is illustrated. In the illustrated embodiment, the page 1300 includes a set up accessories button 1302, "share app profile" button 1104, "account button" 1306, "show help bubbles" 1308, and "reset app" button 1310. These buttons are provided by way of example and are not intended to be limiting.

A "setup accessories" button 1302 may be provided to set up accessories related to a motorized window 100 or a group of motorized windows 100. Such accessories may include, for example, a wall switch configured to control motorized windows 100, a USB or HDMI dongle configured to control motorized windows 100, a temperature sensor connected to a motorized window 100, a security sensor connected to a motorized window 100, or the like. A page 1300 for setting up such accessories will be discussed in association with FIG. 14.

A "share app profile" button 1104 may enable settings established on a first device (e.g., smart phone, tablet, laptop, etc.) to be mirrored to a second device (e.g., smartphone, tablet, laptop, etc.). For example, if a large number of motorized windows 100 have been set up, named, and configured on a first device, the "share app profile" button 1104 may allow these settings to be mirrored to a second device without having to once again set up, name, and configure the motorized windows 100.

An account button 1306 may be used to establish a username, password, user preferences, and other account-related information associated with a user. In certain embodiments, a "show help bubbles" button 1308 may cause the application to display help information for screens, buttons, or other features or functionality in the application. These help bubbles may be displayed, for example, when a user touches, hovers over, or otherwise selects different screens, buttons, or features in the application. A reset app button 1310 may enable a user to reset the application. In certain embodiments, this may erase motorized window and other configuration information in the application, thereby allowing the user to start anew.

Figure 14:
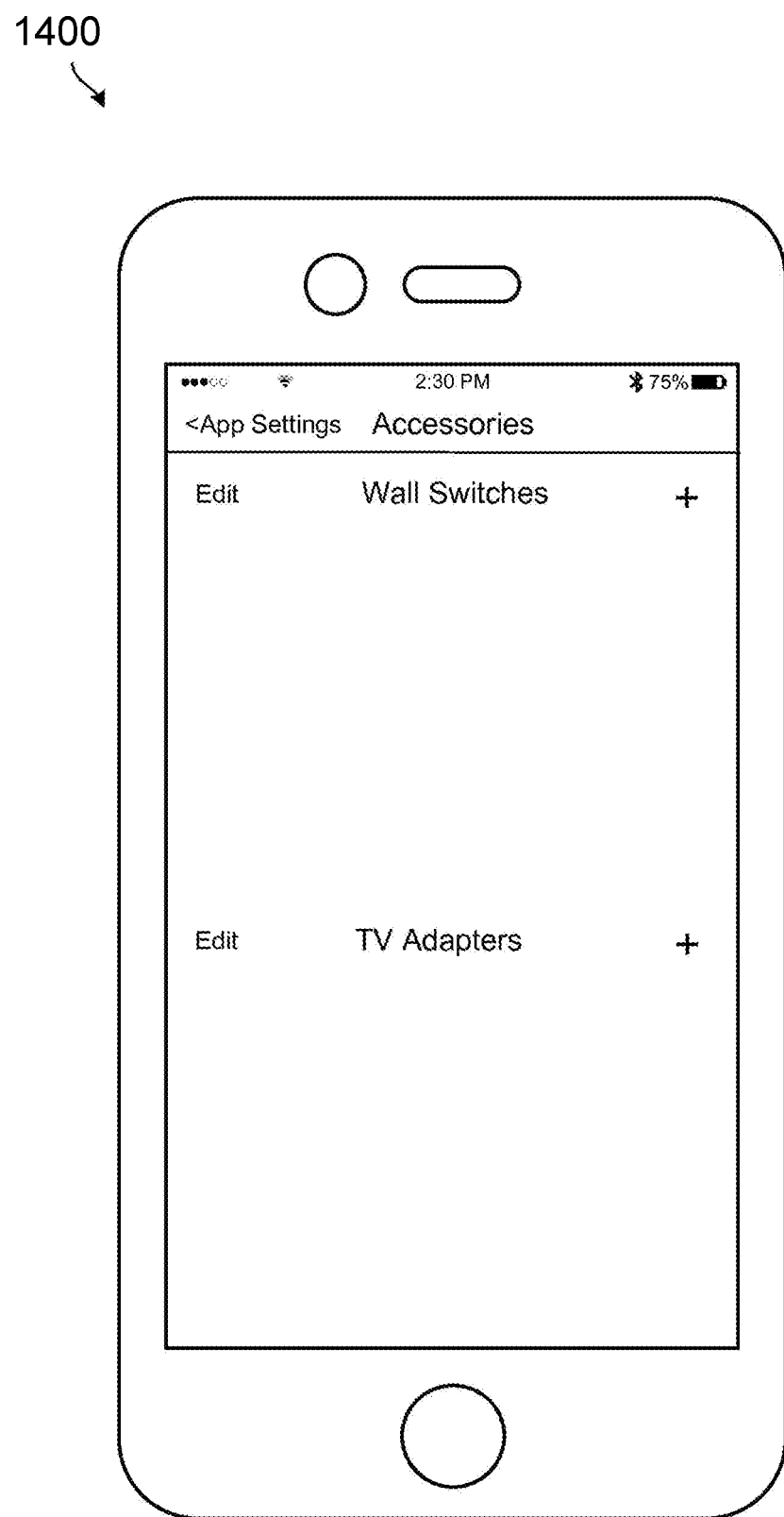
FIG. 14 shows a graphical user interface for adding or editing accessories associated with a room or motorized window.

Referring to FIG. 14, one embodiment of a page 1400 for managing accessories related to a motorized window 100 or a group of motorized windows 100 is illustrated. In this example, the page 1400 shows a list of wall switches and TV adapters. In certain embodiments, a motorized window 100 or group of motorized windows 100 may be controlled (e.g., wirelessly controlled) by a wall switch, such as a specialized wall switch. One embodiment of such a specialized wall switch will be discussed in association with FIG. 18. Such a wall switch may, in certain cases, be used in place of or in addition to the manual controls provided by the application. As shown, the page 1400 may enable new wall switches to be added to the system as well as editing of existing wall switches.

Similarly, the page 1400 allows TV adapters to be added to the system or existing TV adapters to be edited. In certain embodiments, a motorized window 100 or a group of motorized windows 100 may be controlled by a video display adapter, such as a USB or HDMI dongle plugged into a USB or HMDI port of a video display. Such a video display adapter may be configured to generate a signal when a video display (e.g., a television, projector, etc.) is turned on or off. That is, the motorized window 100 or group of motorized windows 100 may automatically open or close in response to receiving the signal. This may allow a room or space to be automatically darkened when a television, projector, or other media device is turned on, and automatically lightened when the television, projector, or other media device is turned off. As shown, the page 1400 may enable new TV adapters to be added to the system as well as editing of existing TV adapters.

Figure 15:
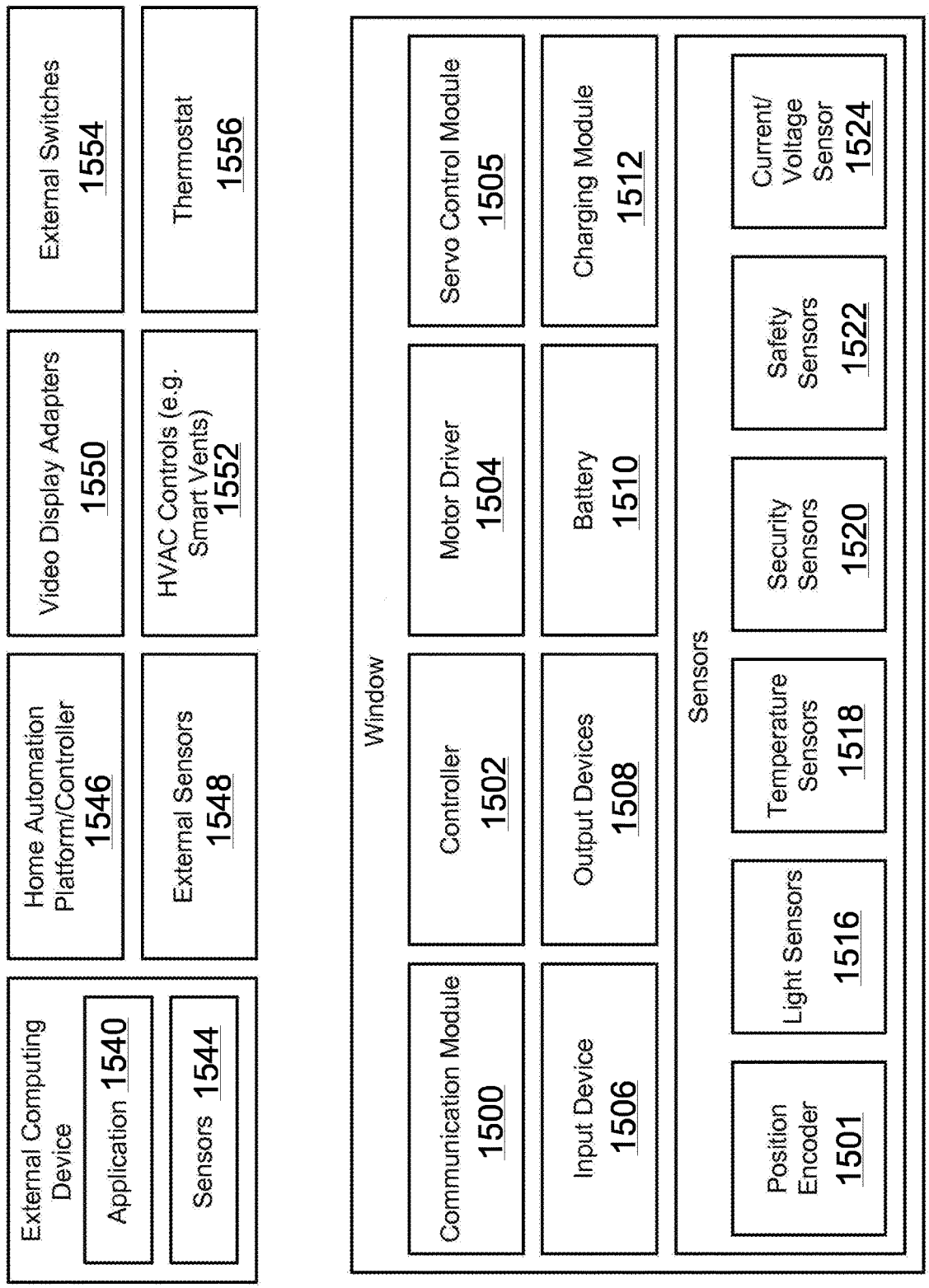
FIG. 15 is a high-level system view showing various components internal to an external to an automated motorized window in accordance with the invention.
Figure 16:
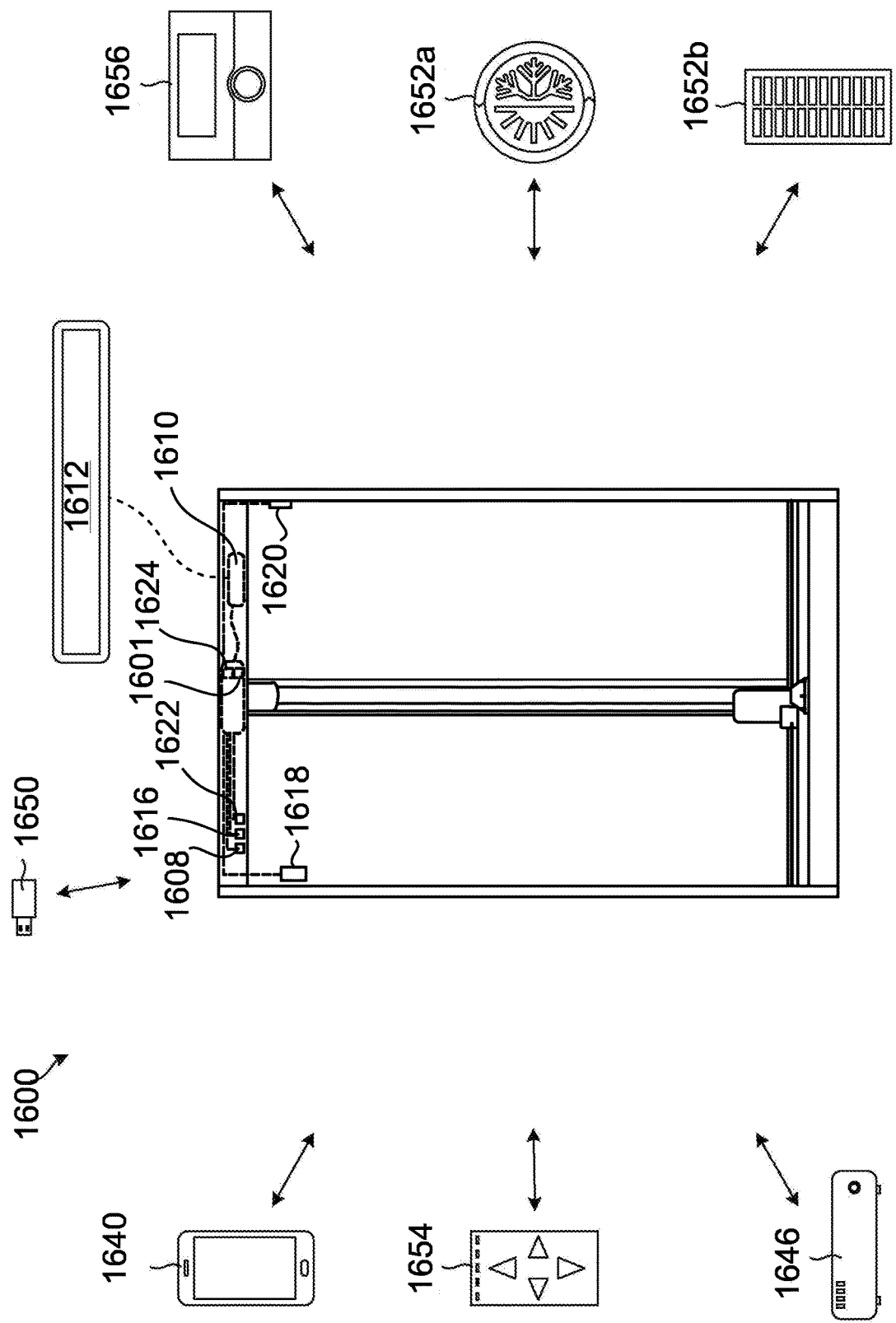
FIG. 16 is a high-level view of the system of FIG. 15, particularly showing possible physical locations of various components described in association with FIG. 15.

Referring to FIGS. 15 and 16, a high-level system view showing various components internal to and external to a motorized window 100 is illustrated. Various of the components (e.g., controller 1502, communication module 1500, motor driver 1504, etc.) shown inside the motorized window 100 may be implemented within the motorized window, such as on a circuit board or within a housing of the actuator or controller, although this is not necessary in all embodiments. Other components (e.g., battery 1510) may be implemented outside of the motorized window but within the automated window or actuator body. Yet other components (light sensors 1516, temperature sensors 1518, security sensors 1520, solar cell 1512 etc.) may be implemented outside of the motorized window 100. For example, a temperature sensor 1518 or security sensor 1522 may be mounted to a window and connected to the controller 1502 (using, for example, wires routed through the frame of the motorized window). Nevertheless, the location and placement of the components illustrated in FIG. 15 may vary in different embodiments and is not intended to be limiting.

As shown, an automated motorized window 100 outfitted with an automated window in accordance with the invention may include one or more of the following: a communication module 1500, controller 1502, motor driver 1504, servo control module 1505, input device(s) 1506, output device(s) 1508, battery 1510, and charging module 1512. The motorized window 100 may also include one or more sensors 1514, such as a position encoder 1501, light sensor 1516, temperature sensor 1518, security sensor 1520, safety sensor 1522, and current/voltage sensor 1524. The manner in which the various components of the motorized window 100 are used will be discussed in more detail hereafter.

A communication module 1500 may enable wireless communication between the motorized window 100 and external devices. In one embodiment, the communication module 1500 includes a Bluetooth chip that allows the motorized window 100 to communicate with an external computing device 1540, wall switch 1554, video display adapter 1550, home automation controller 1546, or the like, using Bluetooth signals. In other embodiments, the communication module 1500 enables communication using other communication protocols, such as WIFI, Z-Wave, Zigbee, or the like. In certain embodiments, a bridge may be used to enable translation and compatibility between different communication protocols.

The communication module 1500 may also, in certain embodiments, act as a repeater to repeat signals to other devices. This may allow the communication module 1500 (and associated motorized window 100) to form part of a mesh network of interconnected devices. In some cases, a motorized window 100 may originate signals that are used to control other devices. For example, a temperature sensor 1518 connected to a motorized window 100 may measure temperature at or near a window. The measured temperature may be transmitted to a thermostat 1556 or other device to make adjustments to an HVAC system. Additionally, or alternatively, commands may be sent directly to an HVAC system to make adjustments thereto. Thus, in certain embodiments, the communication module 1500 may originate signals that are used to control devices external to the motorized window 100.

A controller 1502 may be configured to control the motorized window 100 and perform other functions, such as gathering information at or near the motorized window 100, controlling devices external to the motorized window 100, receive and execute commands from devices external to the motorized window 100, and the like. As can be appreciated by those of skill in the art, the controller 1502 may be programmable and may include a processor and non-volatile memory to store and execute program code. As was discussed in association with FIGS. 5 through 15, the controller 1502 may be programmed to operate a motorized window 100 in accordance with a designated schedule or in response to sensed lighting conditions. Once programmed, the controller 1502 may operate the motorized window 100 on its own without requiring commands from external devices. The controller 1502 may also be configured to receive commands (e.g., open or close commands) from an external device such as a smartphone and operate the motorized window 100 accordingly. Thus, presence of the controller 1502 may enable the automated motorized window 100 to independently operate on its own (without centralized control) or operate in response to commands from a centralized controller external to the motorized window 100.

Control signals generated by the controller 1502 may be sent to a motor driver 1504 in order to operate a motor or actuator. In certain embodiments, these control signals may be converted to modulated control signals using a suitable modulation technique (e.g., pulse-width modulation, or PWM). The modulated control signals may be sent to a motor driver to operate a motor or actuator, which may in turn adjust the angular position of the motorized window slats. In certain embodiments, a servo control module 1505 may provide feedback to the controller 1502 regarding the angular position of the slats (using the position encoder 1501) relative to a desired angular position so that the operation of the motor 400 can be adjusted accordingly. This may reduce error between a desired angular position and an actual angular position of the slats.

The motorized window 100 may also include various input devices 1506 and output devices 1508. Input devices 1506 may include, for example, various sensors 1514 for gathering data in and around the motorized window 100. An input device 1506 may also, in certain embodiments, include an audio sensor for receiving voice commands or other audible signals, such as voice commands to open or close a motorized window 100 or group of motorized windows 100. In certain embodiments, a manual input device may function as an interface for a user to control the window. Other types of input devices 1506 are possible and within the scope of the invention. Input devices 1506 may be incorporated into the motorized window 100, a solar panel attached to the motorized window 100, or the like.

Output devices 1508 may include, for example, LEDs, alarms, speakers, or devices to provide feedback to a user. Such output devices 1508 may, for example, indicate when a battery level for a motorized window 100 is low; when motion has been detected by a motorized window 100 (in embodiments where a motion sensor 1524 is incorporated into the motorized window 100); when connectivity is enabled, disabled, or lost between the motorized window 100 and other devices; when the motorized window 100 has experienced an error or other fault condition; when the motorized window 100 has detected smoke, carbon monoxide, or other gases (in the event a smoke or gas detector 1522 is incorporated into the motorized window 100); when a security event is detected by the motorized window 100, or the like. Such output devices 1508 may, in certain embodiments, be incorporated into the motorized window 100, a solar panel attached to the motorized window 100, or the like.

The motorized window 100 may also include a battery 1510 to power the motorized window 100. In certain embodiments, the battery 1510 is housed within the motorized window 100, external to the actuator enclosure. The battery 1510 may be rechargeable. Alternatively, or additionally, the battery 1510 is recharged by a solar panel 106 attached to the motorized window 100. For example, a solar panel 106 may be attached to the window frame or the window glass. In other embodiments, solar panels may be incorporated into or attached to the outer assembly of a motorized window 100. In certain embodiments, a charging module 1512 may boost low voltage from a solar panel to a higher voltage needed to charge the battery 1510 and/or operate various components within the motorized gearbox assembly 102.

As shown, the motorized window 100 may include various types of sensors 1514. Some of these sensors 1514 may be related to operation of the motorized window 100. Other sensors 1514 may take advantage of the motorized window's special placement within a home or building, namely on or near windows or other openings. The proximity of motorized windows 100 to windows and other openings make it possible for smart motorized windows 100 to provide a wide variety of features and functions not normally associated with motorized windows 100.

As previously mentioned, a position encoder 1501 may be used to track the number of rotations and/or angular position of the output shaft of the motor or actuator. The number of rotations and angular position of the output shaft may be translated into an angular position of a motor or actuator after the motorized window 100 has been calibrated. Various techniques for calibrating a motorized window 100 will be discussed in association with FIG. 17.

A light sensor 1516 may sense light levels at or around a motorized window 100. Various types of light sensors 1516, including photovoltaic cells, cameras, photo diodes, proximity light sensor, or the like, may be used depending on the application. In an embodiment, the solar panel 106 may be used as a light sensor. In certain embodiments, a light sensor 1516 may sense light external to a window. This may allow a motorized window 100 to open or close or increase and decrease opacity in response to lighting conditions outside a building. For example, a motorized window 100 may be configured to open at sunrise and close at sunset. Alternatively, or additionally, a motorized window 100 may be configured to open (either fully or partially) when conditions are overcast, thereby letting more light into a room or space, and close (either fully or partially) in response to detecting full sunlight, thereby letting less light into a room or space. In certain embodiments, a light sensor 1516 may be used to determine a total amount of light energy entering a room or space through a window. This information may be used to adjust a motorized window 100 or motorized window 100 or adjust HVAC system parameters. In another embodiment, the window may be closed upon detection of water or moisture from an environmental sensor.

A light sensor 1516 may also be configured to sense light levels internal to a window, such as within a room or interior space. This may allow a motorized window 100 to be adjusted based on interior light levels. For example, a motorized window 100 may be opened in response to lower levels of interior light and closed in response to higher levels of interior light. In certain embodiments, various algorithms may be used to adjust motorized windows 100 in response to both exterior and interior light levels, as opposed to just one or the other. Thus, in certain embodiments light sensors 1516 may be provided to sense both exterior and interior light levels.

In certain embodiments, the opening and closing of motorized windows 100 maybe coordinated with the turning on or off of lights in a room or space. For example, if lights in a room are turned off, motorized windows 100 may be opened to compensate for the reduced amount of light. This allows natural light to replace artificial light and creates opportunities for conserving energy. In certain embodiments, lights may be automatically turned off and motorized windows 100 may be automatically opened to replace artificial light with natural light when conditions allow. In such embodiments, the motorized windows 100 and interior lighting may be controlled by a home automation platform or other controller to provide desired amounts of light in a room or space while simultaneously conserving energy.

A temperature sensor 1518 may be used to sense temperature at or around a window associated with the motorized window 100. In certain embodiments, the temperature sensor 1518 is configured to sense a temperature external to a window. For example, an infrared thermometer may be used to infer the temperature external to a window by detecting thermal radiation emitted from objects outside the window. In other embodiments, the temperature sensor 1518 is configured to sense a temperature internal to the window. In yet other embodiments, the temperature sensor 1518 is configured to sense a temperature of the window itself.

In certain embodiments, a motorized window 100 may be adjusted based on a temperature sensed by the temperature sensor 1518. For example, if an interior temperature of a room is deemed to be too low, the motorized window 100 may open to let in additional sunlight and warm the room. Similarly, if the interior temperature of the room is deemed to be too high, the motorized window 100 may close to reduce an amount of sunlight entering the room.

The motorized window 100 may also use the temperature sensor 1518 to anticipate changes in temperature. For example, if an exterior temperature or temperature of a window decreases (indicating it is getting colder outside), the motorized window 100 may be configured to open the windows and cool a room in an effort to mitigate anticipated warming of the room. Similarly, if an exterior temperature or temperature of a window increases (indicating it is getting warmer outside), the motorized window 100 may be configured to close the windows in an effort to mitigate anticipated warming of the room.

In addition to adjusting the motorized window 100 itself, temperature measured at or near the motorized window 100 may be used adjust an HVAC system. The instant inventors have found that measuring temperature at or near a window may be more effective than measuring temperature inside a room (as performed by most thermostats) since windows are located at the boundaries of a room. Temperature changes at these boundaries tend to lead temperature changes in other parts of the room at least partly because windows tend to provide lesser levels of insulation compared to walls and other parts of the room. Thus, temperature readings gathered by a motorized window 100 in accordance with the invention may be used as part of a climate control system to adjust various HVAC system parameters. In certain embodiments, a motorized window 100 in accordance with the invention may actually replace a traditional thermostat used in homes or other establishments. That is, a motorized window 100 in accordance with the invention may monitor temperature at or near a window and, in response, relay at least one of commands and information to an HVAC controller to regulate room temperature in accordance with the monitored temperature. This may, in certain embodiments, eliminate the need for a conventional thermostat, or improve the function of conventional thermostats by providing improved temperature readings from boundaries (e.g., windows) in a room.

Due to the placement of motorized windows 100 at or near windows, a motorized window 100 in accordance with the invention may also advantageously include security sensors 3720 to monitor security at or near a window. In one embodiment, the security sensor 1520 is a proximity sensor configured to detect opening and/or closing of a window or door. In another embodiment, the security sensor 1520 is an impact sensor configured to detect impacts on and/or breakage of a window. For example, an accelerometer may act as an impact sensor to detect an extent of force on a window. Different alerts or notifications may be sent to a user or other entity depending on the extent of the impact. For example, touching a window may trigger a low priority alert or notification. Larger forces (causing a window to break, for example) may trigger higher priority alerts or notifications. In some embodiments, high priority alerts may be configured to trigger gathering of camera footage at or near a window.

In another embodiment, the security sensor 1520 is a camera configured to gather video or still shots at or around a window. In certain embodiments, an LED or other lighting may be provided for recording video or still shots in low lighting conditions. The video or still shots may be streamed wirelessly to a centralized security system or stored on the motorized gearbox assembly 102 for later retrieval. In other embodiments, the security sensor 1520 is a motion sensor configured to detect motion at or around a window. In yet other embodiments, the security sensor 1520 is an audio sensor configured to collect audio at or around a window. By incorporating security sensors 1520 into motorized windows 100, security may be monitored at each window. In certain embodiments, information from the security sensors 1520 is relayed to a centralized security system. In other embodiments, a motorized window 100 in accordance with the invention may be configured to act as a centralized security system by gathering information from security sensors 1520 located at various motorized windows 100. Such a centralized security system may, in certain embodiments, send notifications to a user, smart device, security company, law enforcement office, or the like, when breaches of security are detected.

Various security sensors 1520 may be configured to work together in certain embodiments. For example, a motion sensor 1520 may, upon sensing motion, trigger operation of a camera 1520, microphone 1520, or other data gathering sensor 1520. In other embodiments, a motion sensor 1520 may trigger illumination of an LED or other output device, thereby warning a potential intruder that he or she has been detected. This may provide a deterrent effect. In other embodiments, a motion sensor 1520 may trigger operation of a motorized window 100. For example, if a motion sensor 1520 detects that an intruder is approaching a window, the motion sensor 1520 may trigger closing of the motorized window 100 to obstruct the view through the window. Thus, security sensors 1520 may, in certain embodiments, trigger automatic operation of a motorized window 100 or a group of motorized windows 100.

To further increase security, a motorized window 100 in accordance with the invention may be password protected to prevent unauthorized access or control. Multiple failed password attempts may instigate a lockout from the motorized window 100. In certain embodiments, a manual unlock may be accomplished by physically manipulating the motorized window itself. For example, the motorized window 100 may be unlocked by manually tugging on a pull cord 110 or performing some other manual adjustment or reset of the motorized window 100.

The sensors may also, in certain embodiments, include safety sensors 1522 such as smoke detectors, carbon monoxide sensors, or the like. Outfitting motorized windows 100 with such sensors may provide a large number of sensors at prime locations throughout a home or business, while at the same time eliminating or reducing the need to equip a home or business with separate independent sensors. In certain embodiments, alerts or notifications may be sent to a user or first responder when smoke, carbon monoxide, or other critical substances or gases have been detected.

A current/voltage sensor 1524 may be provided to sense current or voltage associated with the motors or actuators. In certain embodiments, this information may be used to ensure that a motor or actuator is not overloaded. The current/voltage may also be used to calibrate the motorized window 100. For example, when the motorized window 100 is fully closed (i.e., have reached their maximum position), the current of the motor or actuator may spike in response to their non-movement. This spike in current may indicate that a maximum position has been reached. The position of the window may be recorded at this point (using the position encoder 1501) to remember the maximum position. The motorized window 100 may then be moved in the opposite direction until they stop (i.e., reach their minimum or fully open position). The current of the motor or actuator may again spike in response to the non-movement of the window. This spike may indicate that a minimum position has been reached. The minimum position may be recorded. In this way, the current/voltage sensor 1524 may be used in conjunction with the position encoder 1501 to learn the range of motion and stopping points of the motorized window. In certain embodiments, this calibration technique may be performed when the automated window is initially powered up or installed. Once the calibration is performed, the motorized window may, through various calculations, move the window to any desired position between the stopping points. As will be explained in more detail hereafter, the current/voltage sensor 1524 may, along with the position encoder 1501, be used to estimate a size of a motorized window 100. Knowing the size of the motorized window 100 may be used to prevent over-torqueing of the motorized window mechanisms.

As further shown in FIG. 15, a motorized window 100 may, in certain embodiments, interface with devices external to the motorized window 100. For example, the motorized window 100 may communicate with an external computing device 1540, such as a smart phone, tablet, laptop, desktop computer, or the like. The external computing device 1540 may, in certain embodiments, execute an application 1542 for setting up, managing, and controlling the automated motorized window 100. One example of such an application 1542 was discussed in association with FIGS. 5 through 14.

In certain embodiments, sensors 1544 embedded within the external computing device 3740 may be used to configure the motorized window 100. An automated motorized window 100 in accordance with the invention may also, in certain embodiments, interface with a home automation platform/controller 1546. Although an automated motorized window 100 in accordance with the invention may be programmed to operate on its own, the motorized window 100 may also be configured to work with various home automation systems using their native protocols or using a bridge that translates the native protocols into the motorized window's native protocol. For example, an automated motorized window 100 may be controlled by and communicate with a centralized home automation system or controller using Z-Wave, Zigbee, Insteon, or other home automation protocols.

An automated motorized window 100 in accordance with the invention may also be configured to interface with external sensors 1548. Although various sensors (as previously discussed) may be located in the motorized window 100 or in close proximity to the motorized window 100, other sensors 1548 may be located external to the motorized window 100 and, in some cases, be far removed from the motorized window 100. For example, a temperature sensor located in one part of a building may be used to trigger operation of motorized windows 100 in other parts of the building. In other cases, readings from multiple sensors 1548 located throughout a building may be used to influence operation of a motorized window 100 or a group of motorized windows 100. In certain cases, data may be gathered from external sensors 1548 and wirelessly communicated to a motorized window 100 or group of motorized windows 100.

In certain embodiments, an automated motorized window 100 in accordance with the invention may interface with one or more video display adapters 1550 (e.g., TV adapters 1550). In certain embodiments, a video display adapter 1550 may be embodied as a USB or HDMI dongle plugged into a USB or HMDI port of a video display. The instant inventors have found that, with most video displays (e.g., televisions), a USB or HMDI port of the video display becomes live (i.e., energized) when the video display is turned on. This same USB or HMDI port goes dead when the video display is turned off. Using this knowledge, a video display adapter 1550 in accordance with the invention may be designed that generates a signal when the video display is turned on. This signal may cause a motorized window 100 or group of motorized windows 100 to close when the video display is turned on (thereby darkening a room or space) and open when the video display is turned off (thereby lightening the room or space). Such a system may provide simple, inexpensive, automated motorized window control for home theaters, entertainment rooms, or other spaces. In certain embodiments, a video display adapter 1550 such as that described above may also be used to control devices other than motorized windows 100 or coverings 100, such as lighting, fans, audio/visual equipment, switches, or the like.

An automated motorized window 100 in accordance with the invention may also interface with various HVAC controls 1552. For example, as previously mentioned, in certain embodiments a motorized window 100 in accordance with the invention may measure temperature at or near a window and relay this temperature to a thermostat 1556, which may in turn adjust various HVAC parameters. In other cases, the motorized window 100 may actually function as a thermostat by directly adjusting HVAC parameters. Thus, the motorized window 100 may, in certain embodiments, replace a conventional thermostat. In doing so, the motorized window 100 may rely on its own temperature sensor 1518 and/or temperature sensors from other motorized windows 100 or devices in making determinations with regard to adjusting HVAC parameters.

Adjusting HVAC parameters may include, for example, switching heating or cooling devices 1552 on or off, regulating a flow of air or heat transfer fluid, or adjusting other features of an HVAC device. Adjusting HVAC parameters may also include automatically adjusting smart vents 1552 or smart windows 1552 that regulate air flow into a room or space. This may provide more targeted heating and/or cooling of a room or area, as opposed to adjusting the heating and/or cooling of an entire building. In certain cases, smart windows 1552 may be opened if favorable temperatures are detected external to a home or business, and these temperatures can bring an interior temperature closer to a desired interior temperature. This may conserve energy and reduce utilization of conventional heating and cooling systems.

As previously mentioned, a motorized window 100 or group of motorized windows 100 in accordance with the invention may also be controlled (e.g., wirelessly controlled) by external switches 1554, such as a remote control or the specialized wall switch discussed in association with FIG. 40. These switches 1554 may provide additional mechanisms for controlling a motorized window 100 or group of motorized windows 100. In certain cases, a wall switch 1554 or remote control 1554 may provide a faster and more convenient way to control a motorized window 100 or group of motorized windows 100 than an application 1554. In certain embodiments, an external switch 1554 in accordance with the invention may provide functionality to control devices other than motorized windows 100, as will be discussed in more detail hereafter. FIG. 16 is a high-level view of the system of FIG. 15, particularly showing possible physical locations of various components described in association with FIG. 15.

Figure 17:
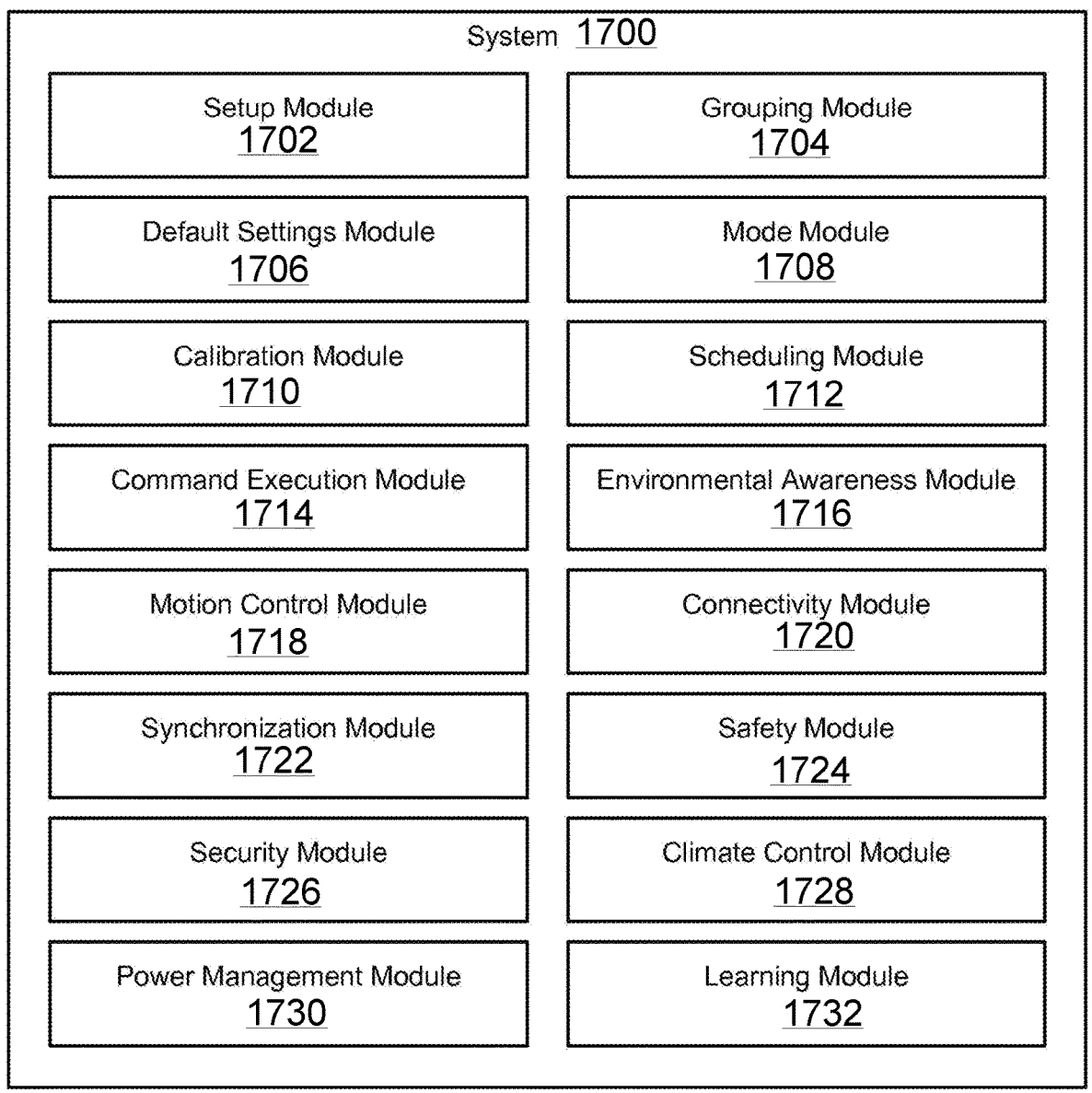
FIG. 17 is a high-level view showing various modules providing different functionality in the system of FIG. 15.

Referring to FIG. 17, various modules included in a system 1700 in accordance with the invention are illustrated. These modules may be embodied in hardware, software, firmware, or a combination thereof. The modules are illustrated to show functionality that may be provided by the disclosed system 1700 as opposed to the locations where such functionality is implemented. For example, the functionality of some modules may be implemented entirely or mostly in an automated window in accordance with the invention. Other functionality may be implemented in an application 1542 executing on an external computer device 1540, such as a smart phone or tablet. Other functionality may be implemented in a home automation controller 1546. Yet other functionality may be distributed between one or more of a motorized gearbox assembly 102, external computing devices 1540, home automation controller 1546, and other devices. Thus, the location where the modules are implemented may vary in different embodiments.

Once outfitted with an automated window in accordance with the invention, a setup module 1702 may allow a motorized window 100 to be set up. Setting up the motorized window 100 may include, for example, detecting the automated motorized window 100 (with an external computing device 1540), pairing the automated motorized window 100 with the external computing device 1540 (when using Bluetooth, for example), naming the automated motorized window 100, assigning the automated motorized window 100 to a room, space, or group of motorized windows 100, establishing default open and/or closed position for the motorized window 100, setting up a schedule or manner of operation for the motorized window 100, and the like. In certain embodiments, the setup module 1702 may use one or more of the other modules illustrated in FIG. 17 to perform these tasks.

A setup module 1702 may, in certain embodiments, enable automated motorized windows 100 to be ordered for a room or space. For example, the setup module 1702 may enable a user to input measurements for motorized windows 100 in a room or space. In certain embodiments, the setup module 1702 may also allow the user to assign names to the motorized windows 100 according to their location in the room or space. These names may be printed on the motorized windows 100 at a manufacturing plant so that the motorized windows 100 arrive at the user's home or business pre-labeled. This will ideally help the user quickly identify where the motorized windows 100 are to be installed.

A grouping module 1704 may enable multiple motorized windows 100 to be set up and controlled as a group. In certain embodiments, this may be accomplished by configuring one motorized window 100 in the group to act as a master and the other motorized windows 100 in the group to act as slaves of the master. The group of motorized windows 100 may, in certain embodiments, be configured to operate from a single schedule or sensors on a single motorized window 100, external computing device 1540, or home automation controller 1546, thereby ensuring the motorized windows 100 in the group are synchronized. In such an embodiment, the group of motorized windows 100 may operate in response to a command or commands from the master motorized window 100, external computing device 1540, or home automation controller 1546. In certain embodiments, separate commands are sent to each motorized window 100 belonging to a group to cause them to act in a synchronized manner. In other embodiments, a single command that is addressed to multiple motorized windows 100 is sent. Each motorized window 100 may receive the command and either execute or discard the command based on whether the command is addressed to the motorized window 100.

In other embodiments, the group of motorized windows 100 may each operate from an identical schedule programmed into each motorized window 100, or from individual sensors in each motorized window 100 that are configured in the same way. As previously mentioned, an application 1542 in accordance with the invention may, in certain embodiments, provide buttons or options that allow motorized windows 100 to be grouped, as well as provide buttons or options that allow the motorized windows 100 to be controlled or programmed as a group as opposed to individually. The grouping module 1704 may also allow groups to be modified, such as by renaming a group, adding motorized windows 100 to a group, naming motorized windows 100 within a group, removing motorized windows 100 from a group, and the like.

A default settings module 1706 may allow various default settings to be established for a motorized window 100 or a group of motorized windows 100. For example, a default open and/or closed position may be established for a motorized window 100 or group of motorized windows 100. When a motorized window 100 is opened, such as by selecting an open button in an application 1542 or other device, the motorized window 100 may stop at the default open position. Similarly, when a motorized window 100 is closed, such as by selecting a close button in the application 1542 or other device, the motorized window 100 may stop at the default closed position. Other default settings are possible and within the scope of the invention.

A mode module 1708 may enable a user to establish and select from various modes for a motorized window 100 or group of motorized windows 100. Such modes may change the behavior of a motorized window 100 or group of motorized windows 100. For example, a user may establish an "at home" mode and an "away" mode that causes the user's motorized windows 100 to behave differently based on whether the user is at home or away from home. For example, the user's motorized windows 100 may be configured to open or close at different times or in response to different conditions based on whether the user is at home or away. An "away" mode in particular May, in certain embodiments, be configured to make a home or business appear to be occupied, such as by moving motorized windows 100 periodically. Other motorized windows 100 may remain closed to prevent viewing of valuable items within the home or business. The user may manually set the mode, or the mode may be set automatically in response to different conditions (e.g., detecting activity or inactivity in a home using a motion sensor, detecting the presence or absence of a smart device, tag, or other device carried by an occupant, for example).

A calibration module 1710 may be configured to calibrate an automated window in accordance with the invention. For example, when an automated window is initially installed into an opening or frame, the automated window may slide the window in both directions to determine the range of motion. That is, the motor or actuator may move the window in a first direction until the window reaches a first stopping point, and then tilt the slats in the opposite direction until the slats reach a second stopping point. Because the window may not have a hard stop in either direction, in certain embodiments the window is slid until the current of the motor reaches a specified threshold (or until the position encoder 1501 detects that movement has substantially stopped) and then moved in the opposite direction until the current of the motor reaches the specified threshold (or until the position encoder 1501 detects that movement has substantially stopped). Alternatively, or additionally, the slats may be tilted until the angular velocity of the slats falls below a specified threshold and then tilted in the opposite direction until the angular velocity of the slats falls below the specified threshold. In this way, the calibration module 1710 may determine the limits of angular travel. Once these limits are determined using the position encoder 1500, the slats may be tilted to any intermediate angle between the limits using a simple calculation, and/or the motor or actuator may be able to determine a current position of the window.

In certain embodiments, the calibration module 3910 may also be configured to determine a size of the motorized window 100, fully open and fully closed stopping points, or weight. This may be important to properly calibrate the motorized window 100 and ensure that an actuator of the motorized window 100 is not over-torqued. For example, a larger motorized window 100 may require more force to operate the motorized window 100 and a smaller motorized window 100 may require less force to operate the motorized window 100, due to the weight of their respective structure. Calculating the size of the motorized window 100 may ensure that a proper amount of power (and thus force) is applied to the actuator. In certain embodiments, the calibration module 3910 may calculate the weight by examining an amount of current drawn by the motor 400 (as measured by the current sensor 1524) in relation to an amount angular movement or speed of the actuator (as measured by the position encoder 1501). The more current that is drawn for a given angular distance or speed, the larger the size of the motorized window 100.

A scheduling module 1712 may be configured to schedule operation of a motorized window 100 or group of motorized windows 100. Various different techniques may be used to schedule operation of a motorized window 100. In certain embodiments, a user may designate open/close times as discussed in association with FIG. 8. In other cases, a schedule may be automatically determined based on a time of year and/or location or orientation of a motorized window 100. For example, a user may schedule a motorized window 100 to open at sunrise and close at sunset. The scheduling module 1712 may reference a database or utilize an algorithm to determine sunrise and sunset times for the motorized window 100 based on the motorized window's location and the time of year and schedule opening and closing time accordingly. These opening and closing times may be adjusted throughout the year as the position of the sun changes.

In other cases, the scheduling module 1712 may consider the orientation of a motorized window 100. Based on the motorized window's orientation and the incidence of the sun on the motorized window 100 at different times of day, the opening and closing times may be adjusted. The opening and closing times may be adjusted based on the changing incidence of the sun on the motorized window 100 over time. In certain embodiments, each motorized window 100 may keep track of a current date and time using an internal clock or by referencing an external clock so that the position of the sun for the date and time can be determined.

A command execution module 1714 may enable a motorized window 100 to respond to commands in additional to following a schedule or operating in response to sensed lighting conditions. For example, a user may wish to manually open and close a motorized window 100 or a group of motorized windows 100 by selecting buttons or options in an application 1542, or using a specialized wall switch 1554. For example, a motorized window 100 or a group of motorized windows 100 may open in response to receiving an open command and close in response to receiving a close command. A stop command may cause the motorized window 100 or group of motorized windows 100 to stop at their current angular position. Other commands are possible and within the scope of the invention.

An environmental awareness module 1716 may allow a motorized window 100 or group of motorized windows 100 to operate in response to environmental conditions. For example, a motorized window 100 or group of motorized windows 100 may be configured to open or close in response to changing lighting conditions, changing temperature conditions, detected motion, detected noise, detected security situations, detected safety situations, or the like. These conditions may be conditions inside a building, outside a building, or a combination thereof. The environmental awareness module 1716 may require sensors, placed at suitable locations, to detect environmental conditions that may trigger operation of the motorized windows 100.

A motion control module 1718 may be configured to control the motion of a motorized window 100. As previously mentioned, functionality may be provided to designate how fast a motorized window 100 or group of motorized windows 100 opens or closes in association with a particular event. As an example, a user may want a motorized window 100 or group of motorized windows 100 to open or close over a specified period of time (e.g., 10 minutes, 30 minutes, an hour, etc.) instead of opening or closing in an abrupt manner. In other cases, the motorized windows 100 may move gradually to mirror movement of the sun. In some cases, this may make movement of the motorized windows 100 undetectable to the naked eye. The motion control module 3918 may enable this functionality. The motion control module 1718 may provide this functionality by performing slight incremental angular movements (possibly invisible to the eye) of the slats over a specified period of time. Alternatively, or additionally, the motion control module 1718 may simply adjust the speed of the motor 400. In certain embodiments, this may be accomplished using pulse-wide modulation (PWM) or other techniques to adjust the speed of the motor 400.

A connectivity module 1720 may be used to provide connectivity between a motorized window 100 and other devices. This may include providing connectivity between a motorized window 100 and an external computing device 1540, a home automation platform/controller 1546, external sensors 1548, video display adapters 1550, HVAC controls 1552, external switches 1554, thermostats 1556, or other motorized windows 100. Any suitable communication protocol may be used. In certain embodiments, the connectivity module 1720 allows devices to act as repeaters of a signal, thereby allowing the devices to form a mesh network of interconnected devices.

A synchronization module 1722 may enable a motorized window 100 to be synchronized with an external computing device 1540, such as a smart phone or tablet. For example, the synchronization module 1722 may enable a motorized window 100 to synchronize its date and time with the date and time of the external computing device 1540. The synchronization module 1722 may also enable the motorized window 100 to synchronize itself with various sensors 1544 of the external computing device 1540.

In certain embodiments, additional information, such as the size and dimensions (e.g., height, width) of the window may be input to the external computing device 1540 by the user to further define the position and orientation of the window. Once the position and orientation of a window are known, a motorized window 100 may be programmed to operate (e.g., open/close) based on the position and orientation of the window in relation to the position and orientation of the sun. The position and orientation of the window may also be used to determine how and when sunlight will be incident on a solar panel used to power a motorized window 100 or charge a battery 1510.

In certain embodiments, the operation of a motorized window 100 or group of motorized windows 100 may be synchronized with a calendar, timer, or alarm clock of an external computing device 1540. For example, an alarm clock associated with an external computing device 1540 may cause a motorized window 100 or group of motorized windows 100 to open and thereby allow sunlight to enter a room or space. Similarly, a calendar event or expiration of a timer may cause a motorized window 100 or group of motorized windows 100 to open or close.

A safety module 1724 in accordance with the invention may be configured to provide various safety features at or near a motorized window 100. For example, as previously explained, a motorized window 100 in accordance with the invention may be equipped with safety sensors 1522 such as smoke detectors, carbon monoxide sensors, or the like. In certain embodiments, the safety module 1724 may monitor these safety sensors 1522 and generate notifications or set off alarms when a hazardous or safety-related condition is detected.

A security module 1726 may be configured to monitor security at or near a motorized window 100. As previously mentioned, one or more security sensors 1520 may be incorporated into or located proximate a smart motorized window 100 in accordance with the invention. Using the security sensors 1520, the security module 1726 may detect events such as, opening or closing of a window, impacts on a window, breakage of a window, motion near a window, sound near a window, or the like. When a security related event or condition is detected, the security module 1726 may generate a notification, set off an alarm, or the like. In certain embodiments, the security module 1726 is configured to monitor security conditions at multiple windows, thereby providing comprehensive security throughout a home or business.

A climate control module 1728 may be configured to monitor and adjust the climate within a room or space. As previously mentioned, a motorized window 100 in accordance with the invention may be equipped with temperature sensors 1518, humidity sensors, or the like. These sensors may be used to monitor the climate internal to or external to a room or space. Using these sensors, the climate control module 1728 may monitor the climate and make adjustments where needed. In certain embodiments, the climate control module 1728 sends information to a thermostat 1556 so that the thermostat 1556 can adjust HVAC parameters (heating, cooling, humidity, air circulation, etc.) accordingly. In other embodiments, the climate control module 1728 adjusts the HVAC parameters directly.

A power management module 1730 may be configured to manage power required by a motorized window 100 in accordance with the invention. As previously mentioned, the motorized window 100 may be powered by a battery 1510. In certain embodiments, this battery 1510 is charged by a solar panel 106. The solar panel 106 may be accompanied by a charging module 1512 to boost a low voltage of the solar panel (in reduced lighting conditions) to a higher voltage needed to charge the battery and/or operate components of the motorized gearbox assembly 102. In other embodiments, the battery 1510 is charged through a charging port.

In certain embodiments, the power management module 1730 may track power levels and/or usage trends of a motorized window 100 or group of motorized windows 100 and make or suggest adjustments to more efficiently utilize power. For example, the power management module 1730 may adjust or suggest adjusting a number of scheduled openings/closings to extend battery life. In certain embodiments, the power management module 1730 may put a motorized window 100 (or selected components of a motorized window 100) into a sleep or lower power mode when the motorized window 100 and/or any attached components (e.g., sensors) are not in use. Various events (detected motion, security events, safety-related events, etc.) may wake up a motorized window 100 or selected components of a motorized window 100. A motorized window 100 may also wake up when communications are received from external devices, such as an external computing device 1540, home automation controller 1546, video display adapter 1550, external switch 1554, other motorized windows 100, or the like. In some embodiments, the power management module 1730 may provide the usage trends of an actuation device 100 to another device (e.g., a hub and/or a cloud-based server) for long term storage and complex analytics (for determining smart trends, anticipating needs based on other events, and the like).

A learning module 1732 may be configured to learn a user's tendencies and operate a motorized window 100 or group of motorized windows 100 in accordance with those tendencies. For example, the learning module 1732 may observe that a user opens or closes a motorized window 100 at specific times of the day or in response to certain lighting conditions. This observation may take place continually or over a specified period of time. The learning module 1732 may then program the motorized window 100 or instruct the motorized window 100 to open or close at the observed times or in accordance with some algorithm designed to implement user preferences. In another example, the learning module 1732 may observe that the user opens or closes certain motorized windows 100 at the same time or proximate in time and then program the motorized windows 100 to open and close together as a group at the observed time. In yet other cases, the learning module 1732 may observe an angle that slats are adjusted to and adjust the slats accordingly. In certain embodiments, the learning module 1732 may observe opacity settings. Other types of learning are possible and within the scope of the invention.

Figure 18:
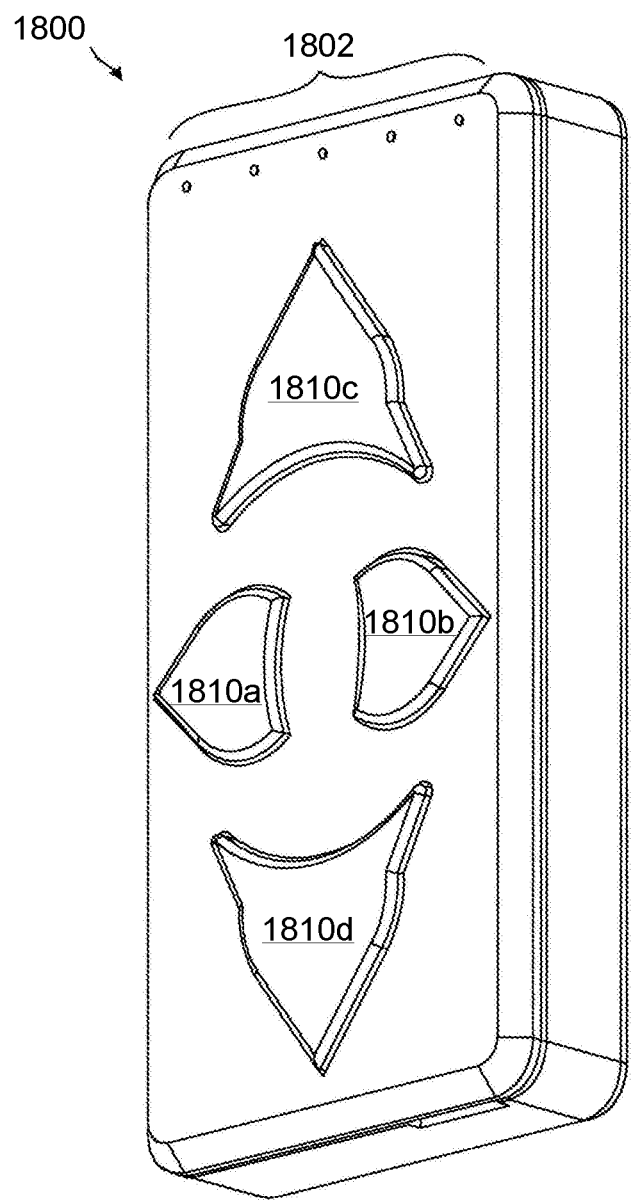
FIG. 18 is a perspective view of one embodiment of a specialized wall switch in accordance with the invention.

Referring to FIG. 18, one embodiment of a specialized wall switch 1554 in accordance with the invention is illustrated. The specialized wall switches 1554 may be battery powered or connected to a building's electrical system. The specialized wall switch 1554 enables large number of different devices (e.g., motorized windows 100 or groups of motorized windows 100, lights, fans, heating systems, cooling systems, etc.) to be controlled (e.g., wirelessly controlled) with a single switch 1554, without requiring separate controls for each device or system. As shown the specialized wall switch 1554 includes a set of directional buttons 1810*a-d* for selecting a device or system to control, as well as adjusting an amount associated with the device or system. A first pair of directional buttons 1810*a*, 1810*b* enables a user to select a current function for the specialized wall switch 1554. A set of indicators 1802 (e.g., colored LEDs 1802, LEDs 1802 with accompanying pictures or icons, etc.) may be provided to indicate the current function of the specialized wall switch 1554. A second pair of directional buttons 1810*c*, 1810*d* enables the user to increase or decrease an amount associated with the current function. The first and second pairs of directional buttons 1810*a-d* may be oriented substantially perpendicular to one another. Similarly, the buttons 1810*a-d* may be embodied as separate buttons 1810*a-d*, as illustrated, or be embodied as one or more rocker or rocker-like switches, a directional pad, a control pad, a joystick, touchscreen with virtual directional buttons, or the like. For the purposes of the disclosure and claims, each of these embodiments will be collectively referred to as a directional switching device.

Figure 19:
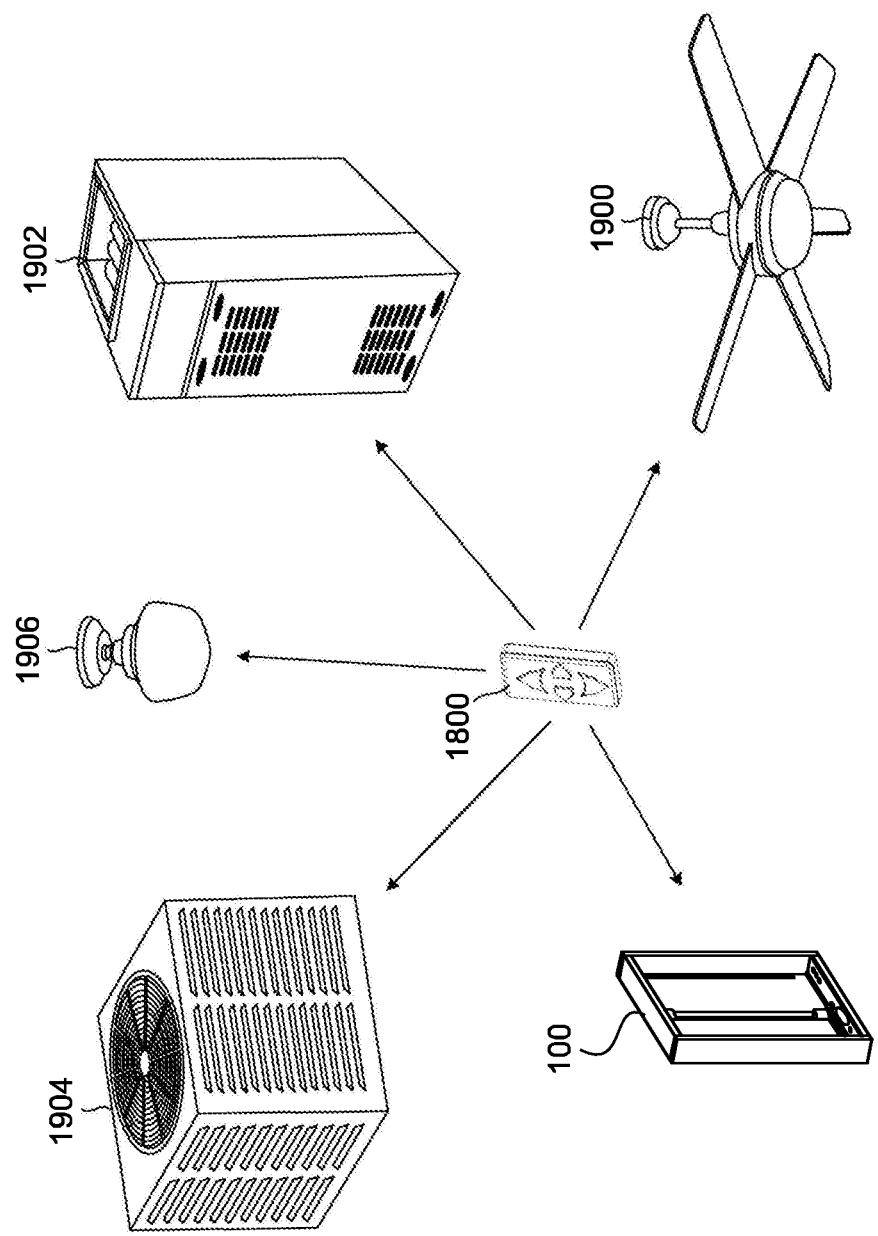
FIG. 19 is a high-level view showing various components that may be controlled by the specialized wall switch discussed in association with FIG. 18.

For example, referring to FIG. 19, while continuing to refer generally to FIG. 18, the illustrated specialized wall switch 1554 may be configured to control five different devices or systems, such as a motorized window 100 or group of motorized windows 100, a fan 1900, a heating system 1902 such as a furnace, a cooling system 1904, and lights 1906. These functions are presented by way of example and not limitation. Other types and numbers of functions are possible and within the scope of the invention.

A center indicator 1802 may be white and illuminate when lights 1906 are the current function. When lights 1906 are the current function, the buttons 1810*c*, 1810*d* may increase or decrease the intensity of the lights 1906 or turn the lights 1906 on or off. A first indicator 4002 right of center may be blue and illuminate when a cooling system 1904 is the current function. When the cooling system 1904 is the current function, the buttons 1810*c*, 1810*d* may turn a desired temperature up or down or, in other embodiments, turn the cooling system 4104 on or off. A first indicator 1802 left of center may be red and illuminate when a heating system 1902 is the current function. When the heating system 1902 is the current function, the buttons 1810*c*, 1810*d* may turn the desired temperature up or down or, in other embodiments, turn the heating system 1902 on or off.

A second indicator 1802 right of center may be green and illuminate when a ceiling fan 1900 (or other air circulation device 1900) is the current function. When the fan 1900 is the current function, the buttons 1810*c*, 1810*d* may adjust the speed of the fan 1900 up or down. A second indicator 1802 left of center may be yellow and illuminate when a motorized window 100 or group of motorized windows 100 is the current function. When a motorized window 100 or group of motorized windows 100 is the current function, the buttons 1810*c*, 1810*d* may adjust the tilt of the slats of the motorized window 100 or group of motorized windows 100 or, alternatively, cause the motorized window 100 or group of motorized windows 100 to open or close.

Figure 20:
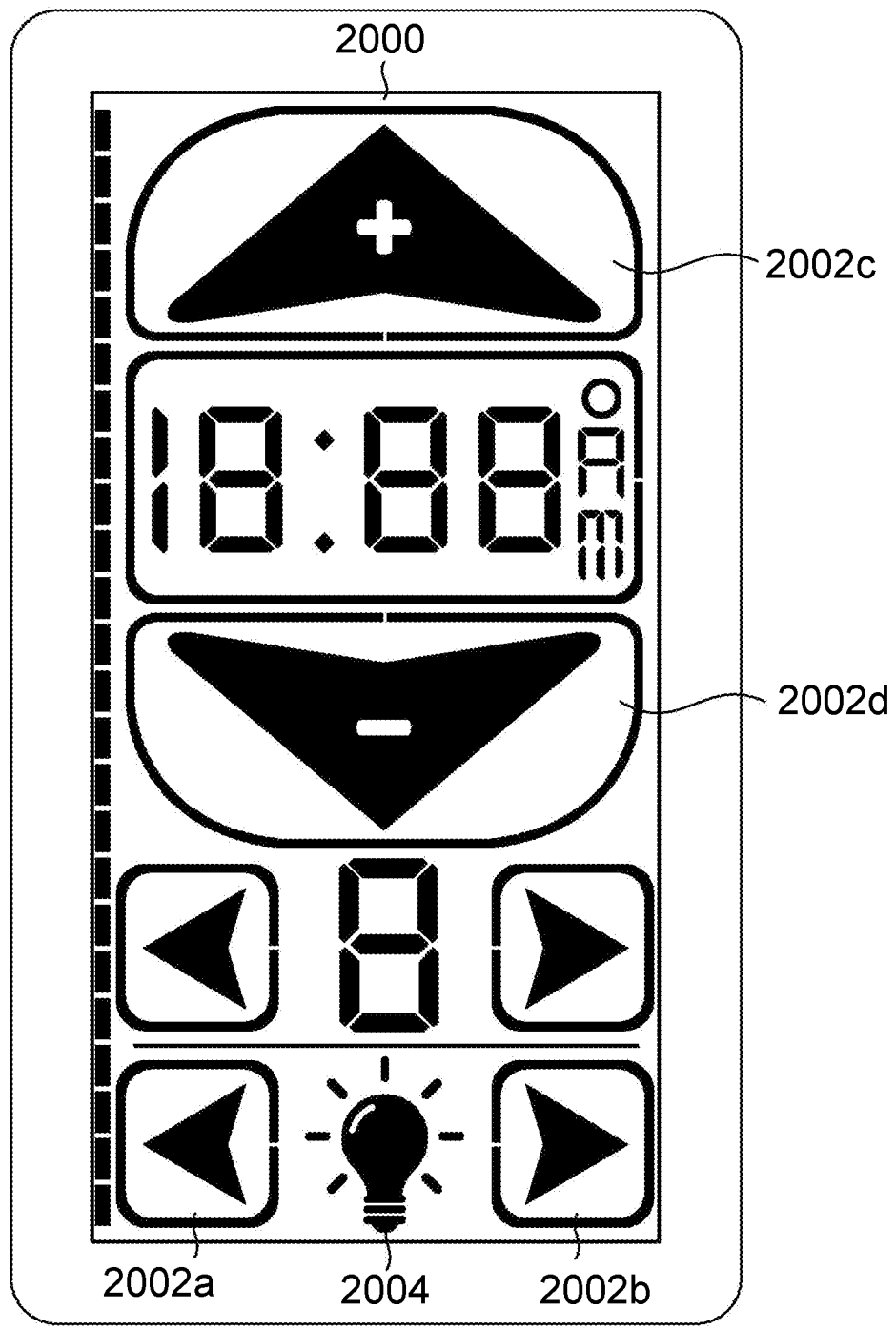
FIG. 20 shows one embodiment of a touchscreen providing functionality similar to the specialized wall switch illustrated in FIG. 18.

Referring to FIG. 20, in certain embodiments the specialized wall switches 1554 illustrated in FIG. 20 may be embodied as a touchscreen 2000 providing virtual directional controls similar to the physical controls shown of FIG. 18. As shown the touchscreen 2000 includes a set of virtual directional buttons 2002a-d for selecting a device or system to control, as well as adjusting an amount associated with the device or system. A first pair of virtual directional buttons 2002a, 2002b enables a user to select a current function for the touchscreen 2000. An indicator icon 2004 may be provided to indicate the current function of the touchscreen 2000. A second pair of virtual directional buttons 2002c, 2002d enables the user to increase or decrease an amount associated with the current function.

Figure 21:
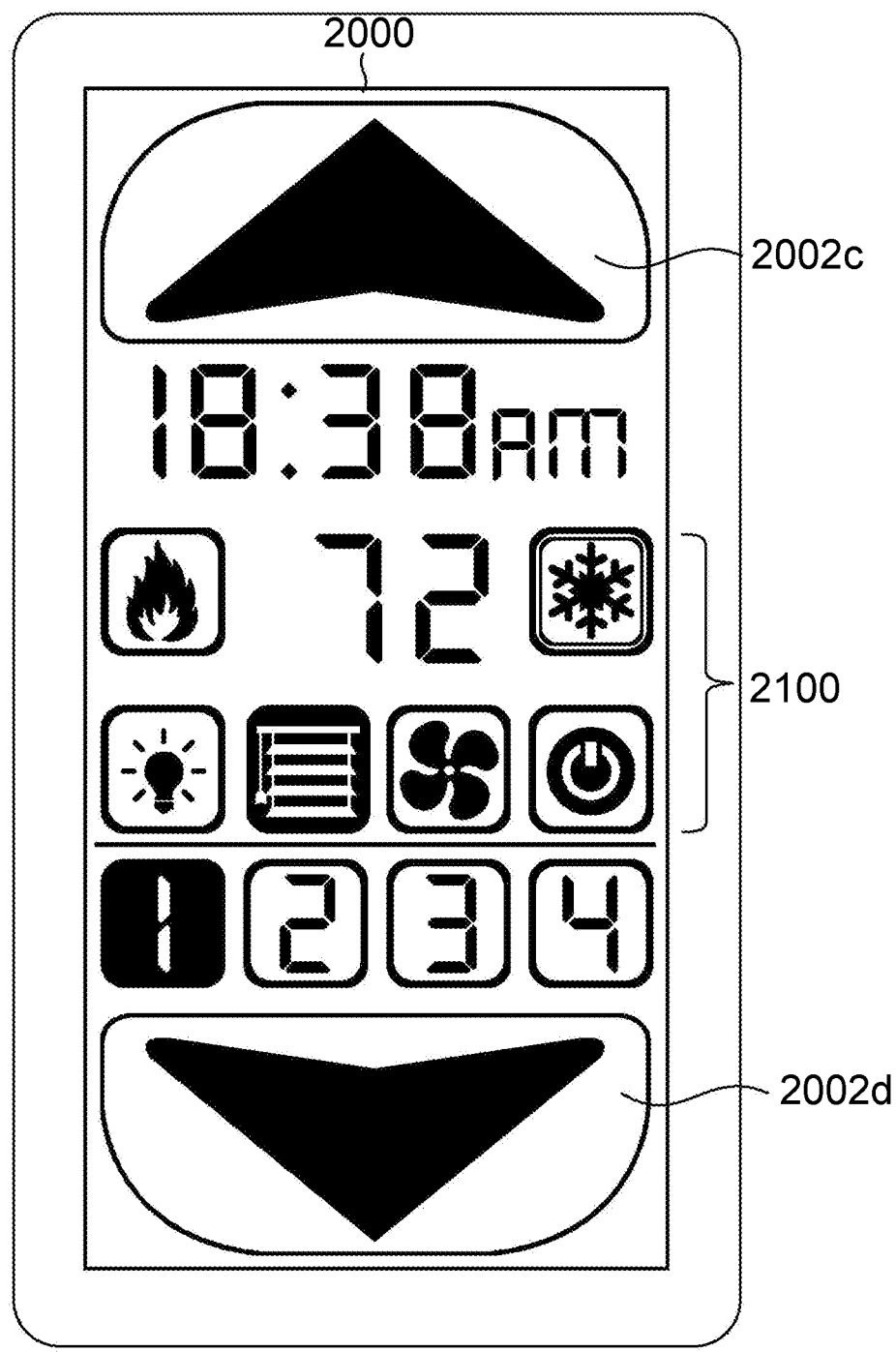
FIG. 21 shows another embodiment of a touchscreen providing functionality similar to the specialized wall switch illustrated in FIG. 18.

FIG. 21 shows an embodiment similar to that of FIG. 20 except that the virtual directional buttons 2002a, 2002b are replaced by virtual buttons 2100 or icons 2100 enabling a user to directly select a current function. In the embodiment shown in FIG. 43, the virtual button 2100 or icon 2100 representing the current function is bolded or has its colors inverted.

Although particular reference has been made herein to motorized windows 100 and actuators, various features and functions of the disclosed embodiments of the invention may equally apply to other associated systems such as automated shutters, curtains, shades, etc. The disclosed features and functions may also be applicable to other related systems. For example, different features and functions disclosed herein may be used to automatically raise and lower the slats of motorized windows, along with adjusting the tilt of the slats. Thus, where applicable, the disclosed features and functions may be used with other systems.

The apparatus and methods disclosed herein may be embodied in other specific forms without departing from their spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An automated window mechanism comprising:
an electrically powered actuator configured to move a window between a closed position and an open position;
a power source, providing power to the actuator;
a current sensor, configured to sense the current between the power source and the actuator when the actuator is moving the window;
a processor configured to determine, from information provided by the current sensor, a first endpoint when the window is in the closed position and a second endpoint when the window is in the open position for the window;
a controller configured to store the first and second endpoints, and thereafter use the endpoints to control the actuator to stop in either the first or the second endpoint when desired by a user;
a non-volatile memory for storing data, the data comprising stored settings and calendar data, wherein the stored settings comprise factory preset data; a performance sensor that provides performance data, wherein the performance sensor senses at least one of electrical performance and mechanical performance of the actuator; and the processor further configured to: determine a first set of operating parameters associated with the actuator based on the performance data and at least one of the factory data and first remote data from a remote sensor; determine a control command for operating the actuator based on the first set of operating parameters; determine a second set of operating parameters associated with the actuator based on the performance data and at least one of the factory data and second remote data from the remote sensor; determine that a difference between the second set of operating parameters and the first set of operating parameters exceeds a threshold; modify the control command based on the determined difference; and
transmit the modified control command to the controller.

2. The invention of claim 1 wherein the actuator is an electric motor in combination with a gear.

3. The invention of claim 2 wherein the controller uses the number of turns of the motor between the endpoints to determine when to stop the actuator at either endpoint.

4. The invention of claim 1 wherein the current sensor, processor and controller are also configured to detect blockage of window movement and automatically stop the actuator, in order to prevent harm to the mechanism or the user.

5. The invention of claim 1 wherein the user may program the controller to stop at intermediate points between the first and second endpoints.

6. The invention of claim 5 wherein the user may select a calibration mode for the mechanism, wherein the endpoints are re-determined.

7. The invention of claim 1 wherein the mechanism is initially set in an installation mode, wherein the endpoints are automatically determined.

8. The invention of claim 1 wherein the mechanism is configured to automatically enter a calibration mode in response to the mechanism being disengaged and reengaged.

9. The invention of claim 1, wherein the processor is further configured to:
store the first set of operating parameters in the non-volatile memory as baseline data;
store the control command in the non-volatile memory;
store the second set of operating parameters in the non-volatile memory; and
store the modified control command in the non-volatile memory.

10. The invention of claim 1, wherein the processor is further configured to:
receive performance data from the performance sensor;
receive remote data from the remote sensor, wherein the remote sensor is included in a remote device that is located in a separate location than the actuation device.

11. The invention of claim 1, wherein the performance sensor provides performance data, wherein the performance sensor monitors a set of baseline performance parameters associated with the actuator during a first time period, and wherein the performance sensor monitors a set of real time performance parameters associated with the actuator during a second time period.

12. The invention of claim 1, wherein the processor is further configured to:
store the baseline performance parameters in the non-volatile memory as performance base data;
store the real time performance parameters in the non-volatile memory as real time data; and
determine that a performance difference between the baseline performance parameters and the real time data exceeds a threshold, wherein the determined difference comprises the performance difference.

13. The invention of claim 12, wherein the processor is further configured to identify an anomaly in the expected mechanical or electrical behavior of the actuator based on the determined performance difference.

14. The invention of claim 13, wherein the processor is further configured to:
transmit a trouble signal to another device; wherein the trouble signal comprises data describing one or more defining characteristics of the anomaly.

15. The invention of claim 13, wherein a modified control command compensates for the anomaly, wherein the modified control command causes the controller to send at least one modified signal to the actuator that causes the actuator to at least one of speed up, slow down, or stop in order to compensate for the anomaly.

16. The invention of claim 1, wherein the performance sensor comprises at least one of an electrical sensor; mechanical sensor; transducer; electromagnetic; electro-chemical; electric current; electric potential; magnetic; radio; accelerometer; pressure; electro-acoustic; electro-optical; photoelectric; electrostatic; thermoelectric; radio-acoustic; electrical resistance; mechanical resistance; position resolver, optical encoder, capacitive encoder, Hall-effect device, incremental encoder, absolute encoder, absolute transducer of position, capacitive encoder, PIR, pyroelectric, magnetic field, vibration, motor speed, frequency, rotation, torque, ultrasonic, temperature, velocity; position; angle; displacement; or combinations thereof.

17. The invention of claim 1, further comprising:
a network device; wherein the network device communicates to a plurality of actuation devices within an actuation system.

18. The invention of claim 17, wherein the network device further comprises a wireless transmitter and wireless transceiver; wherein the network device has a connection to each network device of the one or more actuated devices; wherein the connection comprises a wired or wireless interface; and wherein the wireless interface comprises Bluetooth, WIFI, mesh network or similar wireless protocol.

19. The system of claim 18, wherein the wired interface utilizes ethernet protocol.

20. The invention of claim 1, wherein the processor is further configured to:
receive user data from one or more user input devices; wherein the one or more user input devices comprises a user interface for receiving the user input from a user.

21. The invention of claim 20, wherein the one or more user input devices is a mobile device capable of wirelessly transmitting and receiving a signal; wherein the mobile device has a connection to the actuation device; wherein the mobile device comprises a cell phone, satellite phone, smartphone, personal digital assistant, tablet computer, laptop computer, remote control device, mobile transmitter, a mobile internet device or a combination of one or more of the same.

22. The invention of claim 1, wherein the performance sensor is at or adjacent to the actuator; wherein the performance sensor converts sensor data to an electrical signal; and wherein the performance sensors comprises at least one of: electromagnetic; electrochemical; electric current; electric potential; magnetic; radio; air flow; accelerometers; pressure; electro-acoustic; electro-optical; photoelectric; electrostatic; thermoelectric; radio-acoustic; environmental; moisture; humidity; fluid velocity; position; angle; displacement; or combinations thereof.

23. The invention of claim 1, wherein the remote data is transmitted from a remote system located in a separate part of a room, building, or outside of a building, wherein the remote system comprises at least one of a weather station, security system, wireless remote sensor device, fire alarm system, HVAC system, building control system, manufacturing control system, monitoring system; control system, or combinations thereof, wherein the remote sensors convert sensor data to an electrical signal, and wherein the remote sensors comprise at least one of: electromagnetic, electrochemical, electric current, electric potential, magnetic; radio, air flow, accelerometers, pressure, electro-acoustic, electro-optical, photoelectric; electrostatic, thermoelectric, radio-acoustic, environmental, moisture, humidity, fluid velocity, position, angle, displacement, or combinations thereof.

24. The invention of claim 1, wherein the processor is further configured to:
communicate with a cloud based network; wherein the processor is configured to mirror the stored settings and calendar data with the cloud based network by sending and receiving system data to and from the cloud-based network; wherein the system data comprises all data in the non-volatile memory.

25. The invention of claim 24, wherein the remote data comprises weather data, and the remote data from the remote sensors and remote systems is relayed to the actuation device via the cloud-based network, and wherein the processor is further configured to:
determine a remote command based on at least one of the remote data, the stored settings, calendar data, and as directed by predefined user settings, or combinations thereof; and
transmit the remote command to the controller.

26. The invention of claim 1, wherein the actuator comprises one or more of electric motors, gearboxes and one or more mechanical means of incrementally opening, closing, tilting, turning, twisting, sliding, pushing, pulling, and rotating one or more components of the actuated device.

27. The invention of claim 1, further comprising:
one or more batteries; and
one or more solar photovoltaic panels.

28. The invention of claim 1, wherein the processor is further configured to:
monitor usage data of the actuator; and
provide the usage data to a disparate device.

29. The invention of claim 1, further comprising a frame and a slidable segment that is slidably mounted within the frame;
a first motor mounted either on the slidable segment or to a first stationary member of the frame;
the controller that controls the operation of the first motor;
a first gear driven by the first motor;
a first gear track mounted either on the slidable segment or to the first stationary member of the frame; wherein teeth of the first gear mesh with teeth of the first gear track;
wherein rotating the first gear in a first rotational direction moves the slidable segment in a first linear direction as the first gear walks along the first gear track; and
wherein rotating the first gear in a second rotational direction moves the slidable segment in a second linear direction as the first gear walks along the first gear track.

* * * * *